(12) United States Patent
Smith et al.

(10) Patent No.: US 12,380,813 B2
(45) Date of Patent: Aug. 5, 2025

(54) CONTROL CIRCUITRY FOR DATA SECURITY APPARATUS

(71) Applicant: OPē LLC, Theodore, AL (US)

(72) Inventors: Joshua Norman Smith, Mobile, AL (US); Robert Chad McCollum, Mobile, AL (US); Andrey Bogdanov, Copenhagen (DK)

(73) Assignee: OPë, LLC, Theodore, AL (US)

( * ) Notice: Subject to any disclaimer, the term of this patent is extended or adjusted under 35 U.S.C. 154(b) by 0 days.

(21) Appl. No.: 18/322,649

(22) Filed: May 24, 2023

(65) Prior Publication Data

US 2023/0298485 A1  Sep. 21, 2023

Related U.S. Application Data

(63) Continuation of application No. 17/221,228, filed on Apr. 2, 2021, now Pat. No. 11,699,361, which is a
(Continued)

(51) Int. Cl.
*G09C 1/00* (2006.01)
*G02F 1/13* (2006.01)
(Continued)

(52) U.S. Cl.
CPC ............. *G09C 1/00* (2013.01); *G02F 1/1313* (2013.01); *G02F 1/133524* (2013.01);
(Continued)

(58) Field of Classification Search
CPC ... G09C 1/00; G02F 1/1313; G02F 1/133524; G02F 1/134309; G02F 1/13439;
(Continued)

(56) References Cited

U.S. PATENT DOCUMENTS 4,803,726 A * 2/1989 Levine .................... H04K 1/00
370/522
5,579,136 A 11/1996 Fukui et al.
(Continued)

FOREIGN PATENT DOCUMENTS

EP      2 230 794 A2    9/2010
WO      2019048024 A1   3/2019

OTHER PUBLICATIONS

S L Semjonov et a: "High-temperature polyimide coating for optical fibers", Quantum Electronics/, vol. 45, No. 4, Apr. 27, 2015, pp. 330-332, XP055767537, GB.
(Continued)

*Primary Examiner* — Jacob Lipman
(74) *Attorney, Agent, or Firm* — ASLAN LAW, P.C.

(57) ABSTRACT

A data security apparatus has an analog component and control circuitry. The control circuitry receives an incoming digital message and converts it to or from encrypted form using the analog component. The control circuitry drives the analog component with drive signals and receives back a digital representation of what the analog component's sensor outputs. It uses this in making a digital keystream. In operation, the control circuitry makes the drive signals by encrypting a nonce-based value with a key. It can encrypt the digital representation of the sensor outputs that resulted from the drive signal, with the same key. The control circuitry also can also encrypt the nonce-based value with a different key, and then combine this with the encrypted sensor output to generate the digital keystream that is uses in the conversion.

19 Claims, 49 Drawing Sheets

Related U.S. Application Data continuation of application No. 16/004,682, filed on Jun. 11, 2018, now Pat. No. 11,004,360.

(60) Provisional application No. 62/517,533, filed on Jun. 9, 2017.

(51) Int. Cl.
*G02F 1/1335* (2006.01)
*G02F 1/1343* (2006.01)
*H04L 9/06* (2006.01)
*H04L 9/08* (2006.01)
*G02F 1/1337* (2006.01)

(52) U.S. Cl.
CPC .... *G02F 1/134309* (2013.01); *G02F 1/13439* (2013.01); *H04L 9/0618* (2013.01); *H04L 9/0631* (2013.01); *H04L 9/0637* (2013.01); *H04L 9/0866* (2013.01); *G02F 1/133723* (2013.01); *H04L 2209/12* (2013.01)

(58) Field of Classification Search
CPC ............. G02F 1/133723; H04L 9/0618; H04L 9/0631; H04L 9/0637; H04L 9/0866; H04L 2209/12; H04L 9/0656
USPC ...................................................... 713/189
See application file for complete search history.

(56) References Cited

U.S. PATENT DOCUMENTS

| | | |
|---|---|---|
| 11,722,297 B2 | 8/2023 | Blasl |
| 2003/0103713 A1 | 6/2003 | Pan et al. |
| 2005/0265403 A1 | 12/2005 | Anderson et al. |
| 2009/0285395 A1* | 11/2009 | Hu .......................... H04L 9/001 380/263 |
| 2010/0103429 A1 | 4/2010 | Cottler |
| 2011/0246792 A1* | 10/2011 | Weingarten .............. G09C 1/00 713/193 |
| 2012/0226724 A1* | 9/2012 | Radwan .................. G06F 7/588 708/250 |
| 2014/0226813 A1* | 8/2014 | Heffner ............... H04L 63/0435 380/44 |
| 2016/0006570 A1 | 1/2016 | Falk et al. |
| 2016/0209648 A1 | 7/2016 | Haddick et al. |
| 2016/0241217 A1 | 8/2016 | Sazegar et al. |
| 2016/0283773 A1 | 9/2016 | Popovich et al. |

OTHER PUBLICATIONS

ISSN: 1063-7818, DOI: 10.1070/QE2015v045n04ABEH015720.
International Search Report, issued by International Searching Authority in International App. No. PCT/US2018/036837 on Oct. 24, 2018.
Written Opinion, issued by International Searching Authority in International App. No. PCT/US2018/036837 on Oct. 24, 2018.

\* cited by examiner

CONTROL CIRCUITRY FOR DATA SECURITY APPARATUS

CROSS-REFERENCE TO RELATED APPLICATIONS

This application is a continuation of U.S. Utility patent application Ser. No. 17/221,228 filed Apr. 2, 2021, which is a continuation of U.S. Utility application Ser. No. 16/004,682 filed Jun. 11, 2018 (now U.S. Pat. No. 11,004,360), which claims the benefit of priority from U.S. Provisional Patent Application No. 62/517,533 filed Jun. 9, 2017, the entire disclosures of which are all incorporated herein by this reference.

BRIEF DESCRIPTION OF THE DRAWING FIGURES

The drawings are included to provide a better understanding of the description below and are incorporated in and constitute a part of this specification. The drawings illustrate example implementations of the disclosure and, with the description, explain the principles of the disclosure.

FIG. 1A illustrates an example embodiment of first subcomponent 105 of analog component 100 showing a first layer.

FIGS. 1B, 1C, 1D, 1E, and 1F are cross-sections of the example illustrated in FIG. 1A.

FIG. 2A illustrates a second layer of the example embodiment.

FIGS. 2B, 2C, 2D, 2E, and 2F are cross-sections of the example illustrated in FIG. 2A.

FIG. 3A illustrates a third layer of the example embodiment.

FIGS. 3B, 3C, 3D, 3E, and 3F are cross-sections of the example illustrated in FIG. 3A.

FIG. 4A illustrates a fourth layer of the example embodiment.

FIGS. 4B, 4C, 4D, 4E, and 4F are cross-sections of the example illustrated in FIG. 4A.

FIG. 5A illustrates a fourth layer of the example embodiment.

FIGS. 5B, 5C, 5D, 5E, and 5F are cross-sections of the example illustrated in FIG. 5A.

FIG. 6A illustrates a fourth layer of the example embodiment.

FIGS. 6B, 6C, 6D, 6E, and 6F are cross-sections of the example illustrated in FIG. 6A.

FIG. 7A illustrates a fourth layer of the example embodiment.

FIGS. 7B, 7C, 7D, 7E, and 7F are cross-sections of the example illustrated in FIG. 7A.

FIG. 8A illustrates a fourth layer of the example embodiment.

FIGS. 8B, 8C, 8D, 8E, and 8F are cross-sections of the example illustrated in FIG. 8A.

FIG. 9A illustrates a fourth layer of the example embodiment.

FIGS. 9B, 9C, 9D, 9E, and 9F are cross-sections of the example illustrated in FIG. 9A.

FIG. 10A illustrates a fourth layer of the example embodiment.

FIGS. 10B, 10C, 10D, 10E, and 10F are cross-sections of the example illustrated in FIG. 10A.

FIG. 11A illustrates a fourth layer of the example embodiment.

FIGS. 11B, 11C, 11D, 11E, and 11F are cross-sections of the example illustrated in FIG. 11A.

Figure 13A:
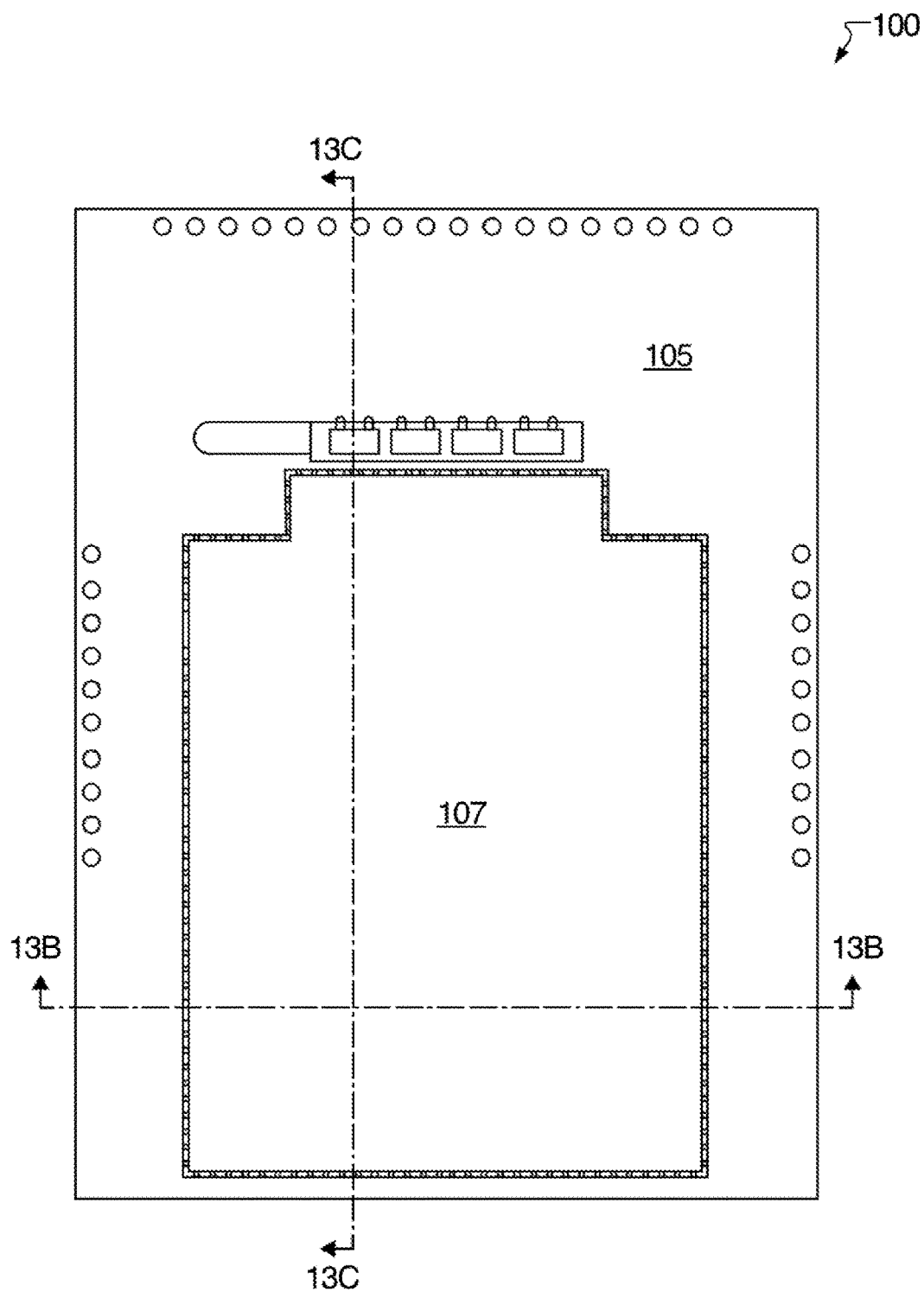

FIG. 13A shows a top view of an example embodiment of an assembled analog component 100 including the first subcomponent 105 and the second subcomponent 107.

Figure 13B:
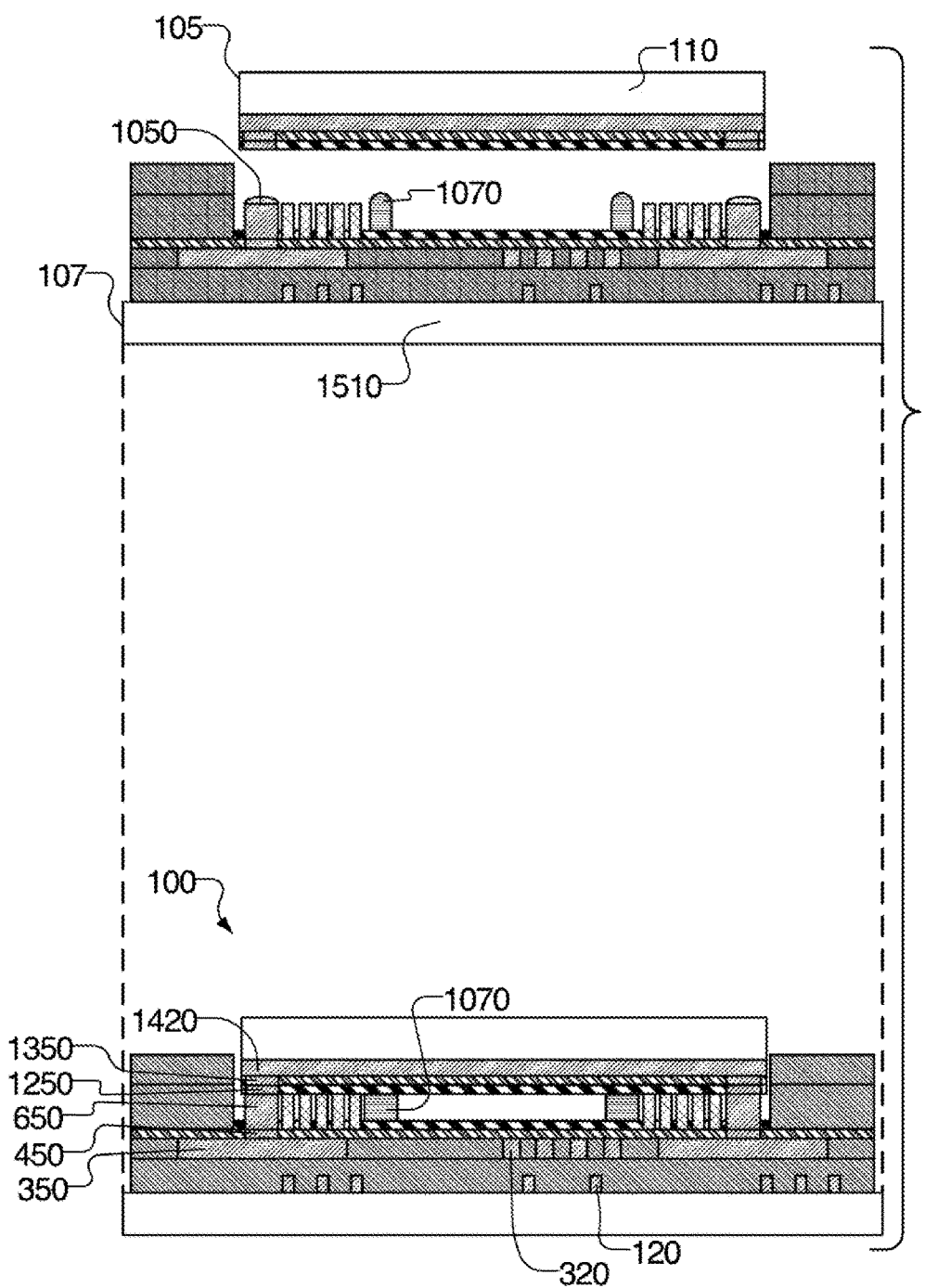
Figure 13C:
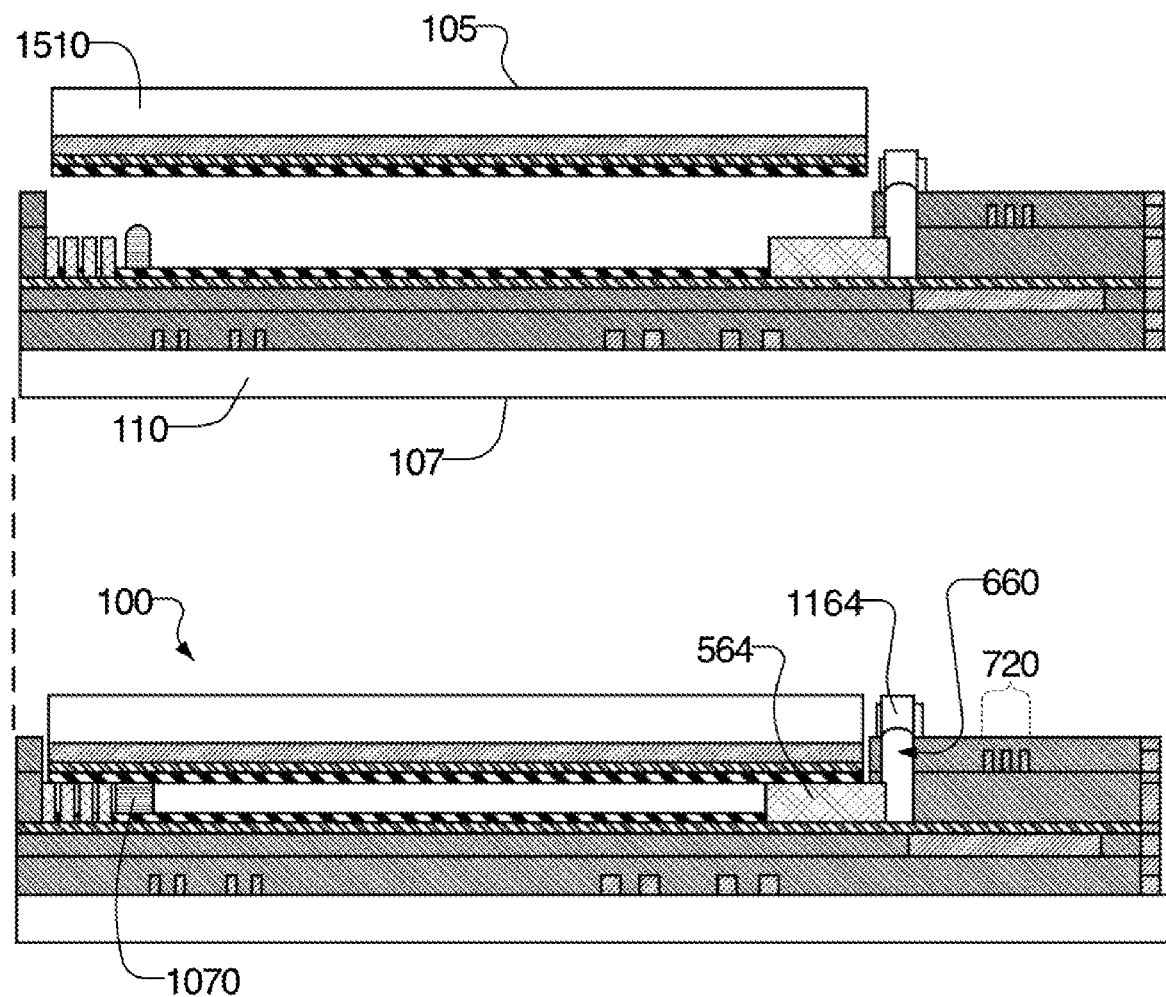

FIGS. 13B and 13C show cross-sections of the example illustrated in FIG. 13A.

Figure 11A:
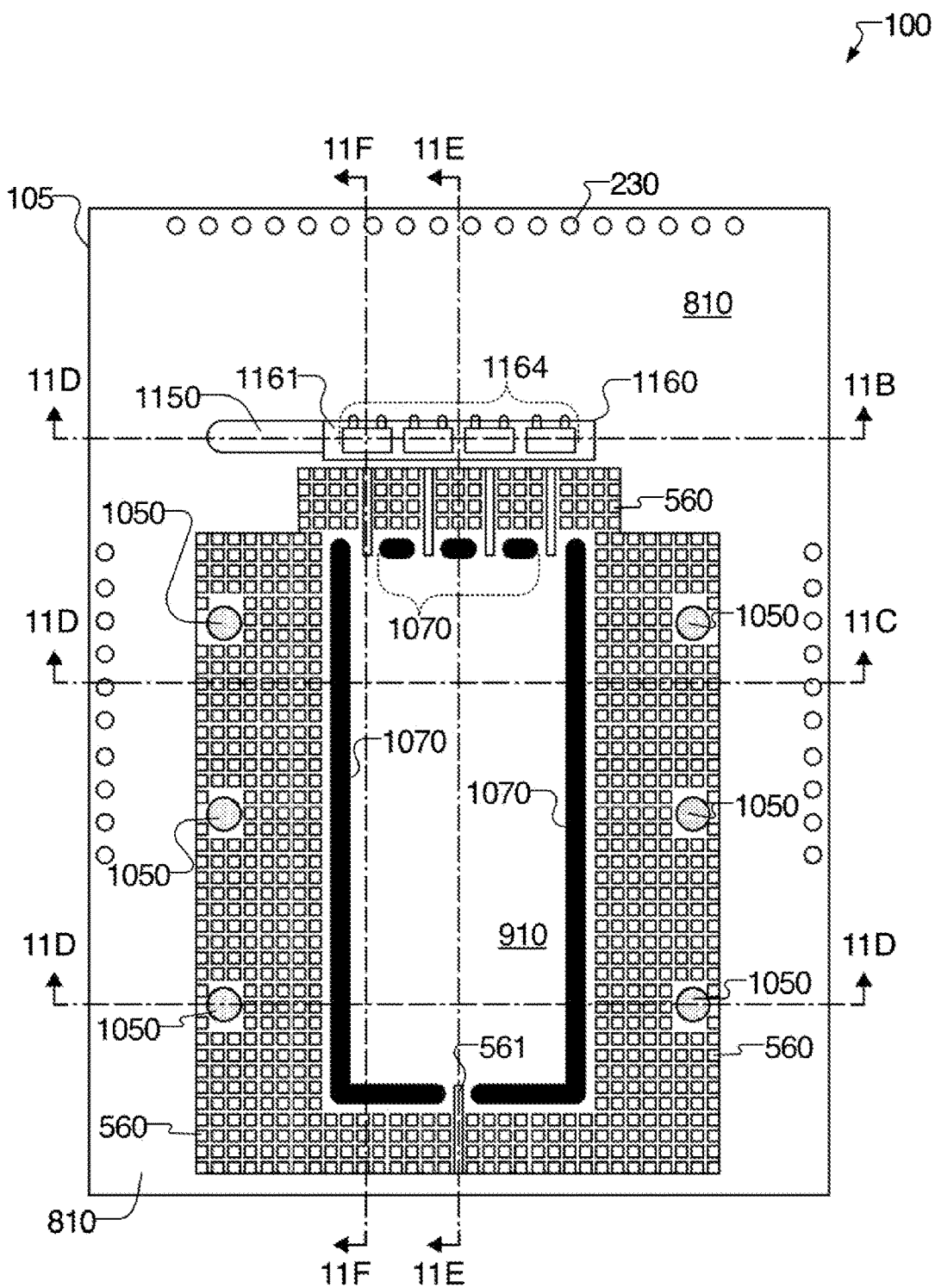
Figure 11B:
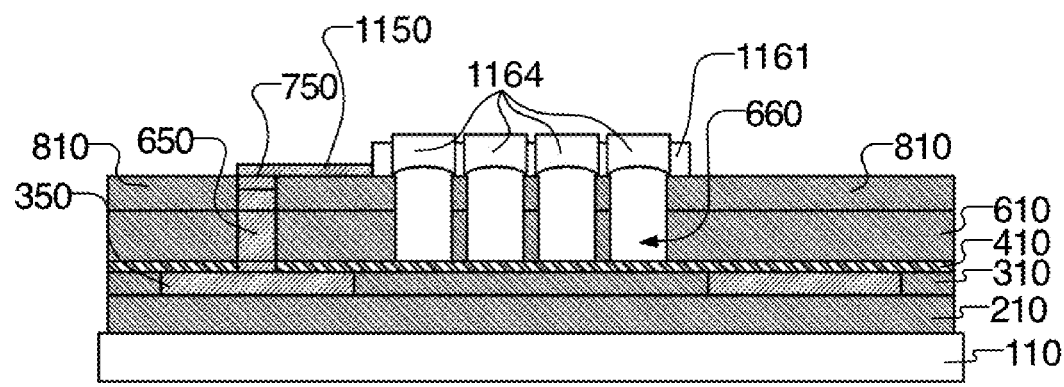
Figure 11C:
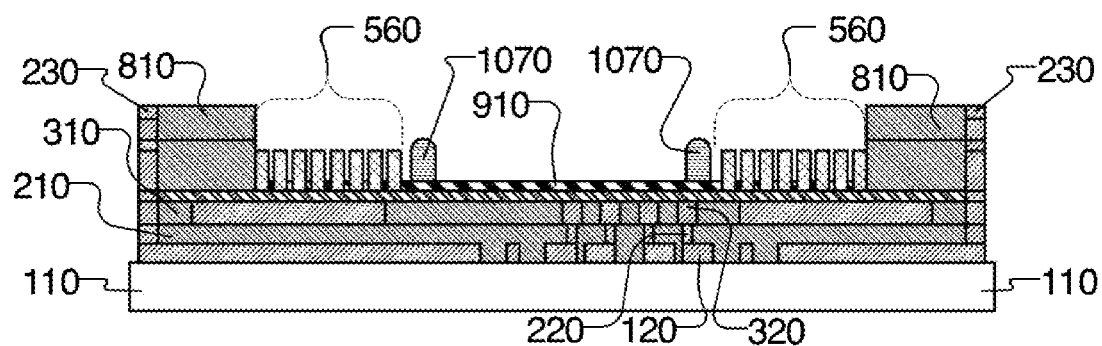
Figure 11D:
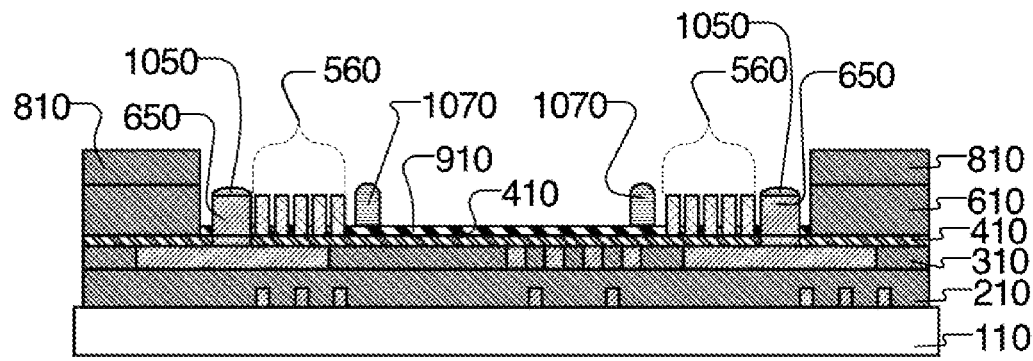
Figure 11E:
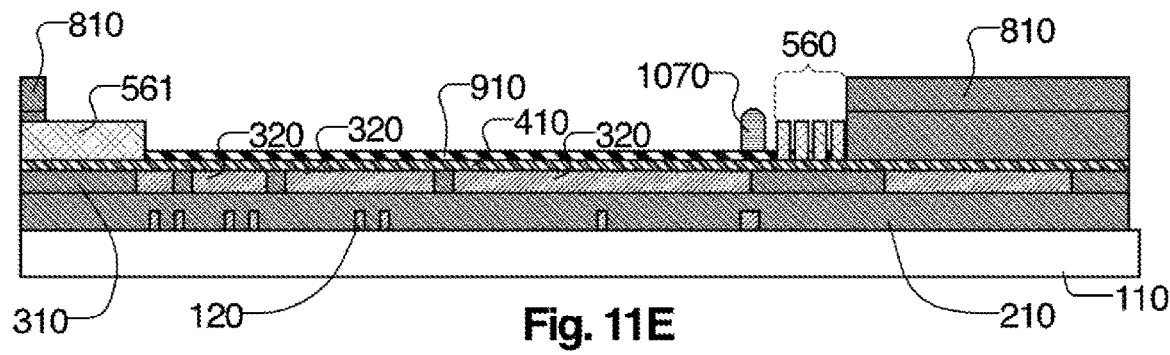
Figure 11F:
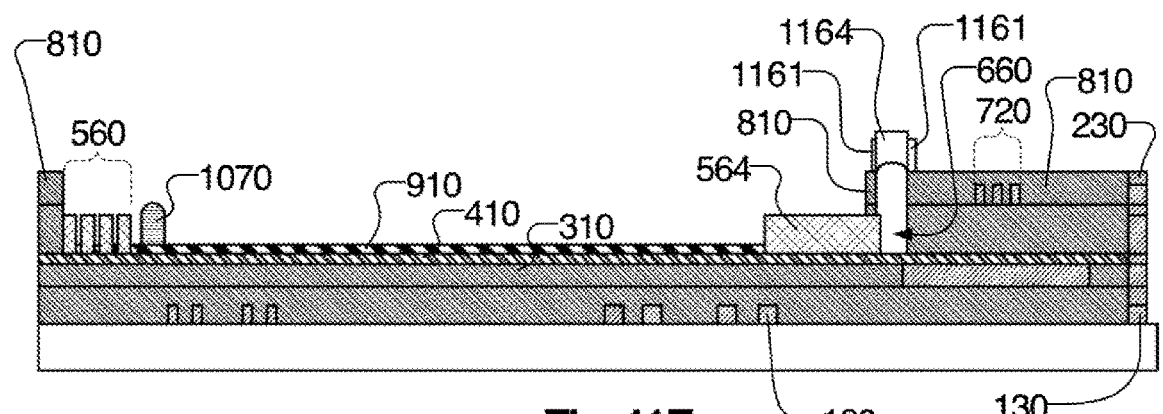
Figure 14A:
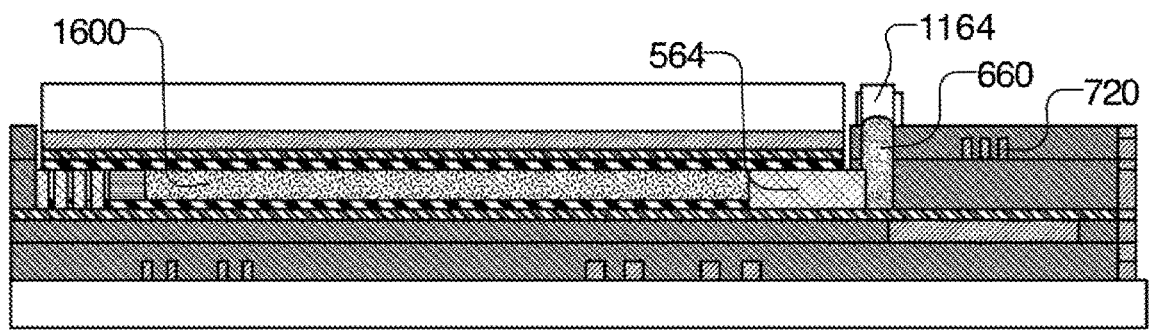

FIG. 14A shows an example embodiment similar to FIG. 11F as an assembled analog component 100.

Figure 14B:
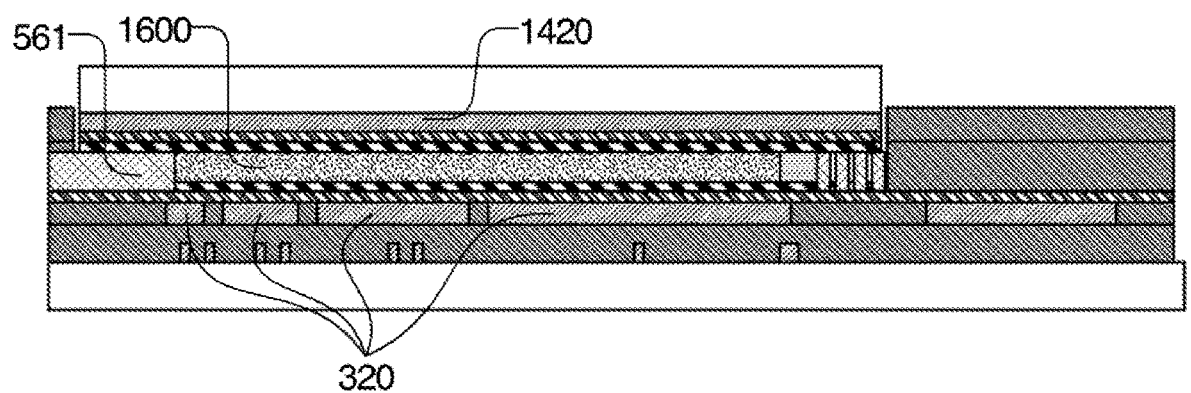

FIG. 14B shows an example embodiment similar to FIG. 11E as an assembled analog component 100.

Figure 15:
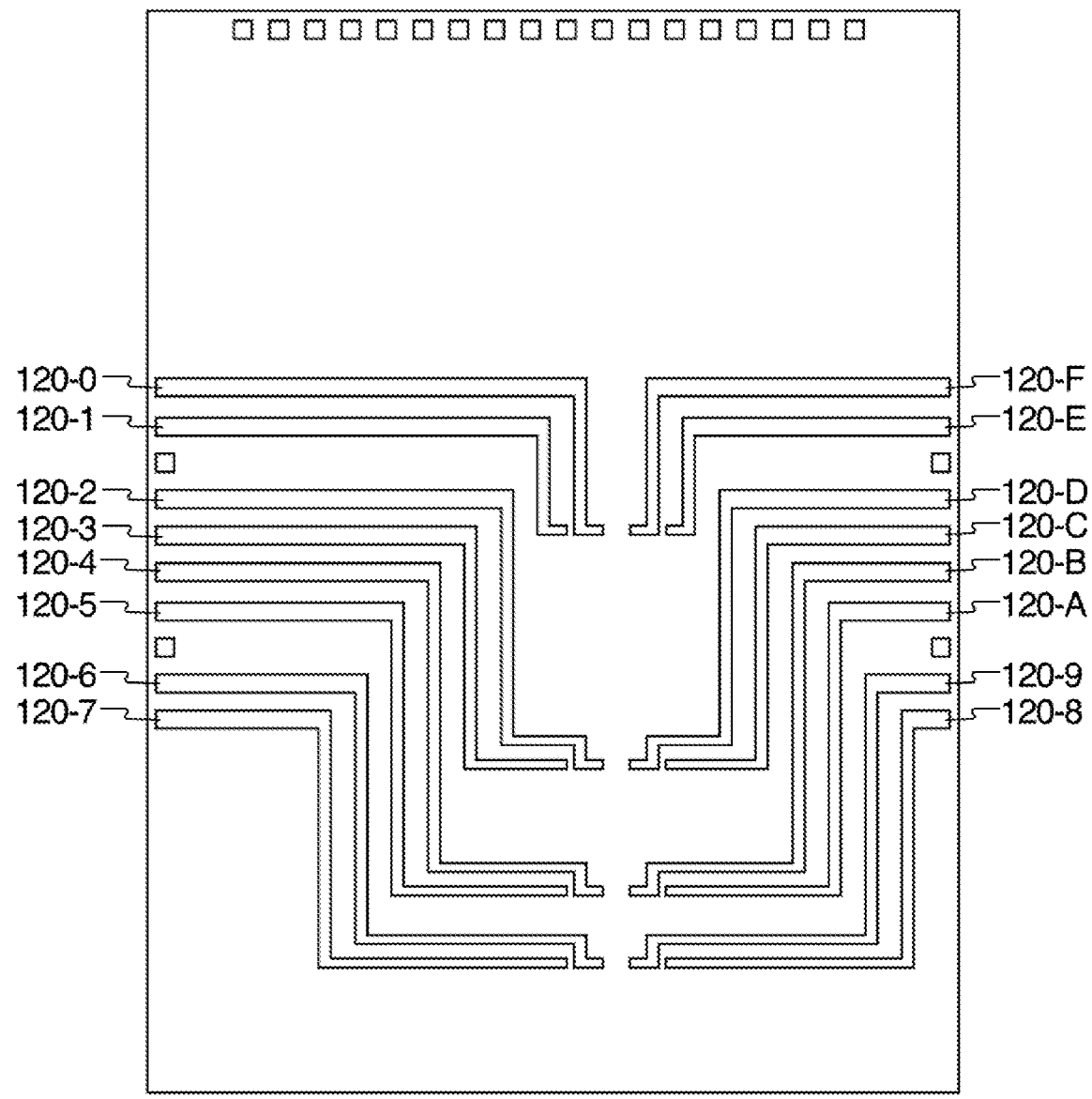

FIG. 15 shows first electrode signal lines 120 to explain an example operation.

Figure 16:
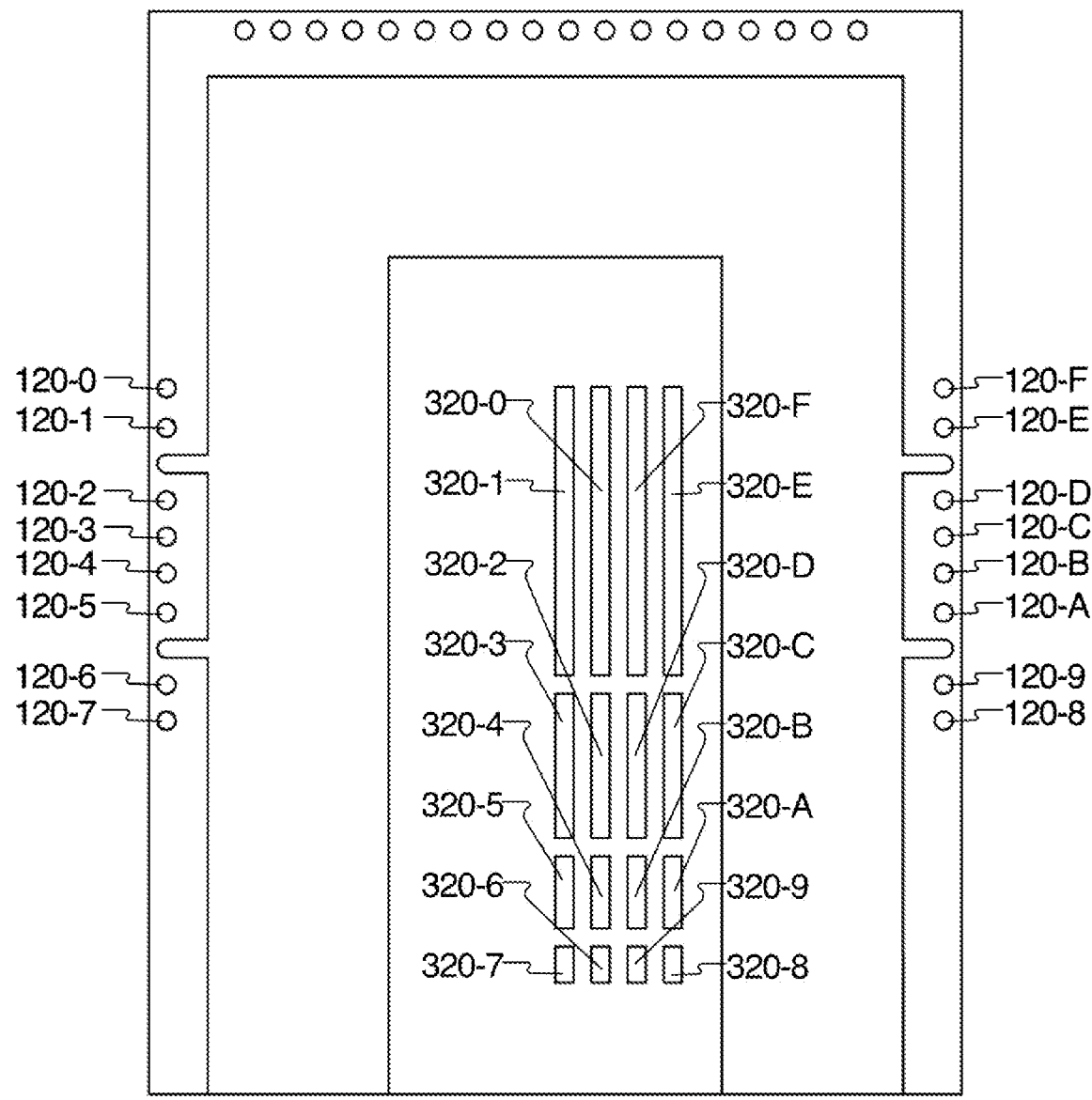

FIG. 16 shows first electrode signal lines 120 and first electrodes 320 to explain an example operation.

Figure 17:
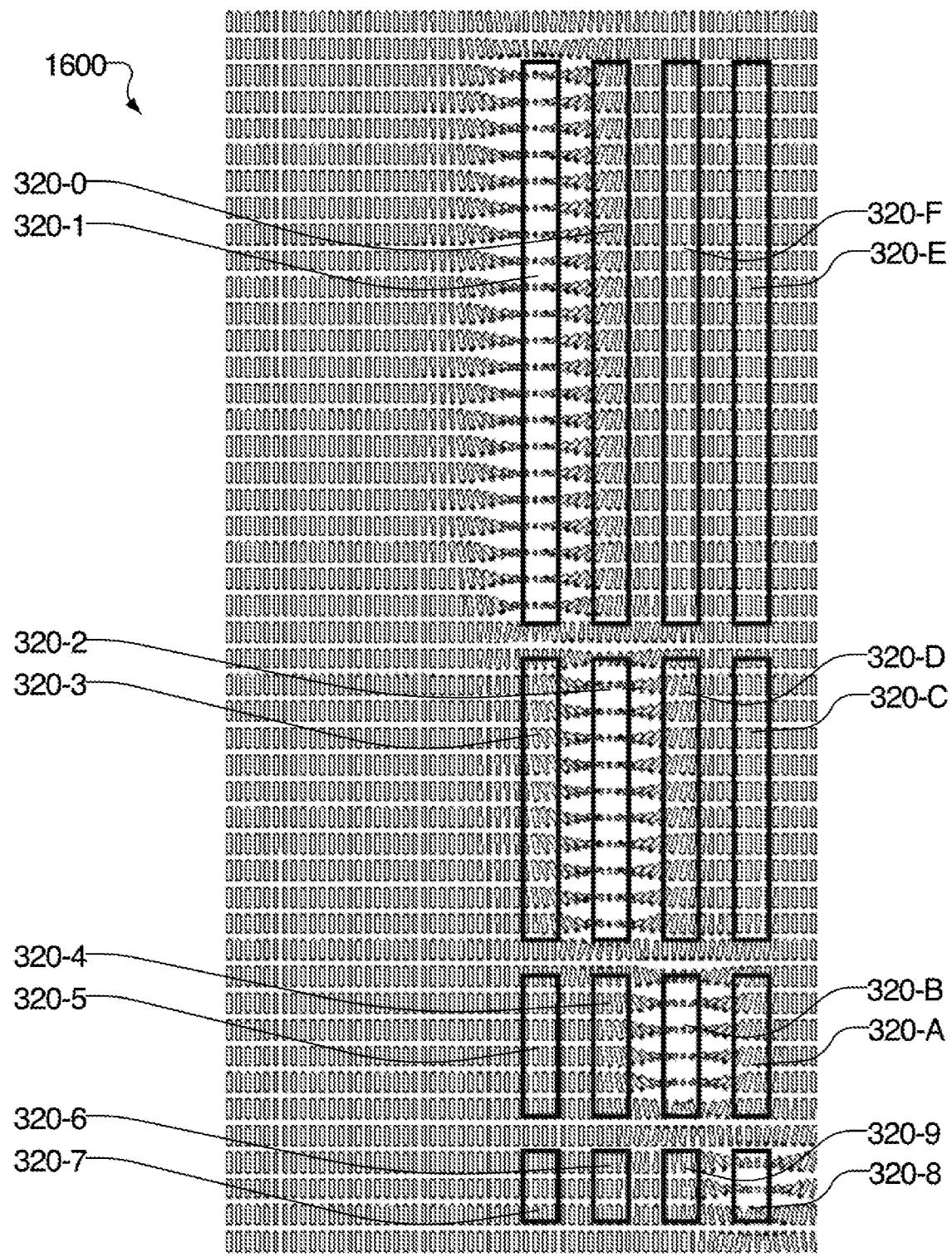

FIG. 17 illustrates an interior top view of a liquid crystal cell 1600 according to an example operation.

Figure 18:
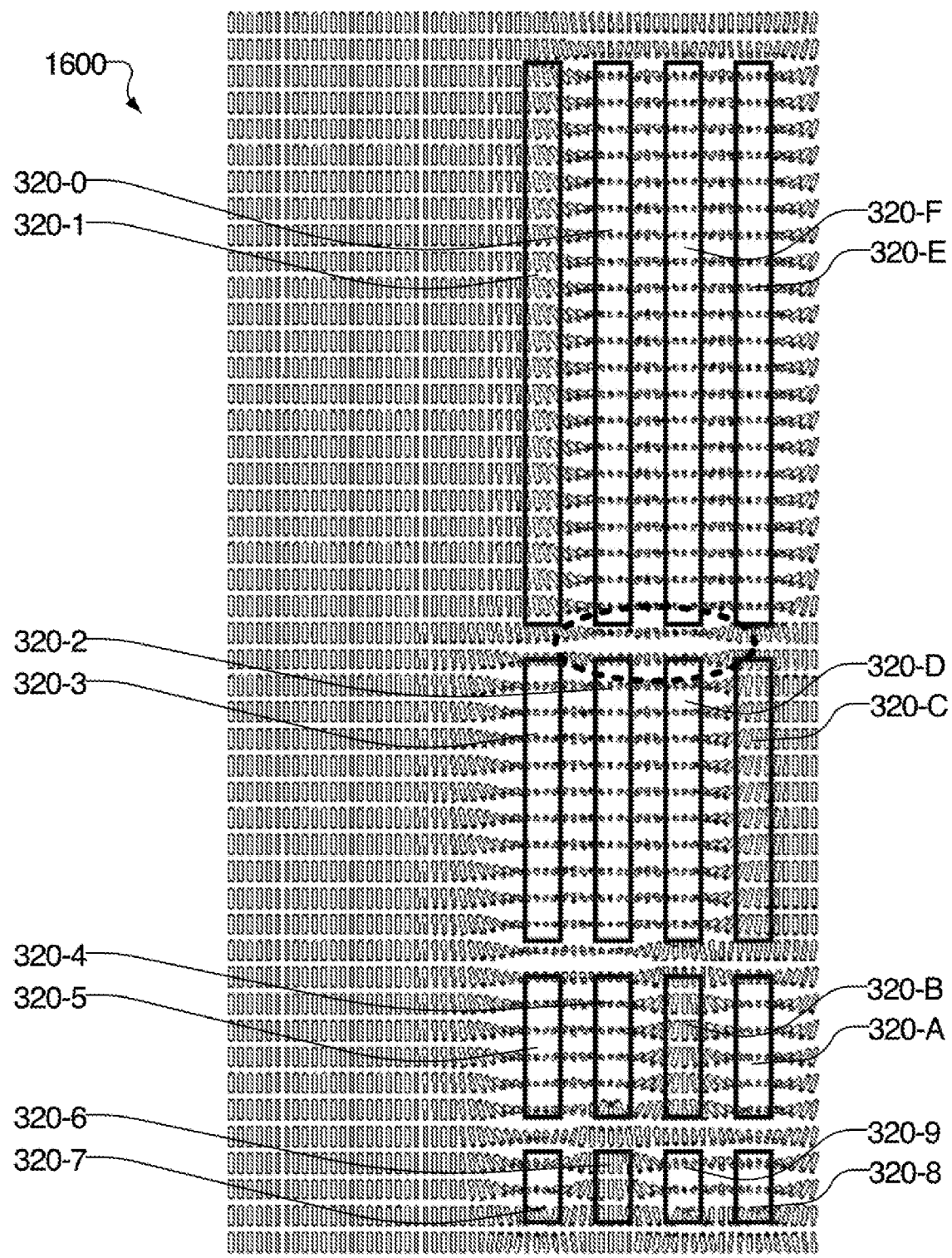

FIG. 18 illustrates an interior top view of a liquid crystal cell 1600 according to another example operation.

Figure 19A:
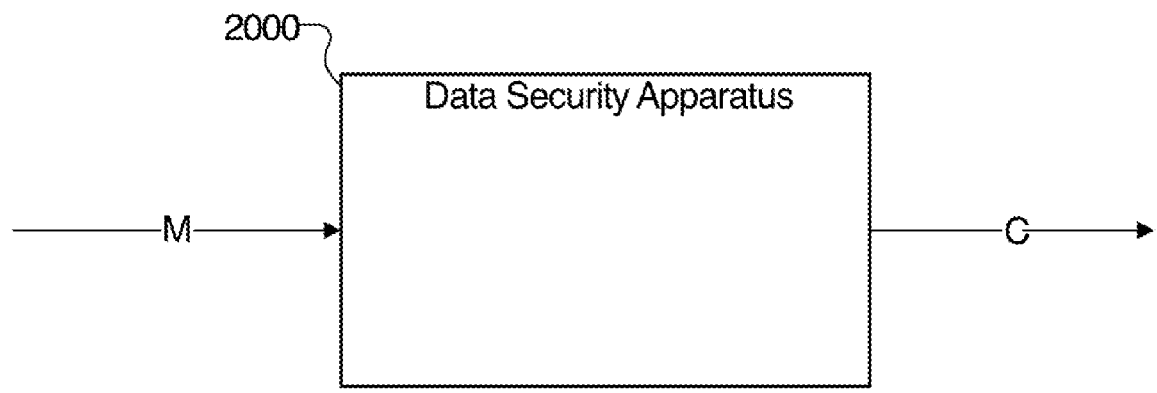

FIG. 19A illustrates a data security apparatus 2000 for performing an encryption operation.

Figure 19B:
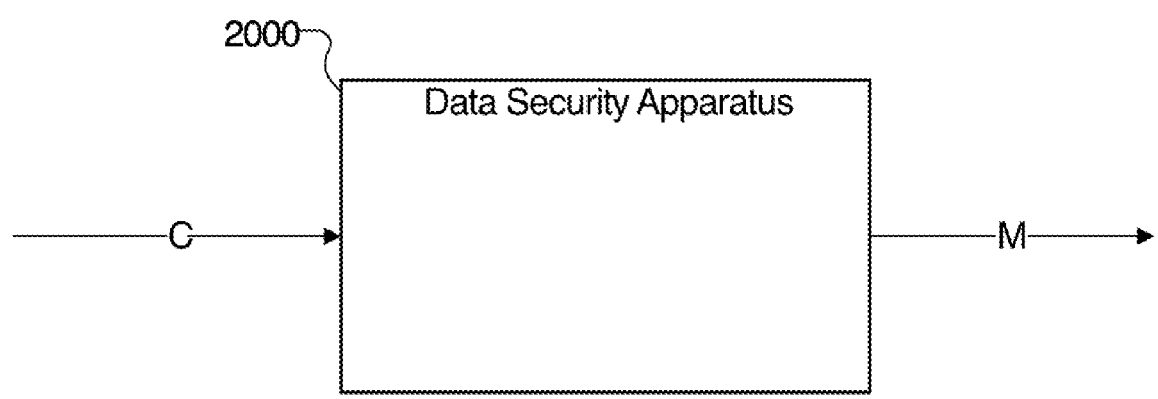

FIG. 19B illustrates a data security apparatus 2000 for performing a decryption operation.

Figure 20:
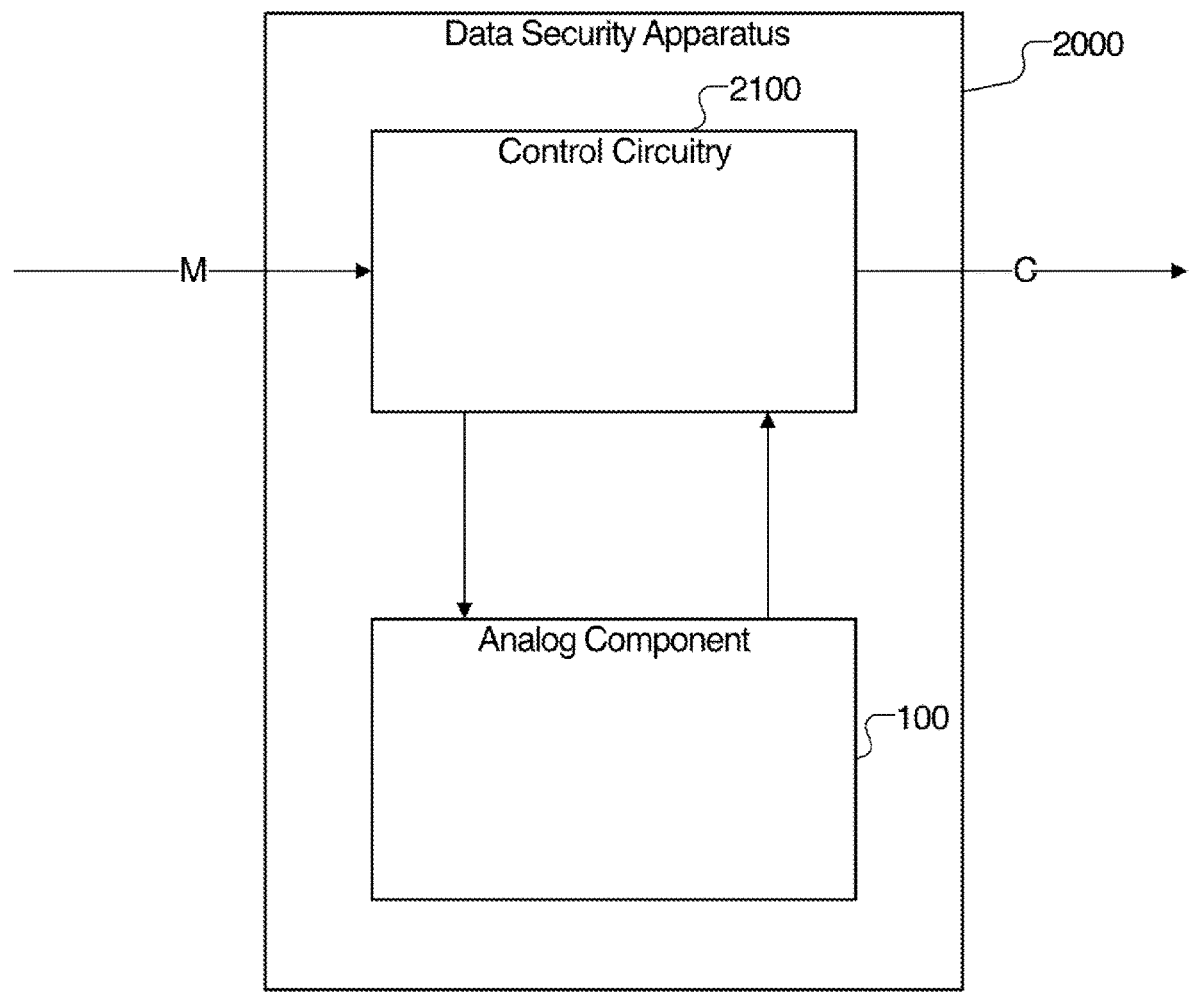

FIG. 20 illustrates the relationship between the control circuitry 2100 and the analog component 100 in an data security apparatus 2000.

Figure 21:
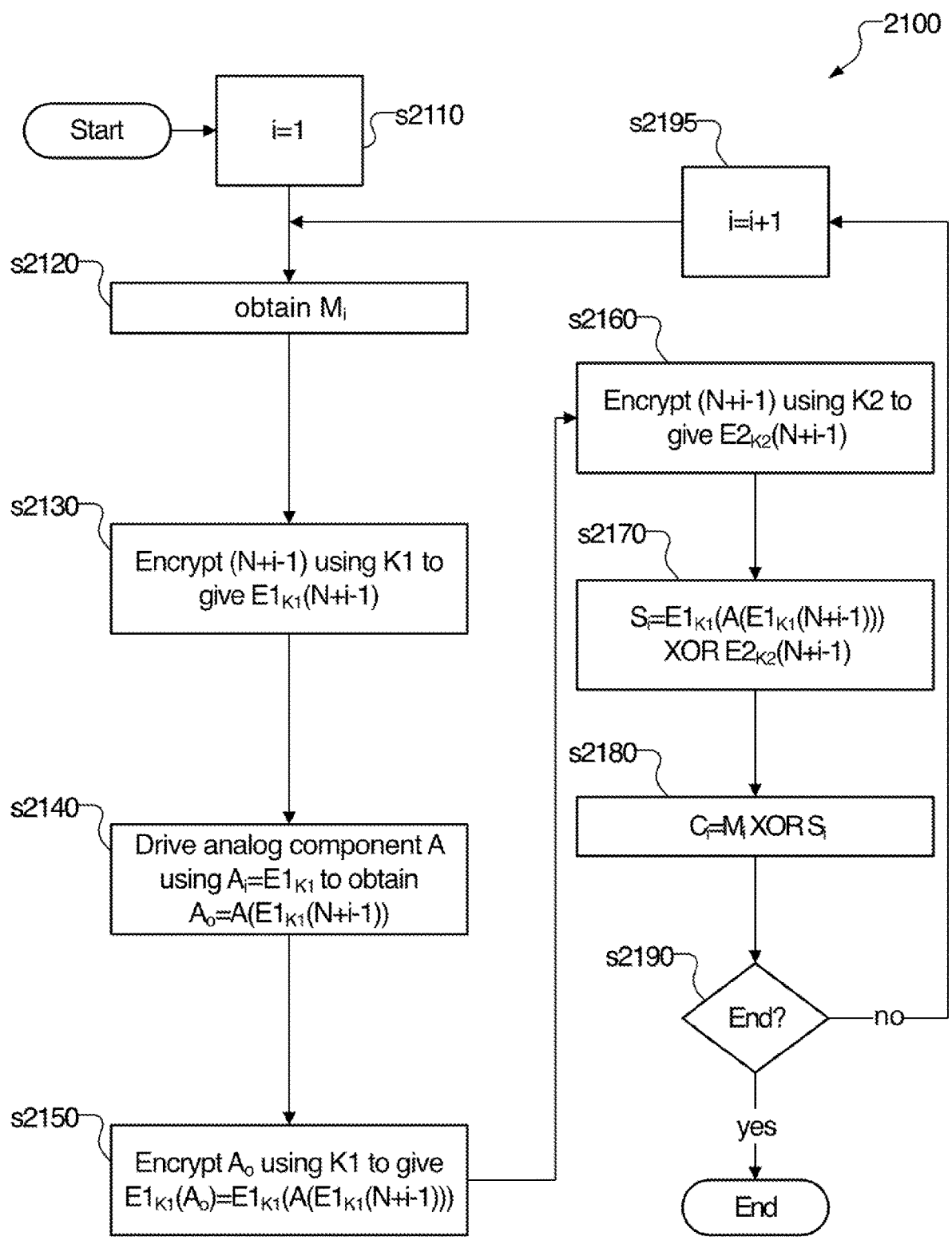

FIG. 21 depicts the flow of operations in control circuitry 2100 for encryption operations according to an example embodiment.

Figure 22:
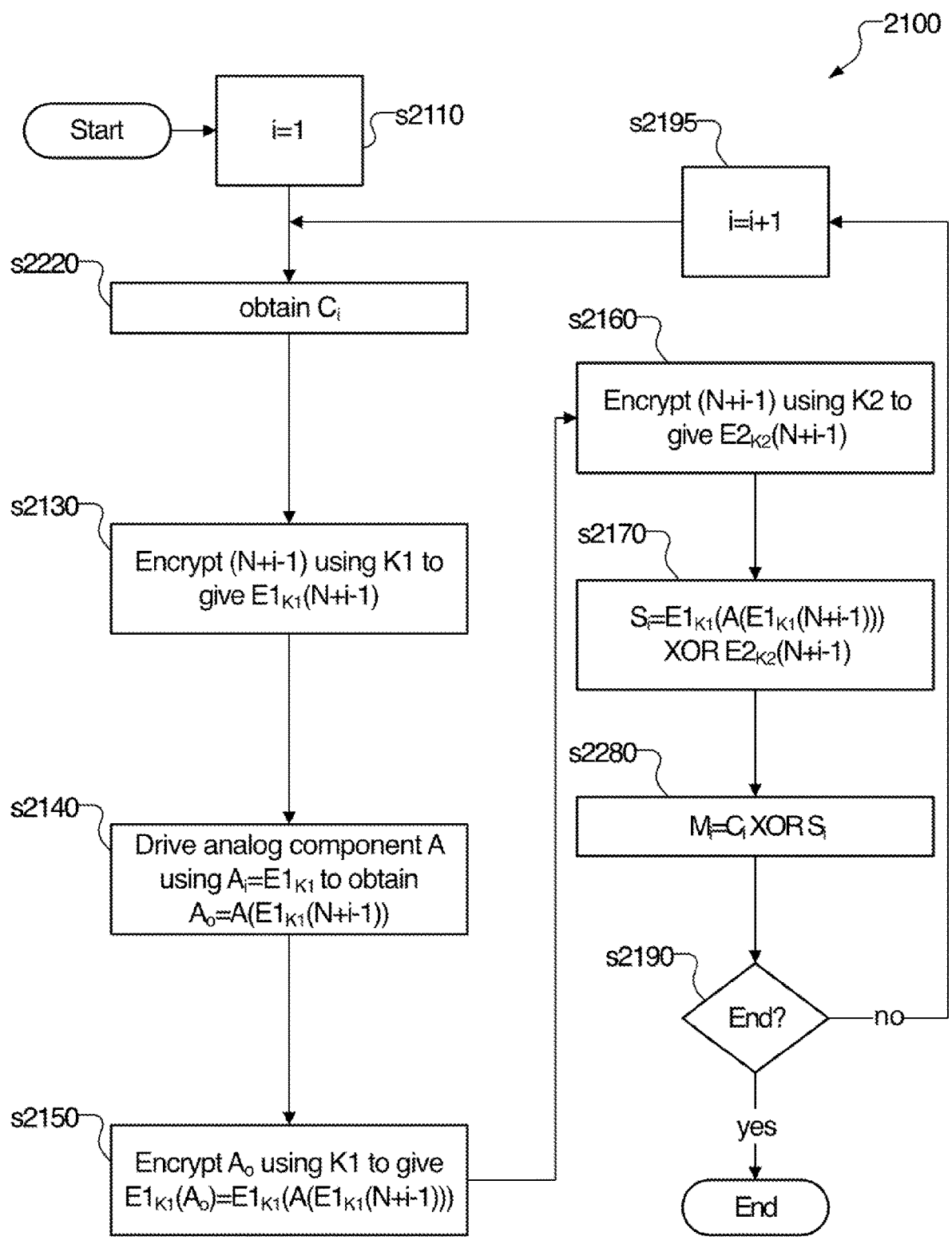

FIG. 22 depicts the flow of operations in control circuitry 2100 for decryption operations according to an example embodiment.

Figure 23:
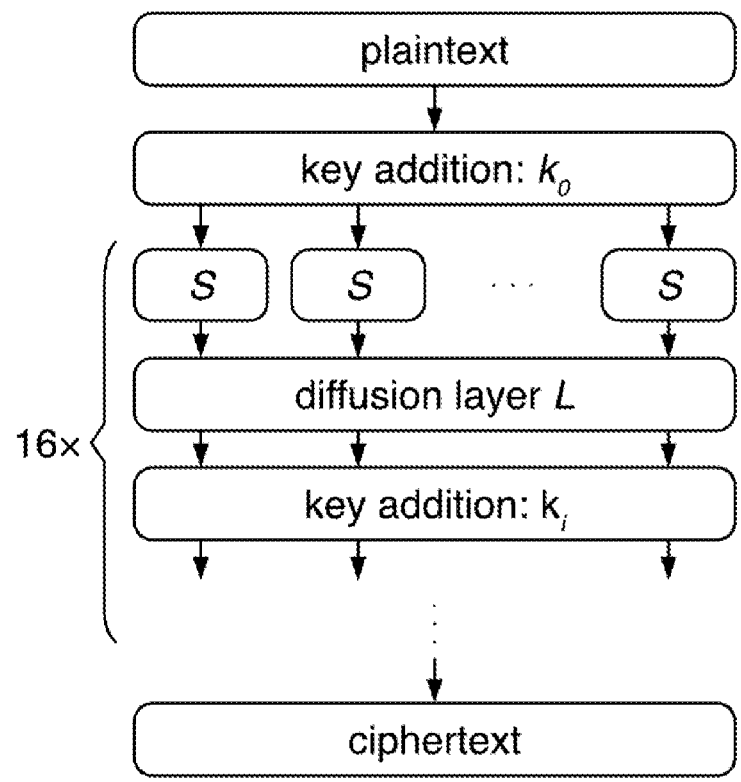

FIG. 23 shows the overall structure of example block cipher E1 as a 16-round substitution-permutation network, and as well variant block cipher E2.

Figure 24:
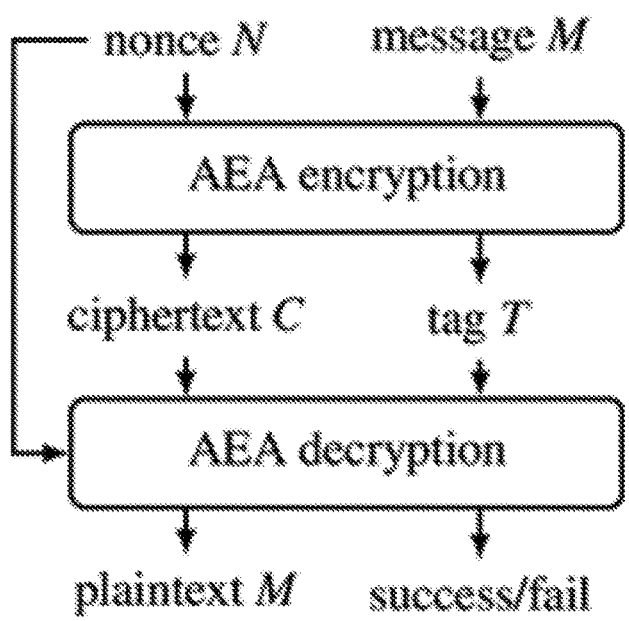

FIG. 24 illustrates the operation of an authenticated encryption (AE) scheme.

Figure 25:
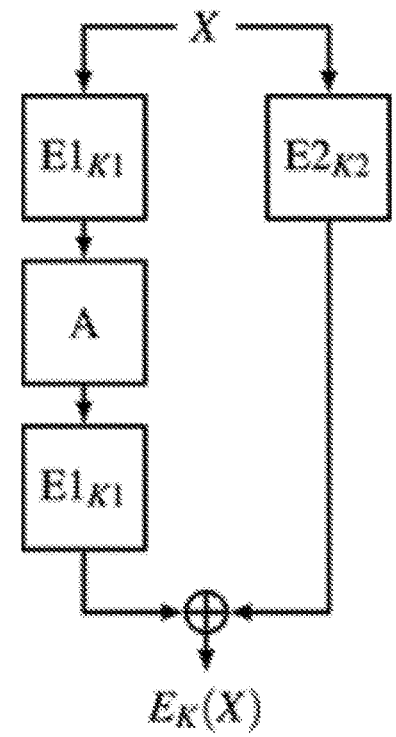

FIG. 25 illustrates the construction of a function $E_K$ using block ciphers according to an example embodiment.

Figure 26:
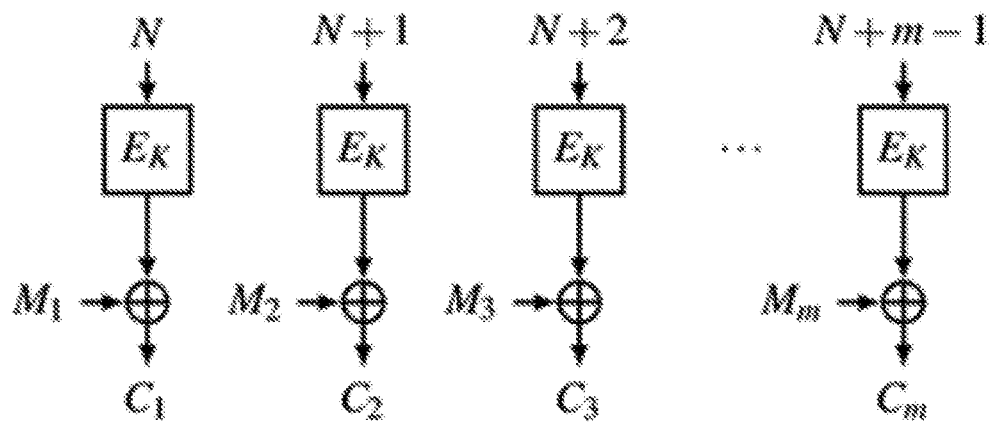

FIG. 26 illustrates a counter mode of operation for encryption according to an example embodiment.

Figure 27:
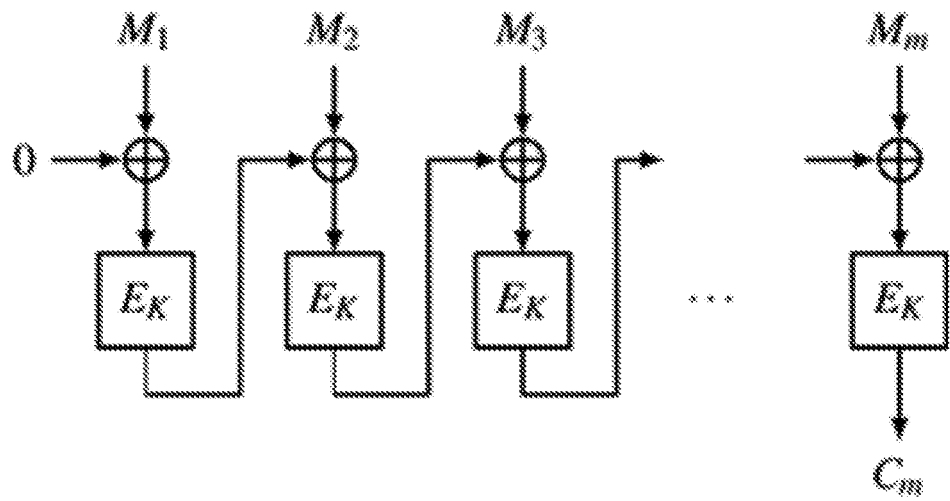

FIG. 27 illustrates a message authentication code mode of operation according to an example embodiment.

Figure 28:
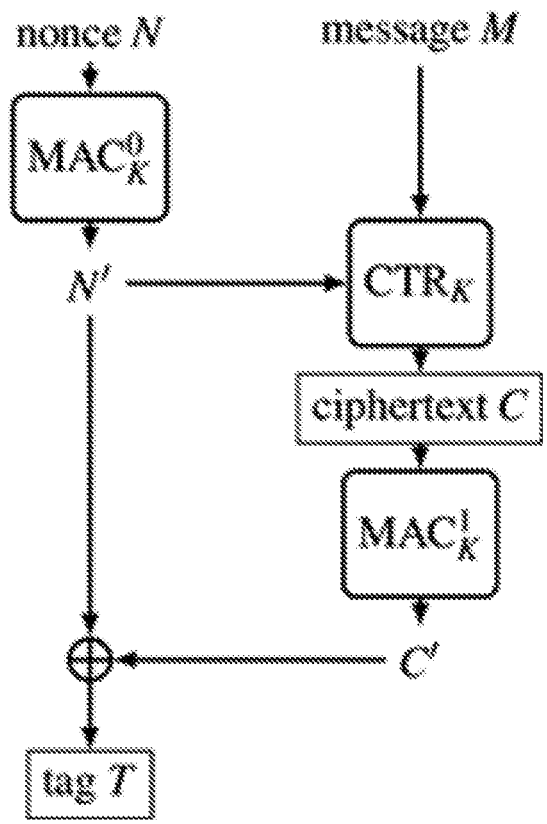

FIG. 28 illustrates an overall AEA encryption mode according to an example embodiment.

DESCRIPTION

A data security apparatus includes an analog component. The analog component operates internally with a high degree of entropy. This high degree of entropy resides in the interactions between its internal components in response to an external driving signal. The interactions within the analog component have a level of entropy that is high enough to make digital simulation of the analog component impractical. Because the analog components described below are impractical to digitally simulate, they are referred to as digitally unclonable.

The analog components described below receive an input and generate an output based on the input. If two analog components are made in the same way, they will generate the same output in response to identical inputs. The way an analog component generates outputs from inputs is referred to as a signature of the analog component.

A data security apparatus processes data by encrypting plaintext data into ciphertext and/or decrypting data from ciphertext into plaintext. Part of the conversion between plaintext and ciphertext uses the analog component. Since the analog component is digitally unclonable (that is, impractical to digitally simulate), the part of the conversion process that uses the analog component requires possession of the analog component itself or the possession of another analog component that has the same signature.

The signature of a given analog component or of a given set of analog components is, in various example embodiments, modified by adjustments to the fabrication process. The adjustments are readily and inexpensively applied, as explained below. The signature, in other example embodiments, is modified outside the fabrication of the analog component.

The data security apparatus described below is a throughput encryption and decryption system that is equally applicable to data in transit as data at rest.

The inventors, through simulation studies, have determined that the decryption of only one cycle of data would require two years of processing with a high-performance digital cluster. The next cycle of data would require an additional two years. This is a function of the high level of entropy discussed above and elaborated below. Furthermore, quantum computing is not expected to reduce the impracticality of digitally simulating the function of the analog component.

The data security apparatus generally has an analog component and a driving component. The analog component is described first, and the driving component afterward.

Analog Component

Figure 1A:
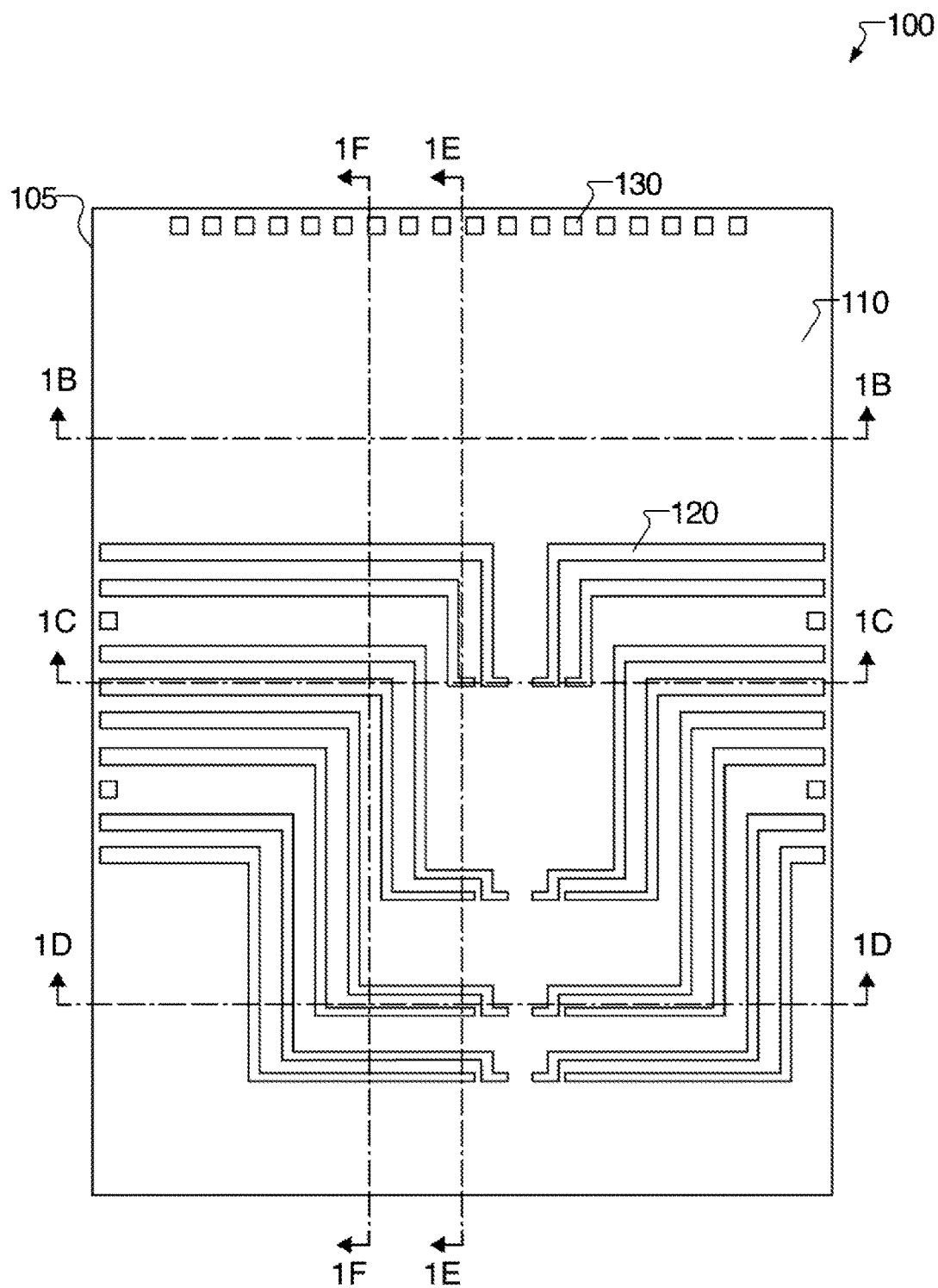
Figure 1B:
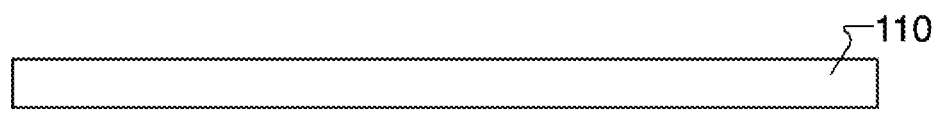
Figure 1C:
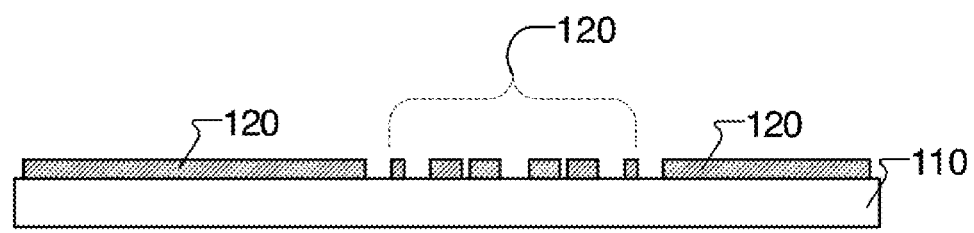
Figure 1D:
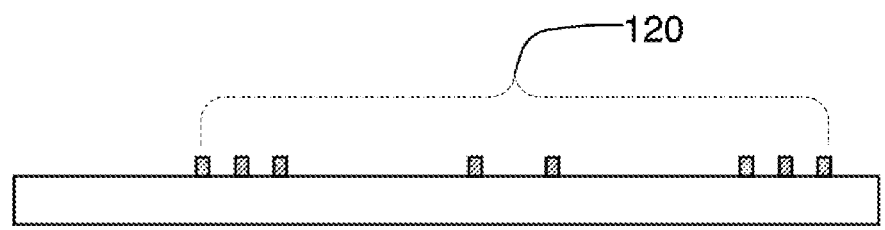
Figure 1E:
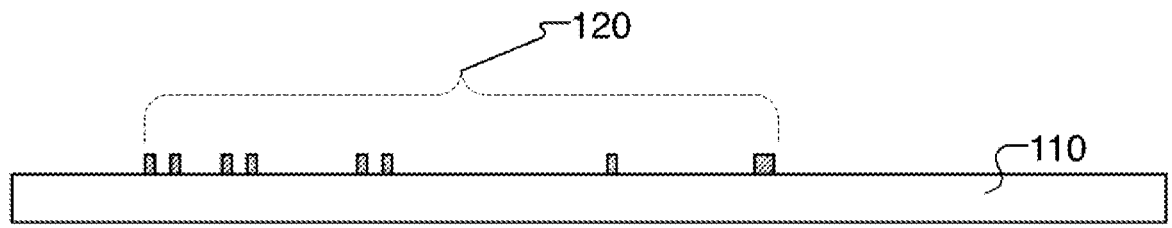
Figure 1F:
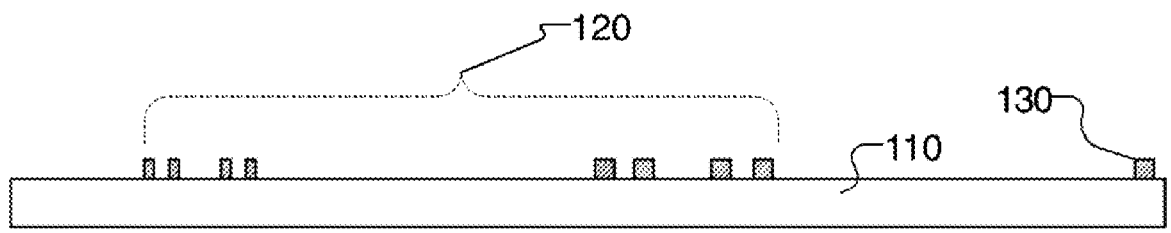

FIGS. 1A through 1B represent an example embodiment of an analog component 100 for use in a data security apparatus. This example embodiment is a teaching embodiment provided to teach the principles of the inventive concept. Many modifications, alterations, changes, improvements, and alternatives will occur to those familiar with this field, and all are considered to be within the ambit of the inventive concept described herein. The boundaries of the inventive concept are set forth in the appended claims. In addition, unless stated to the contrary, any known fabrication technique for constructing the structures shown in FIGS. 1A through 13C may be used in accordance with the particulars of the equipment available and the materials selected.

FIGS. 1A through 1F show in part an apparatus referred to below as analog component 100. In these drawings, first subcomponent 105 is shown built over first substrate 110. First substrate 110 is, in this example embodiment a silicon-on-insulator substrate. In other example embodiments a dielectric layer is provided prior to adding any structures made of conductive material. First substrate 110 includes several pads 130 which are conductive. Some of the pads 130 are integral with first electrode signal lines 120 which are also conductive. These drawings show sixteen of the first electrode signal lines 120. In other example embodiments the number of first electrode signal lines 120 is sixty-four or one hundred twenty-eight. Here, the term "first" is used not to imply any order of fabrication but only to discriminate them from other signal lines described later.

Figure 2A:
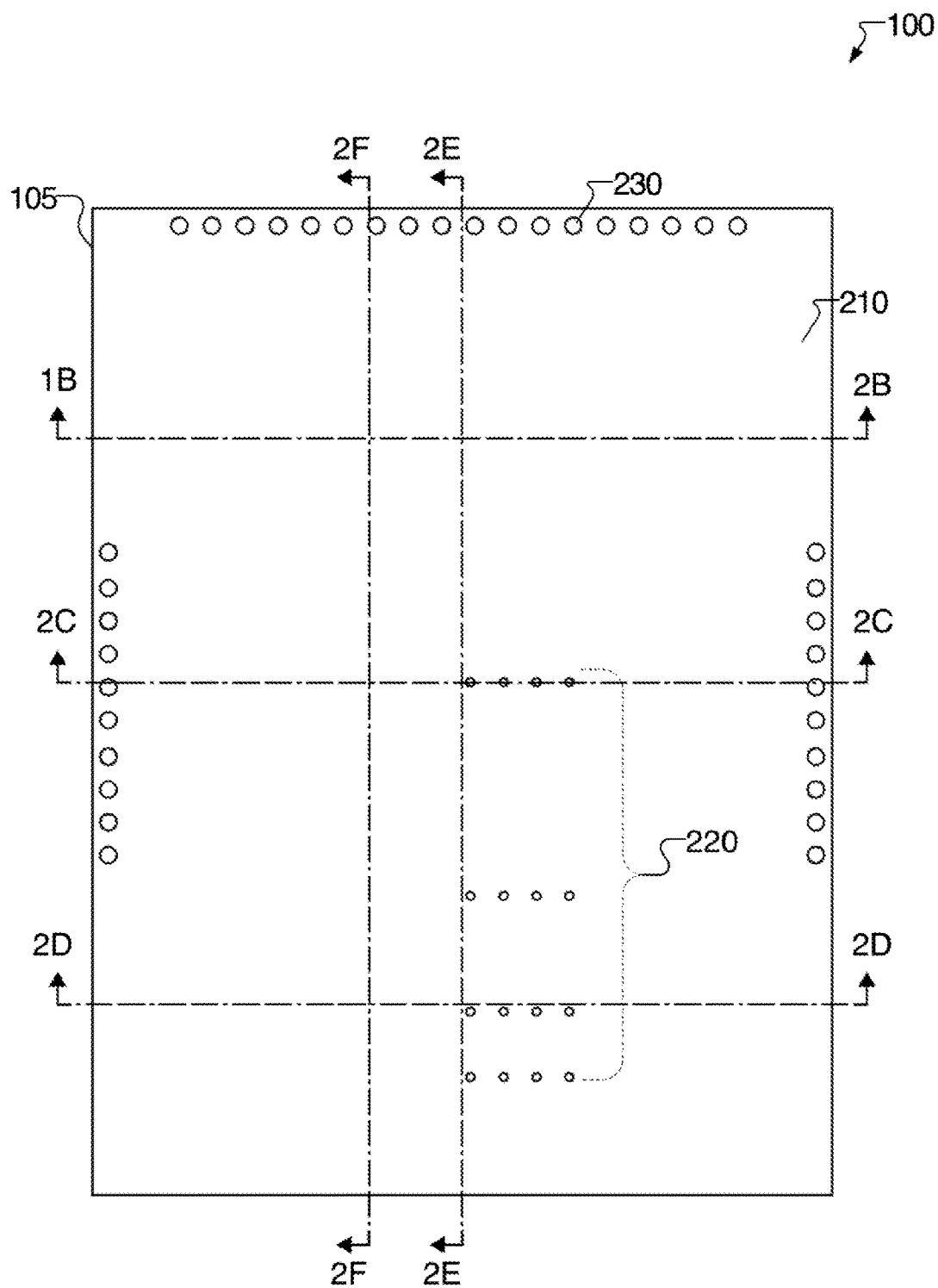
Figure 2B:
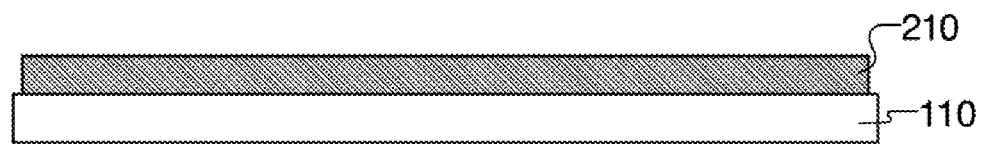
Figure 2C:
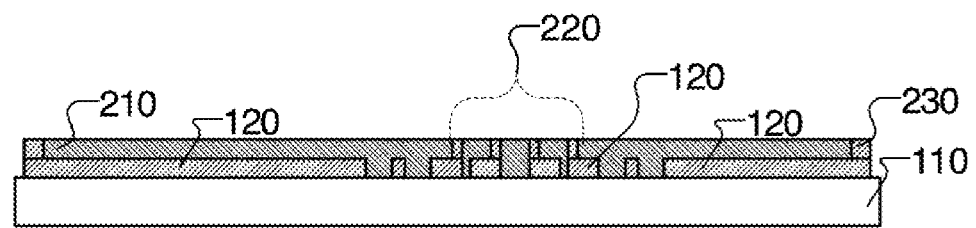
Figure 2D:
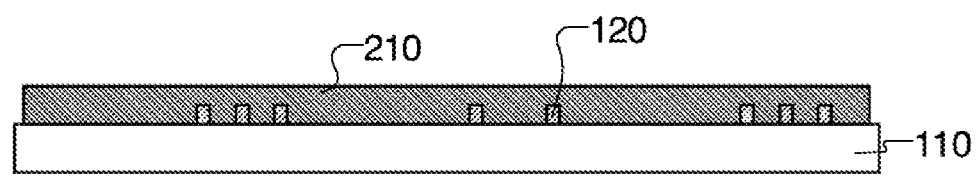
Figure 2E:
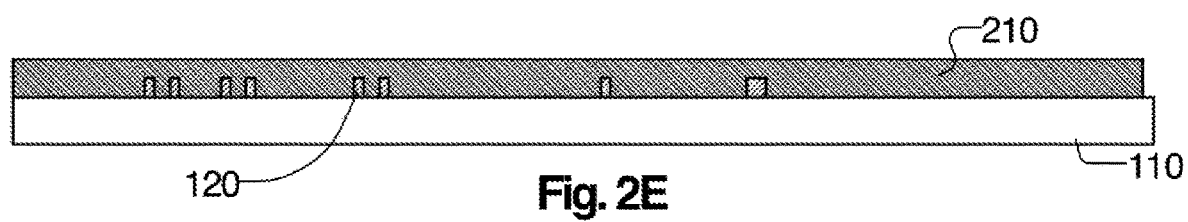
Figure 2F:
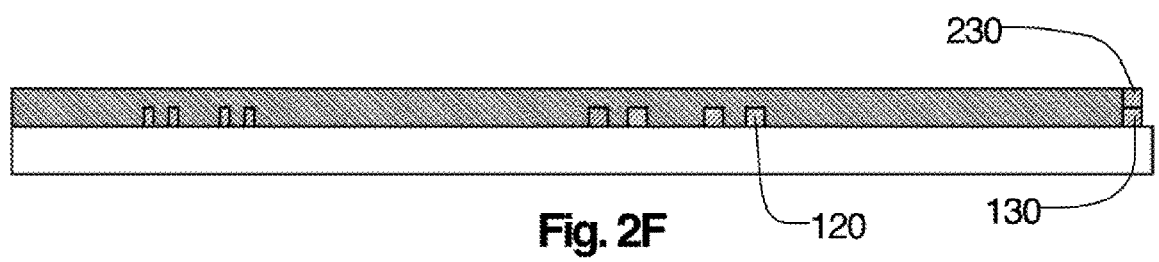

FIGS. 2A through 2F show in part first dielectric layer 210 over the arrangement drawn in FIGS. 1A through 1F. Signal line vias 220 are filled with conductive material so as to extend the first electrode signal lines 120. The pads 130 are similarly extended by the pad extensions 230. The example embodiment has sixteen of the signal line vias 220, one for each of the first electrode signal lines 120. FIG. 2C shows that the signal line vias 220 are in direct contact with the first electrode signal lines 120. This arrangement is not strictly necessary, and other, intermediate components may be interposed.

FIGS. 3A through 3F show in part a third layer of the first subcomponent 105 of the analog component 100. The third layer includes ground plane 350 formed of conductive material, first electrodes 320 formed of conductive material, and second dielectric layer 310 formed of insulating material. Some of the pads 130, extended by way of pad extensions 230, are grounded pads 330 because they are electrically connected to the ground plane 350.

Figure 3A:
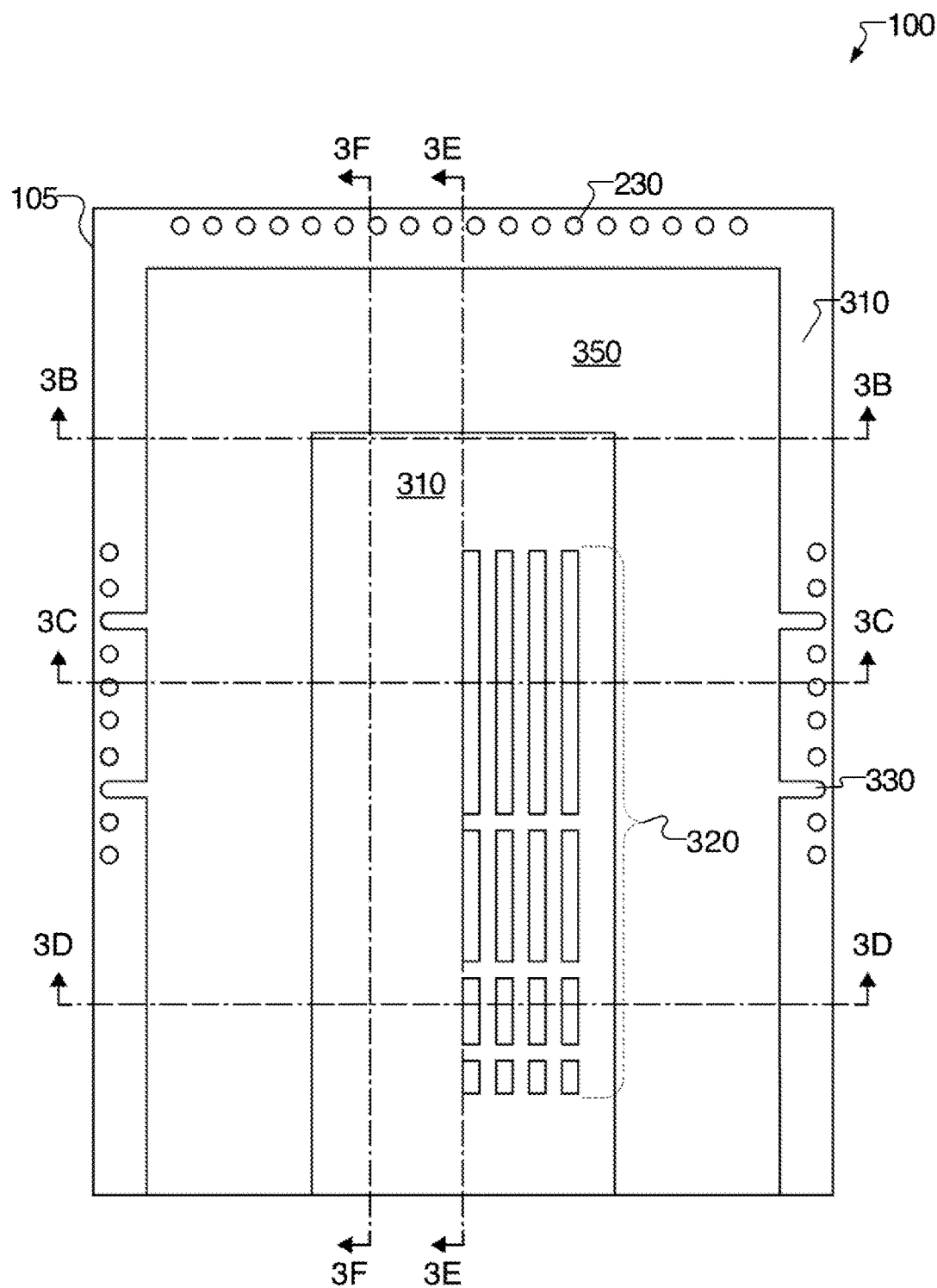
Figure 3B:
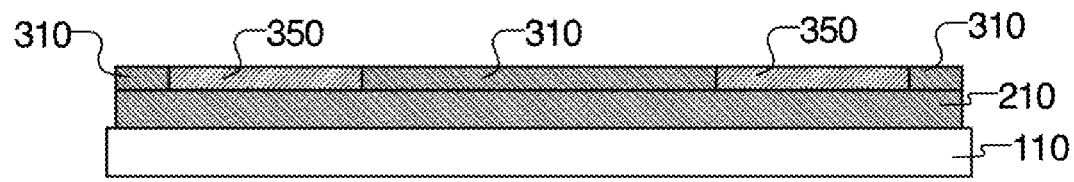

In the example embodiment drawn in FIG. 3A, ground plane 350 defines an interior area in which first electrodes 320 are formed. In the example embodiment drawn in FIG. 3A, the first electrodes 320 are all formed over on one side of the interior area and the other side of the interior area is free of electrodes.

FIG. 3A also shows that the first electrodes 320 are formed in rows and columns. The length of the first electrodes 320 varies in dimension from row to row, as in the cross-section drawn in FIG. 3E. The width and depth of the first electrodes 320 is uniform from column to column, as in the cross-section drawn in FIG. 3D. Referring to FIG. 3A, with respect to any given two electrodes in different rows, it may be said that a first one of the electrodes has a first dimensional value in a first direction and a second one of the electrodes has a second dimensional value in that same first direction (i.e., in the direction along the cross-section shown in FIG. 3E), and the first dimensional value is different from the second dimensional value. In other words, the length of the first electrodes 320 varies, or the width, or the depth.

In the example shown in FIGS. 3A through 3F, the length of the first electrodes 320 doubles with each row starting at the row nearest the bottom of the drawing. Other dimensional variations are possible and constitute alternative example embodiments within the inventive concept.

Figure 3C:
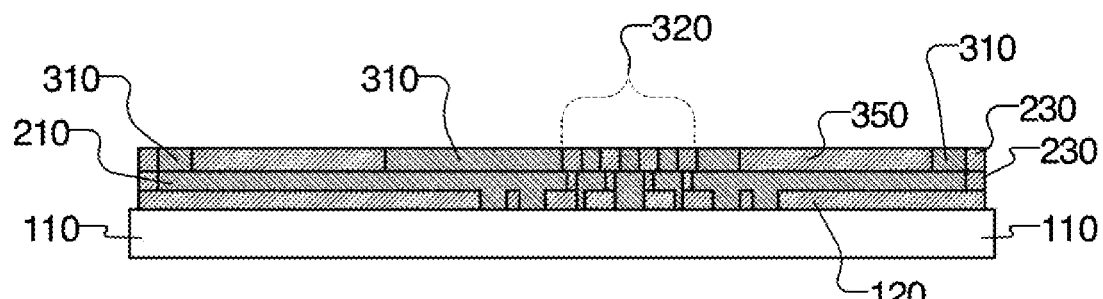
Figure 3D:
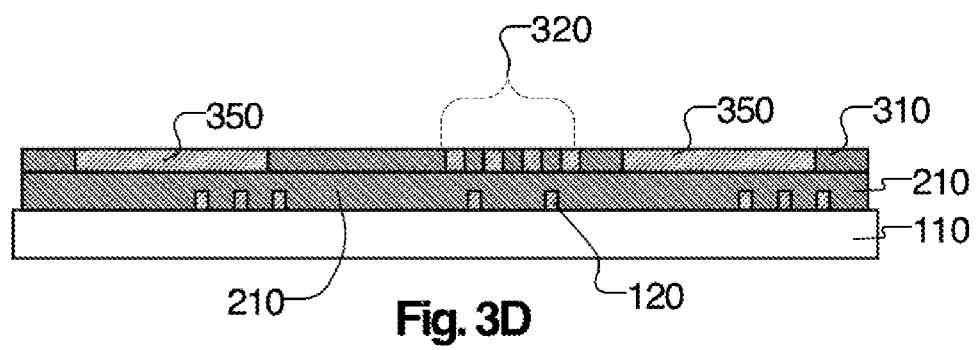
Figure 3E:
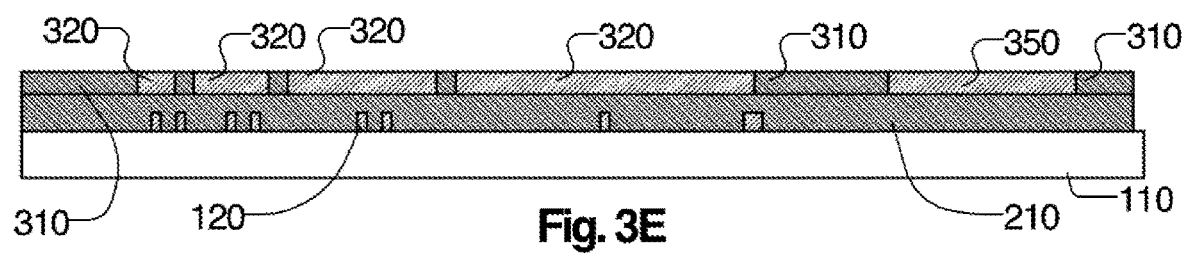
Figure 3F:
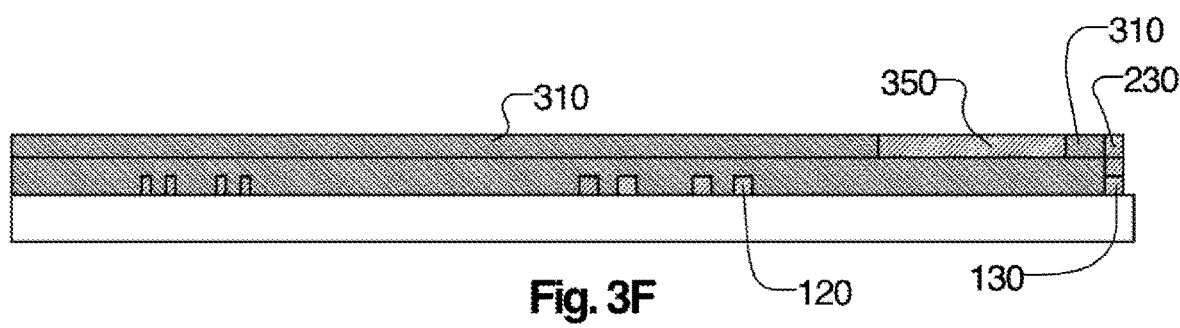

In FIG. 3C, the first electrodes 320 are electrically connected with respective ones of the first electrode signal lines 120. Here, "electrically connected" means that electrical charge can travel along a path of conductors. In the example embodiment of FIG. 3C, the path of conductors includes the conductive material formed within the signal line vias 220. The presence of signal line vias 220 is not strictly necessary in every example embodiment. In other example embodiments the first electrodes 320 are formed integral with the first electrode signal lines 120. In still other example embodiments the first electrodes 320 and the first electrode signal lines 120 are electrically connected by additional layers, lines, and vias in accordance with the engineering requirements of a given implementation.

In FIG. 3C, the pad extensions 230 are formed upon the pad extensions 230 from layers previously formed. The reader will understand that in this example embodiment the pads 130 are built up with each layer for ease of access and testing as desired. The pad extensions 230 may be omitted from particular pads 130 when not needed.

Figure 4A:
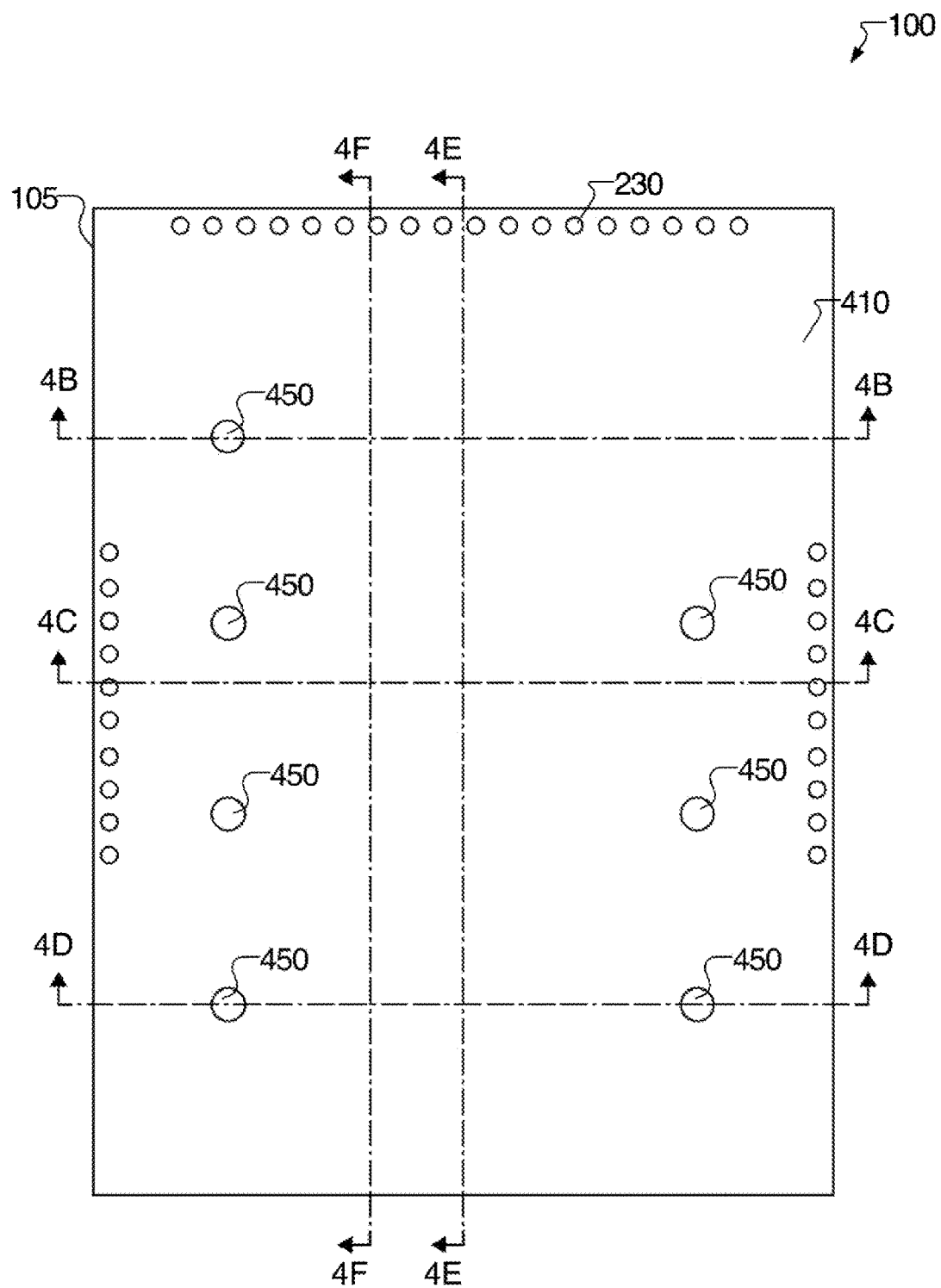
Figure 4B:
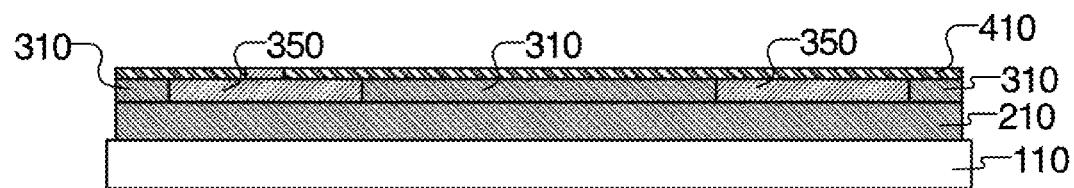
Figure 4C:
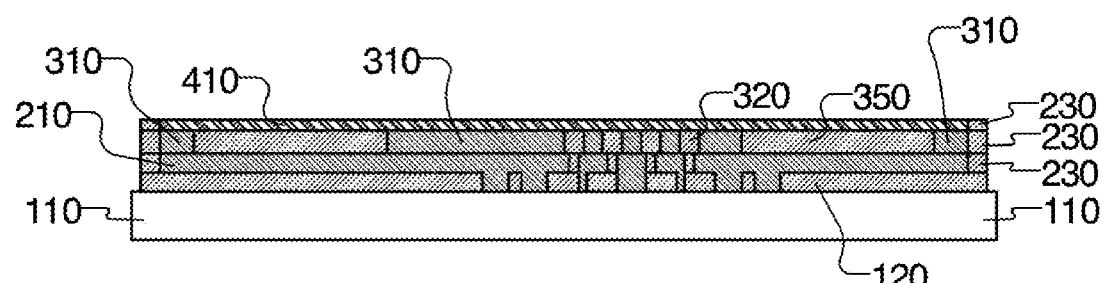
Figure 4D:
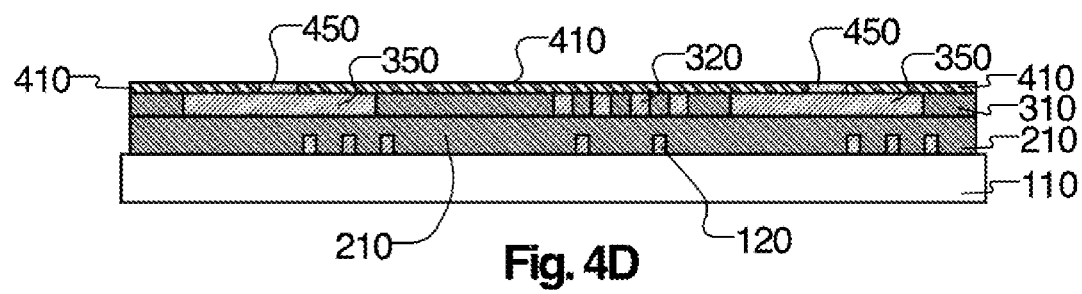

FIGS. 4A through 4F show in part a fourth layer of the first subcomponent 105 of the analog component 100. In this layer, a first cladding layer 410 and several ground plane posts 450 are formed over the third layer. FIG. 4D shows in cross-section that the ground plane posts 450 are electrically connected with ground plane 350.

Figure 4E:
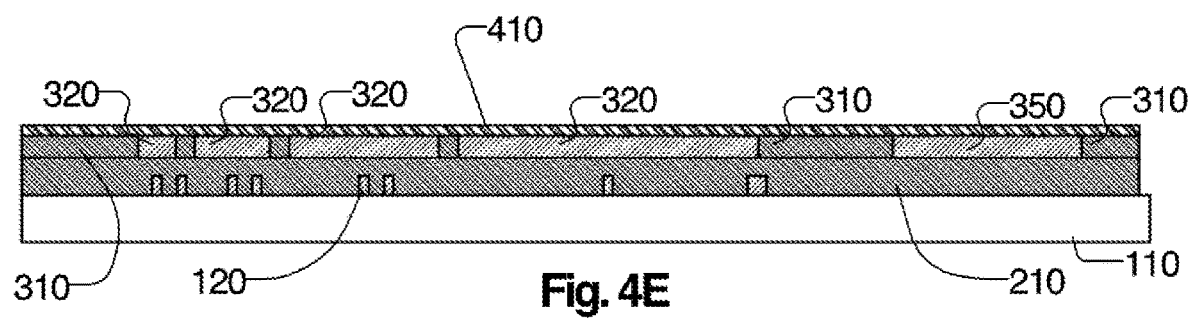
Figure 4F:
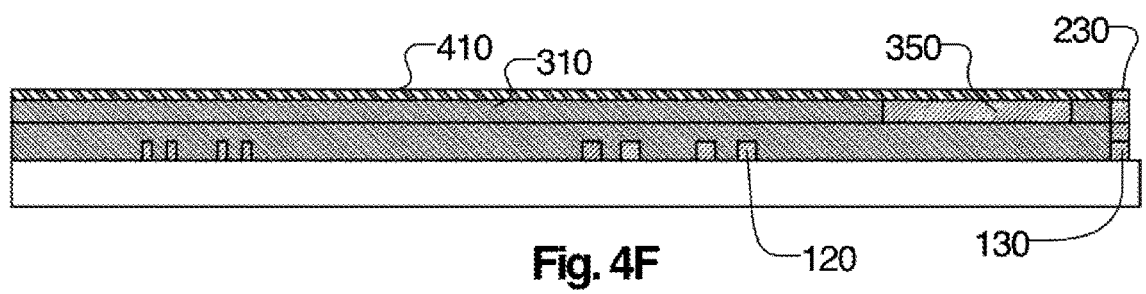

FIGS. 4C and 4E show that the first electrodes 320 are immediately below the first cladding layer 410.

FIGS. 5A through 5F show in part a fifth layer, of the first subcomponent 105 of the analog component 100, in which a number of elements are formed of waveguide material including input waveguide 561, output waveguides 564, and waveguide spacers 560. The number of output waveguides 564 in other example embodiments is sixteen or more. In the example embodiment of FIGS. 5A through 5F, the number of 564 corresponds to the number of columns of the first electrodes 320. Here, the first electrodes 320 are formed in four columns and there are four of the output waveguides 564.

Figure 5A:
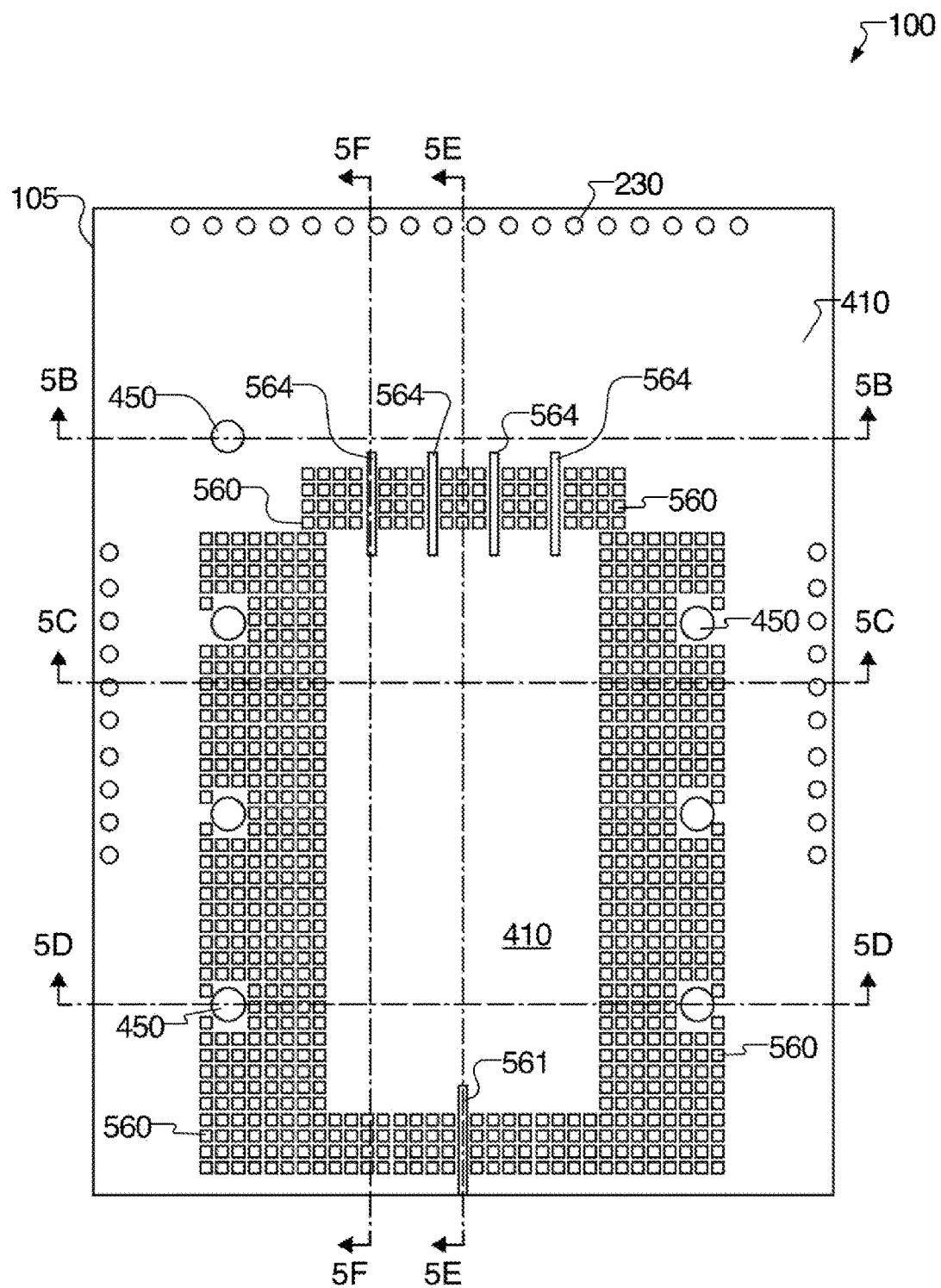
Figure 5B:
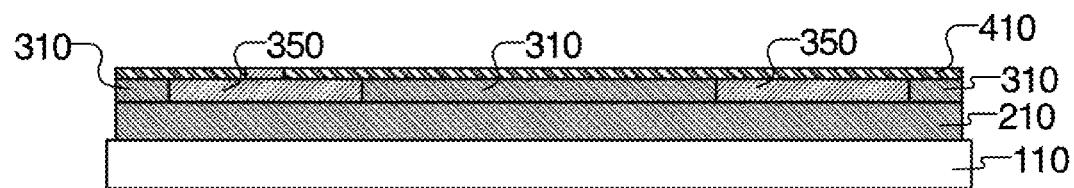
Figure 5C:
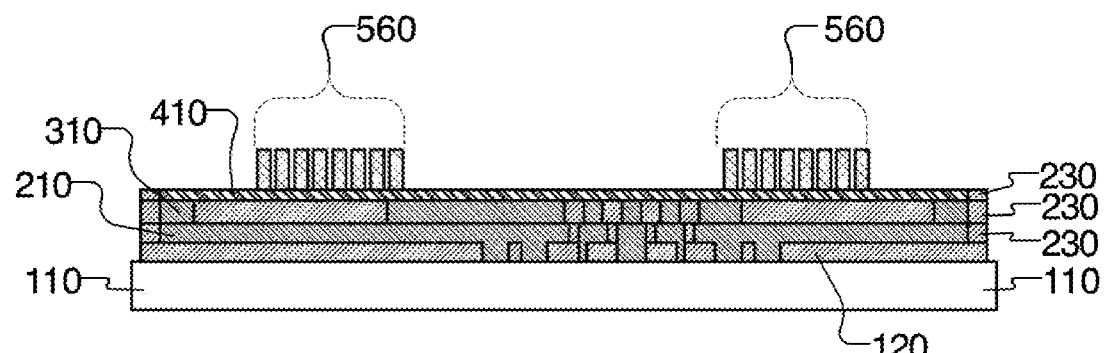
Figure 5D:
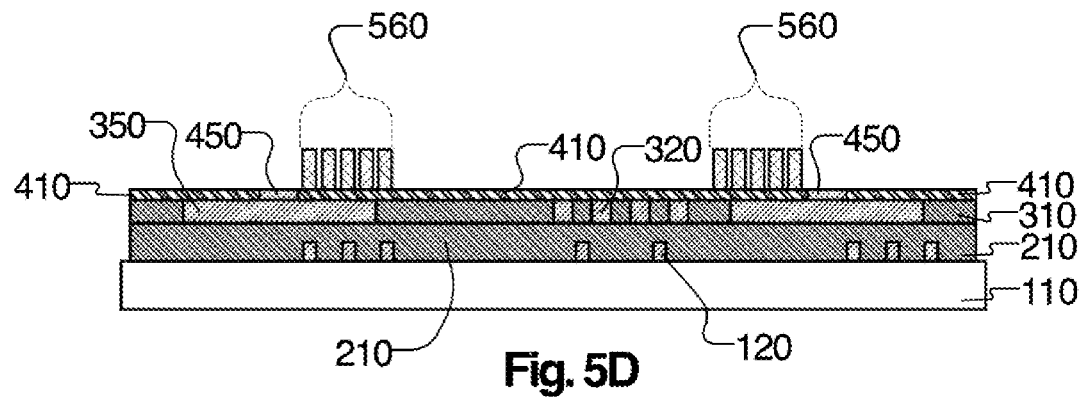
Figure 5E:
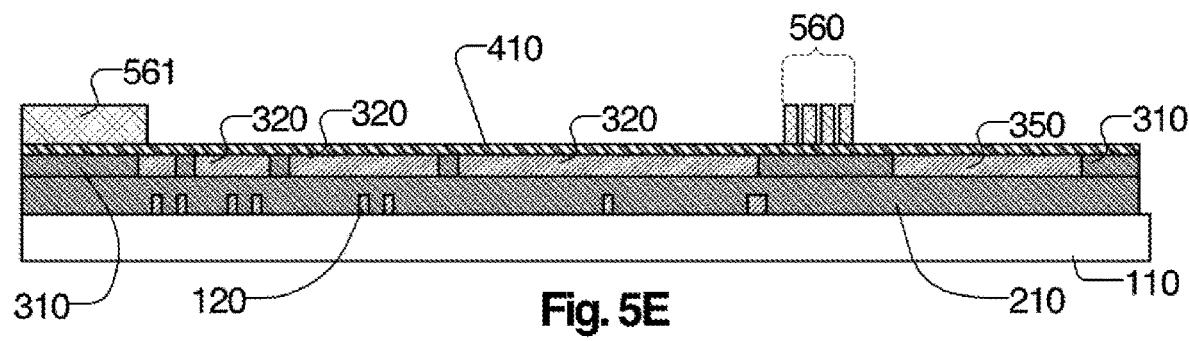
Figure 5F:
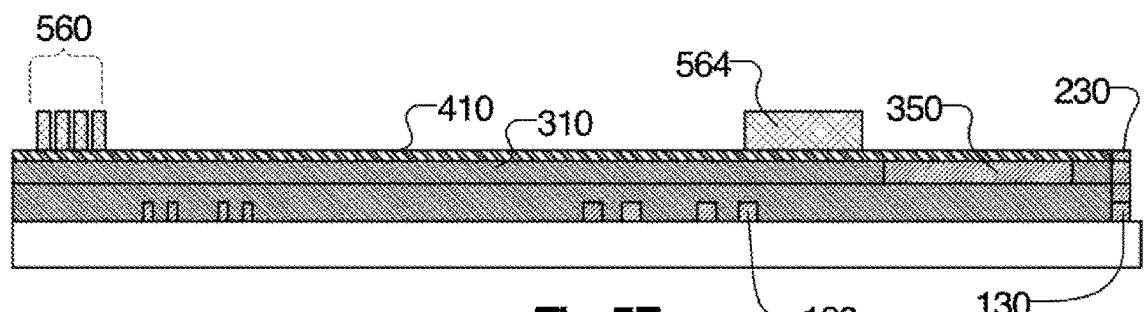

In FIG. 5A, the input waveguide 561 is positioned along one end an area that will accommodate a liquid crystal cell to be described later. The output waveguides 564 are positioned opposite the input waveguide 561 at the other end of the area that will accommodate the liquid crystal cell. The end of the area at which the input waveguide 561 is positioned may be referred to as an input end and the end of the area at which the output waveguides 564 are positioned may be referred to as an output end. FIG. 5E shows a cross-section of the first subcomponent 105 through the input waveguide 561 where the input waveguide 561 is on the left of the drawing. FIG. 5F shows a cross-section of the first subcomponent 105 through one of the output waveguides 564 toward the right side of the drawing.

Although FIG. 5E shows one of the first electrodes 320 is partially under the input waveguide 561, other example embodiments have no first electrodes 320 under any of the waveguides.

The number, position, and sizes of the waveguide spacers 560 may be varied. The spacers along the left and right sides of the area accommodating the liquid crystal cell in this example embodiment facilitate later formation of the cell's side walls.

Figure 6A:
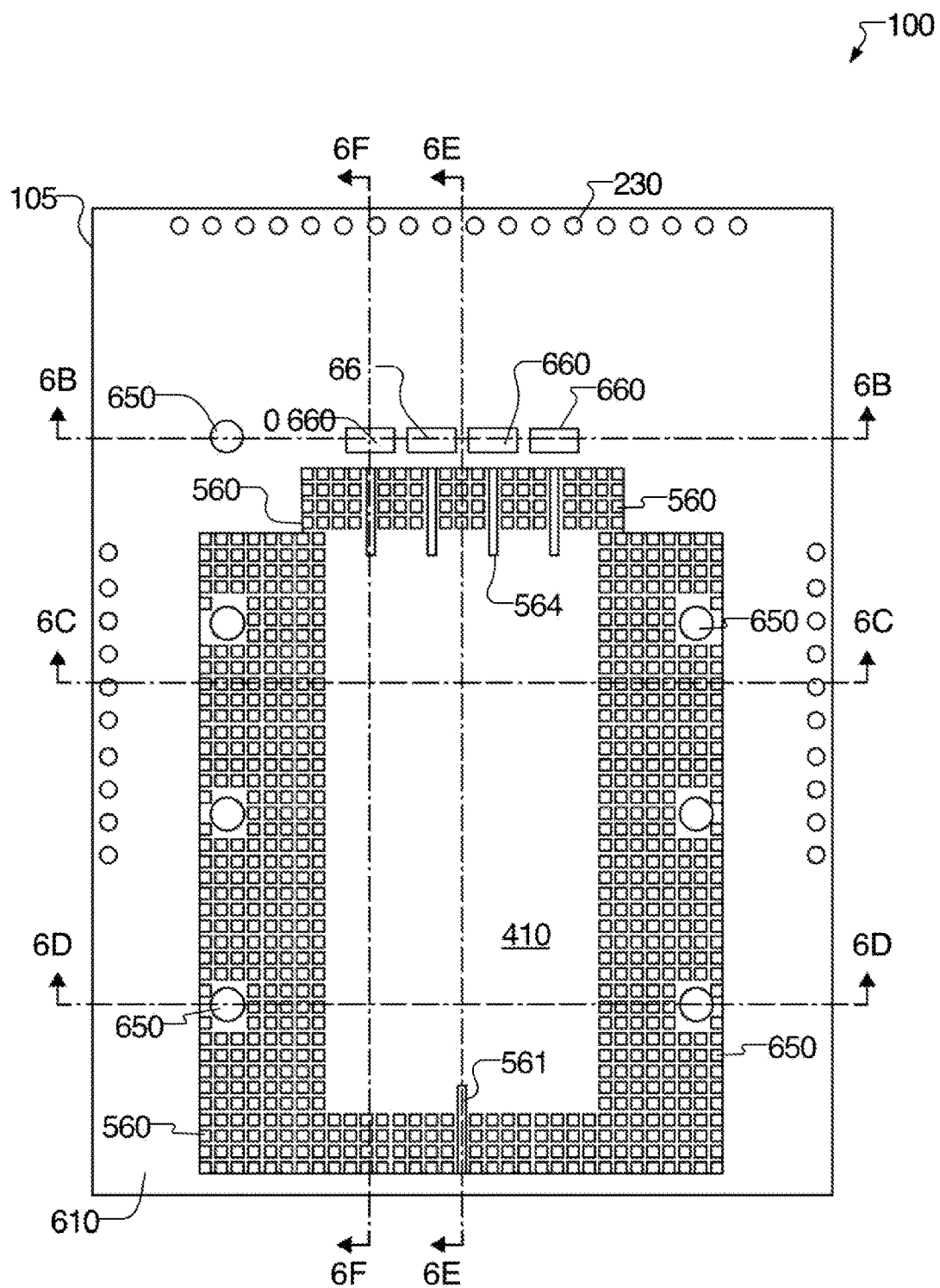
Figure 6B:
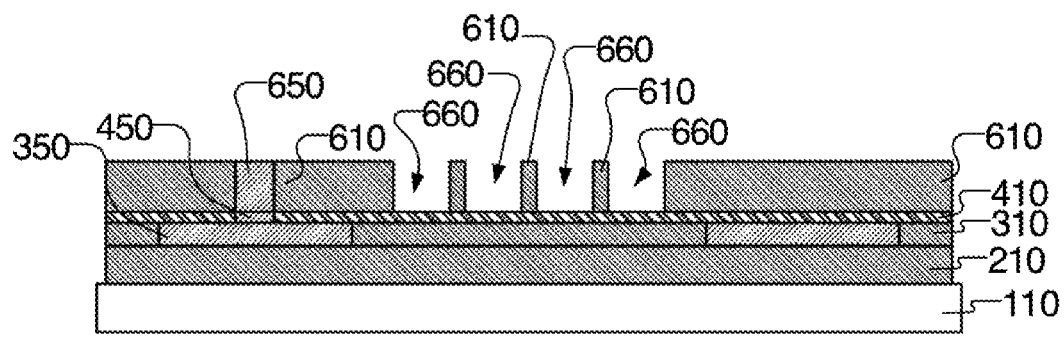
Figure 6C:
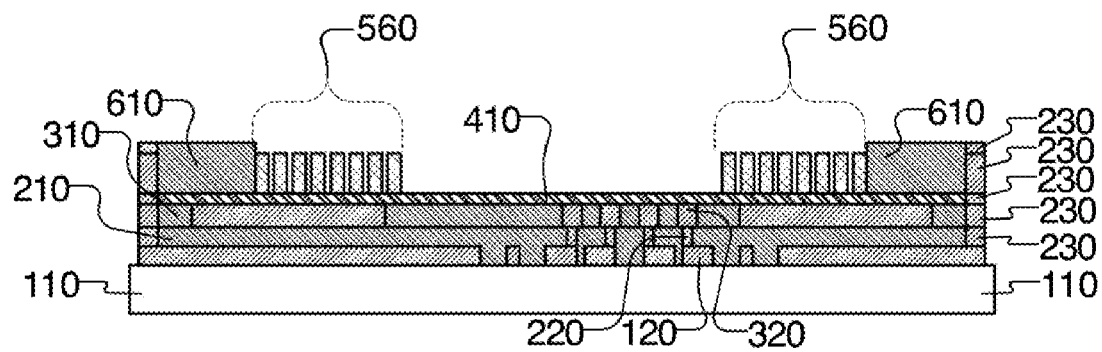
Figure 6D:
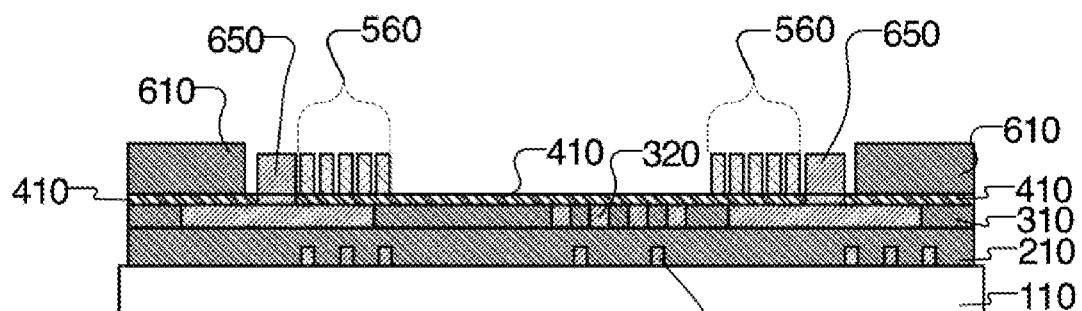
Figure 6E:
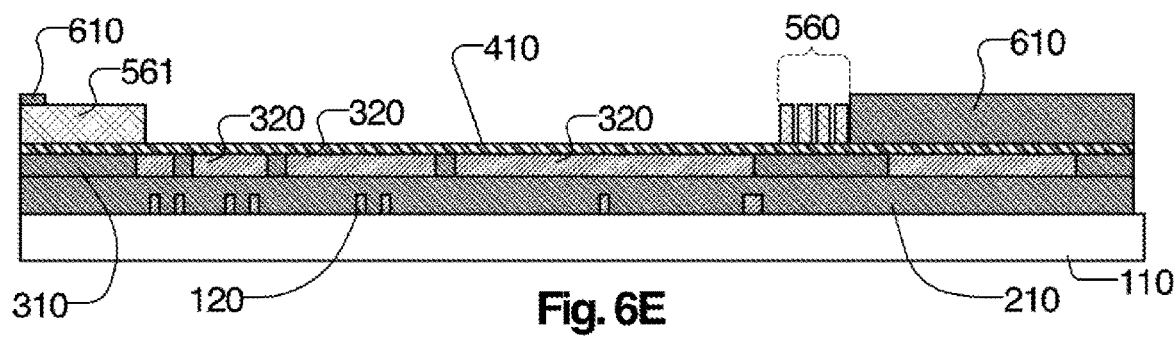
Figure 6F:
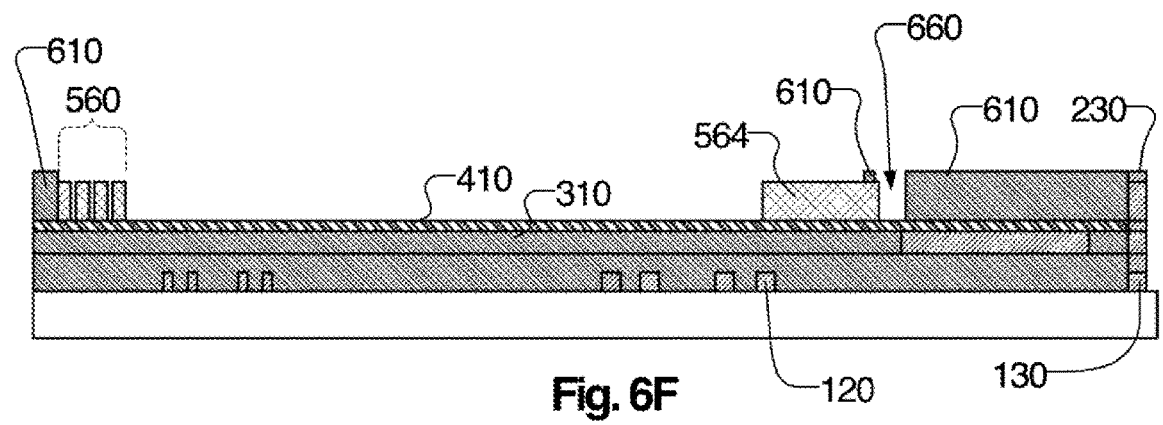

FIGS. 6A through 6F show in part a sixth layer, of the first subcomponent 105 of the analog component 100, in which third dielectric layer 610 is formed on certain parts of the first subcomponent 105 but not formed on or removed from other parts, and in which ground plane post extensions 650 are formed. Sensor cavities 660, as shown in FIGS. 6A, 6B, and 6F, are formed within the third dielectric layer 610.

FIG. 6F shows the illustrated one of the sensor cavities 660 positioned to receive the optical output passed on through the illustrated one of the output waveguides 564.

Figure 7A:
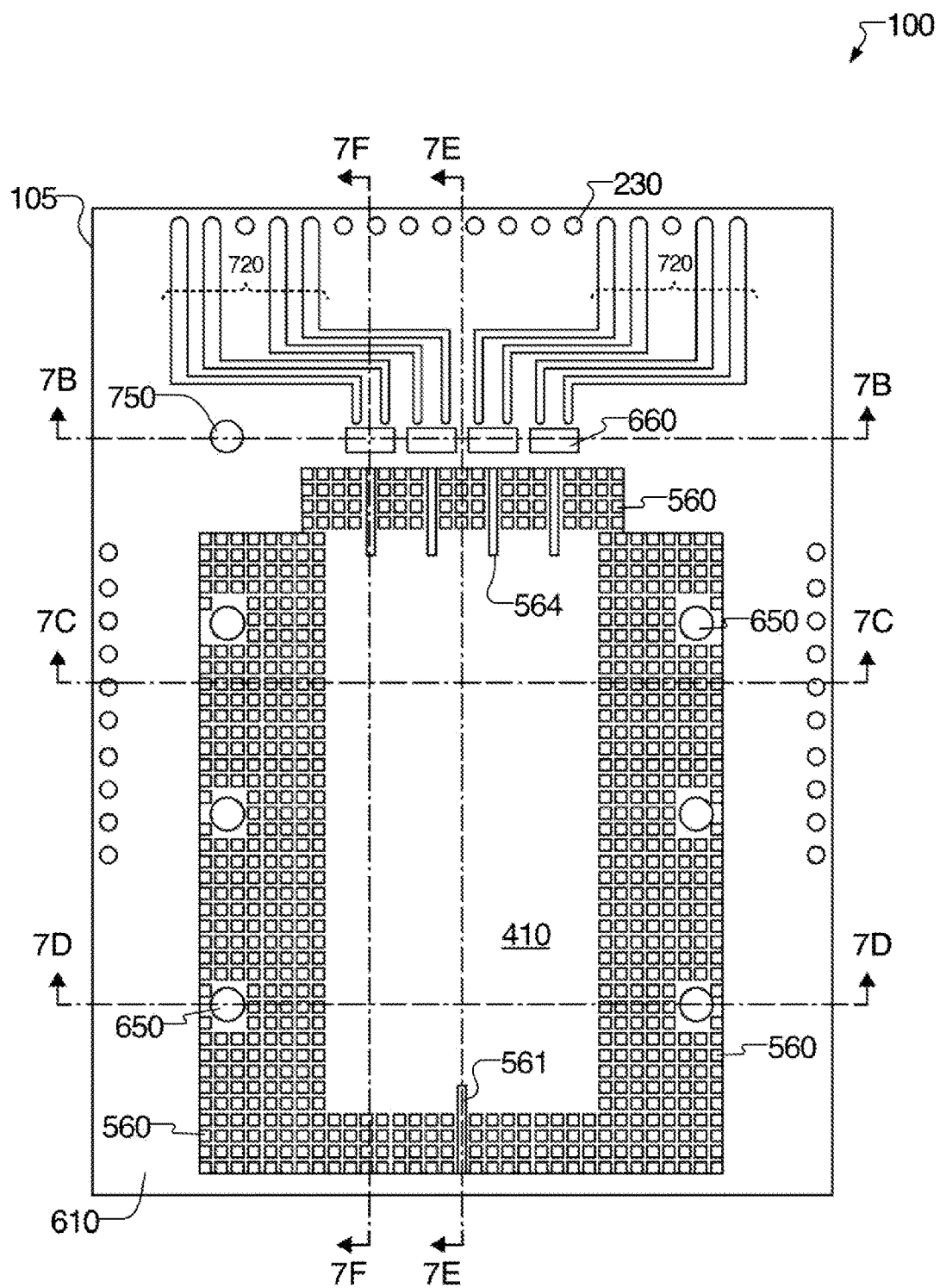
Figure 7B:
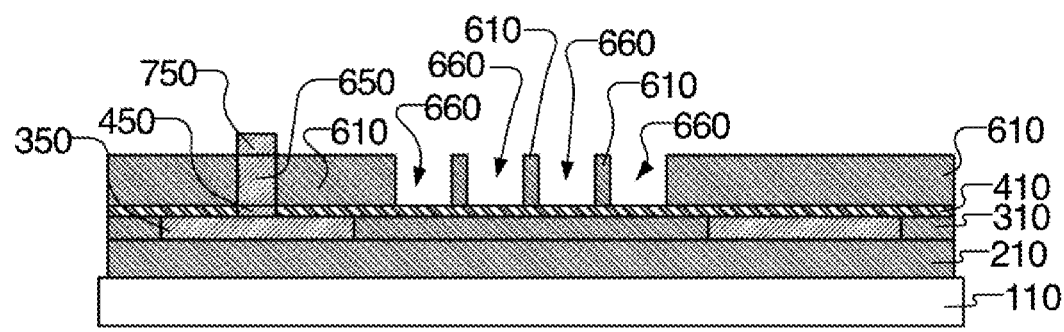
Figure 7C:
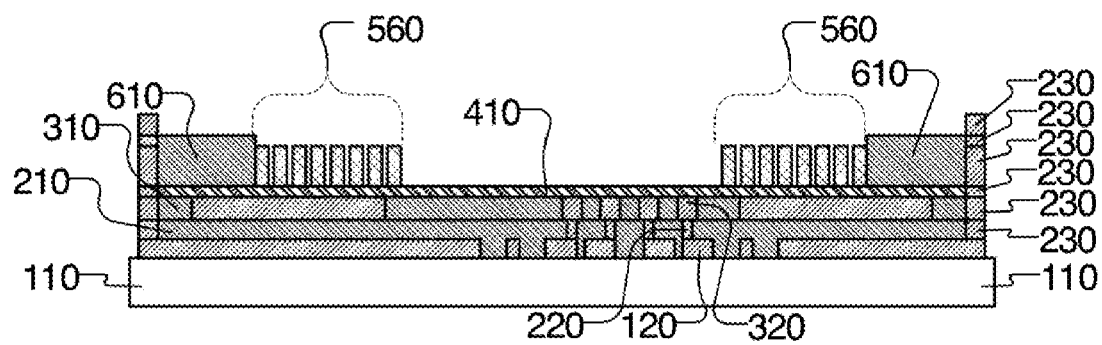
Figure 7D:
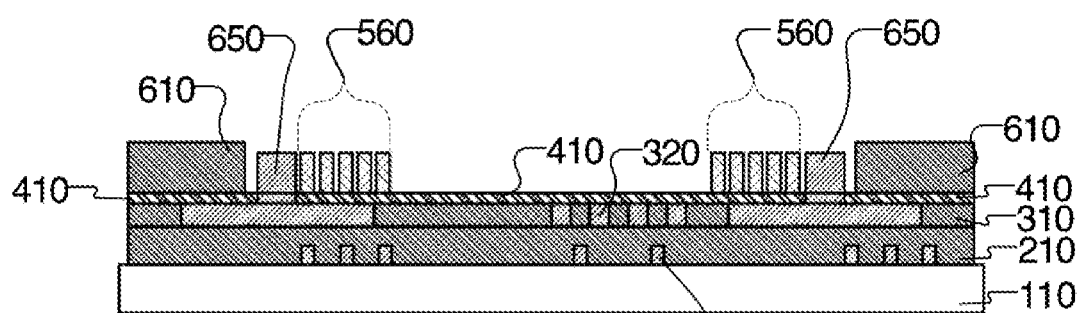
Figure 7E:
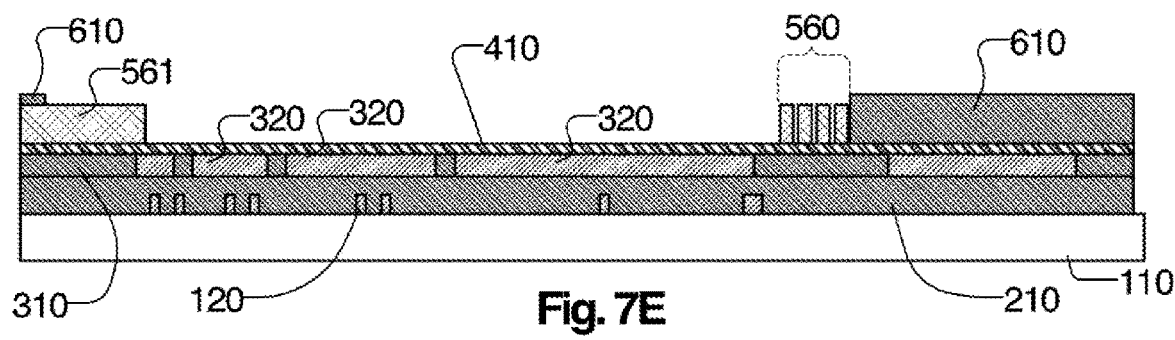
Figure 7F:
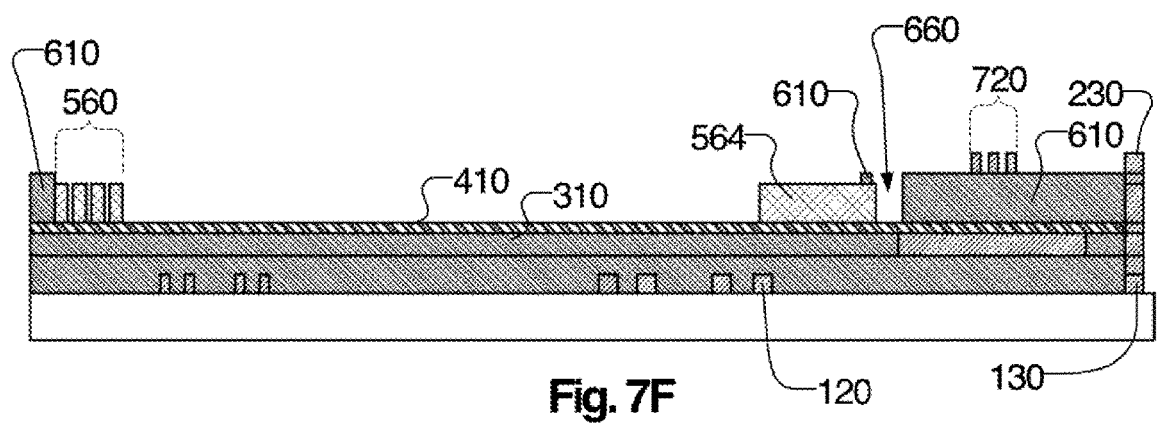
Figure 8A:
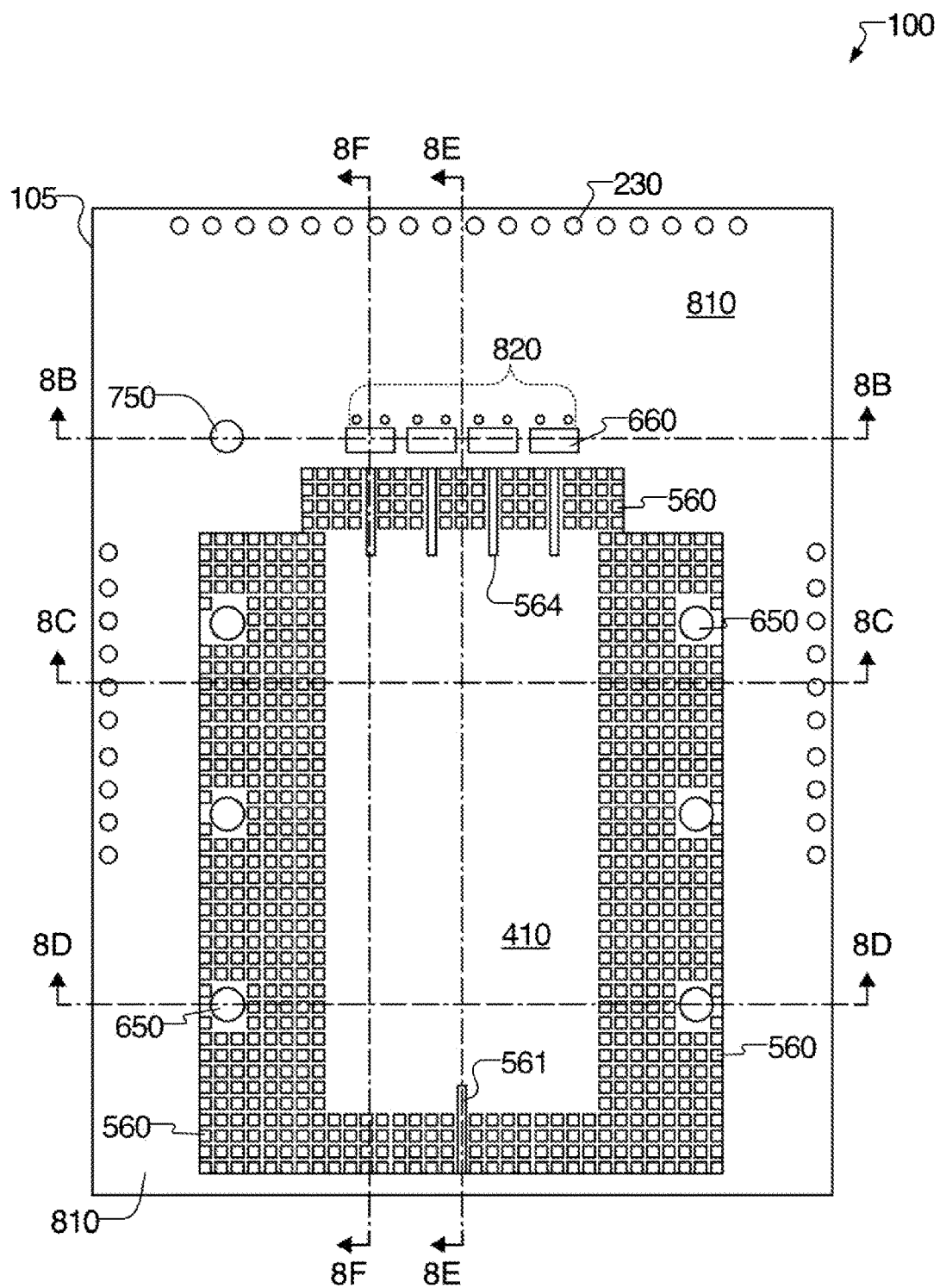
Figure 8B:
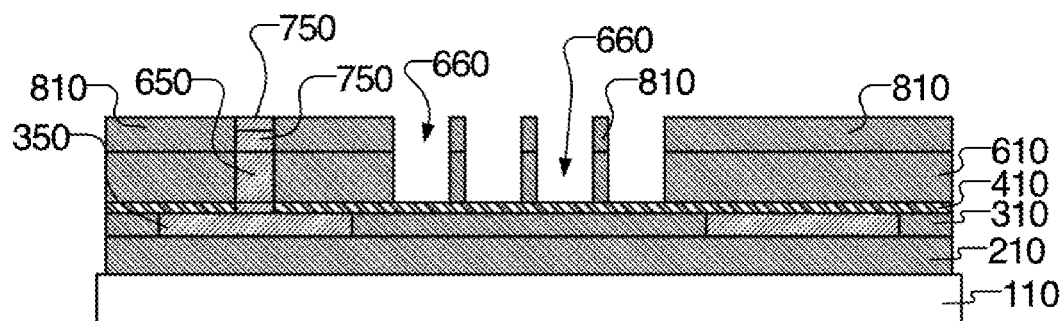
Figure 8C:
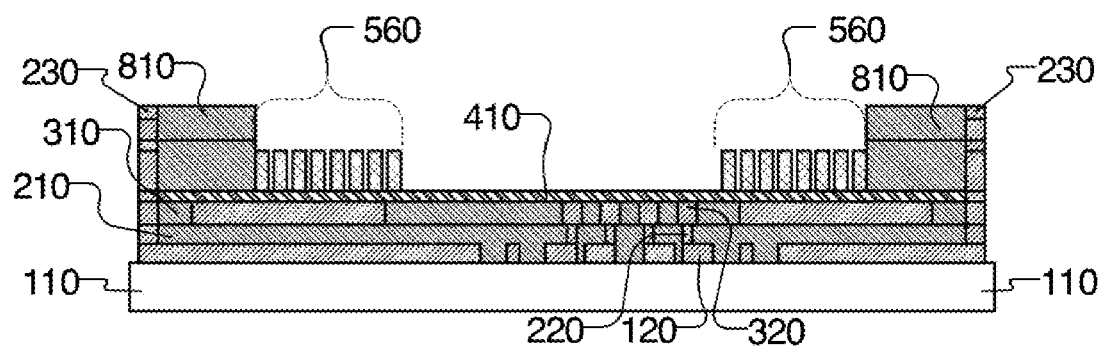
Figure 8D:
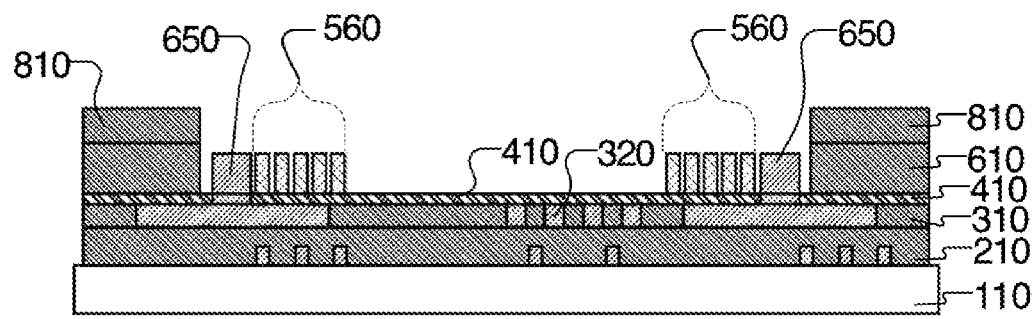
Figure 8E:
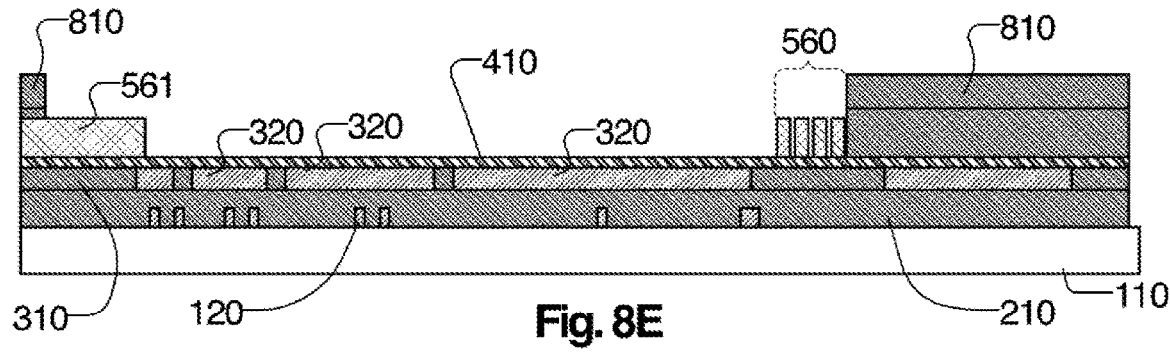
Figure 8F:
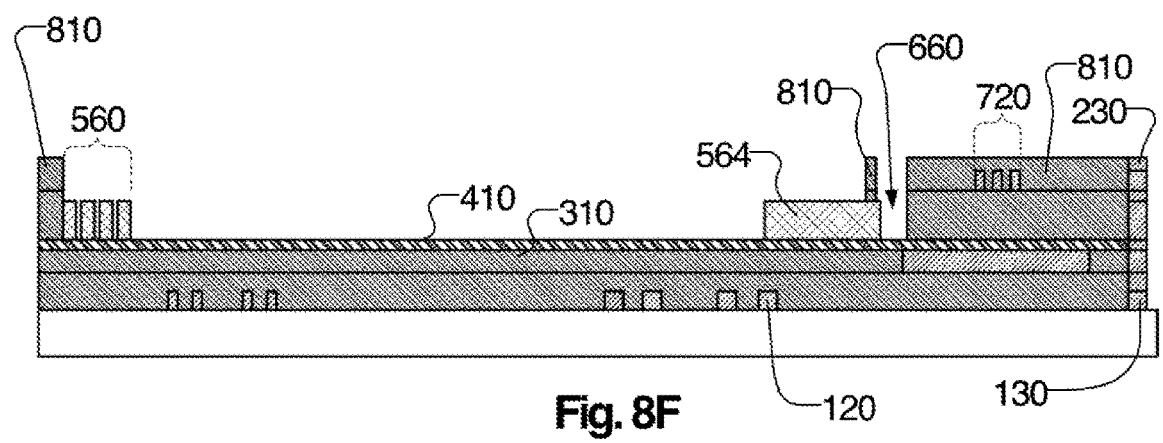
Figure 9A:
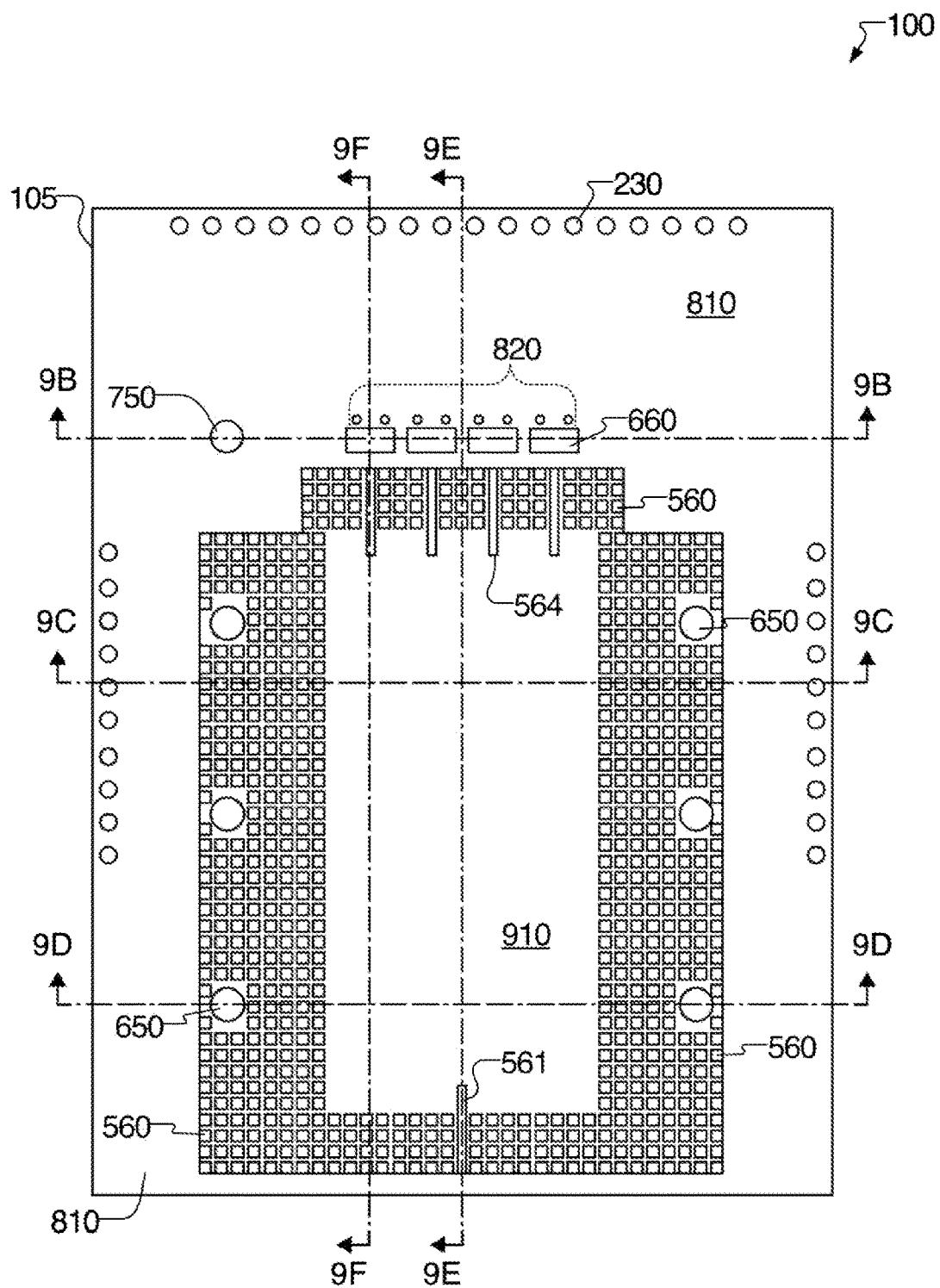
Figure 9B:
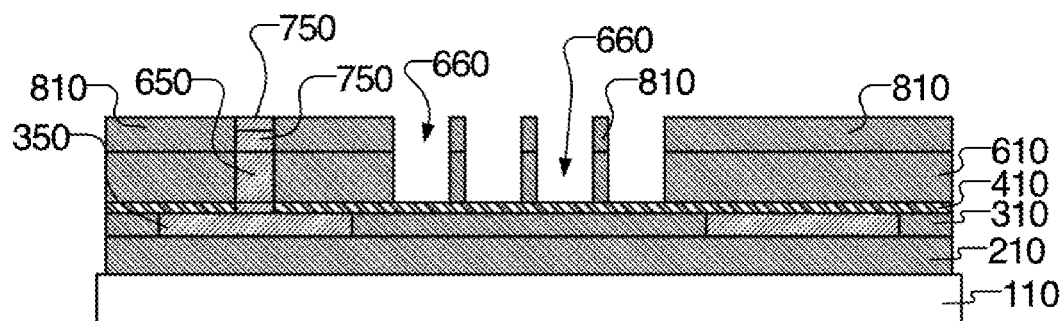
Figure 9C:
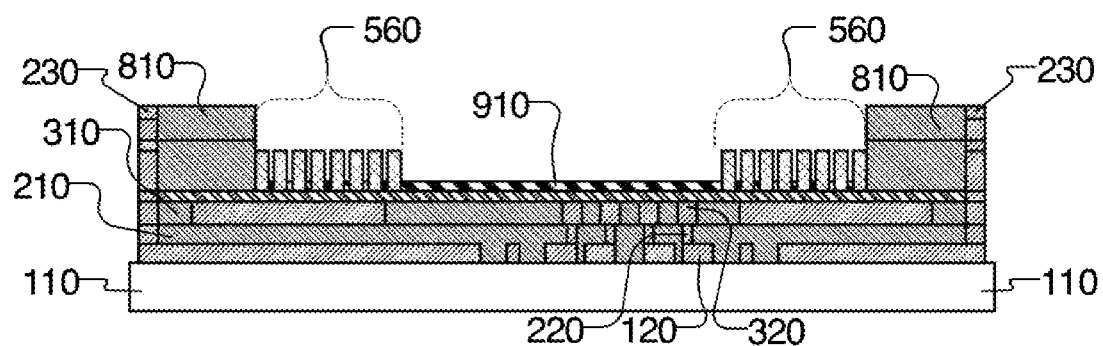
Figure 9D:
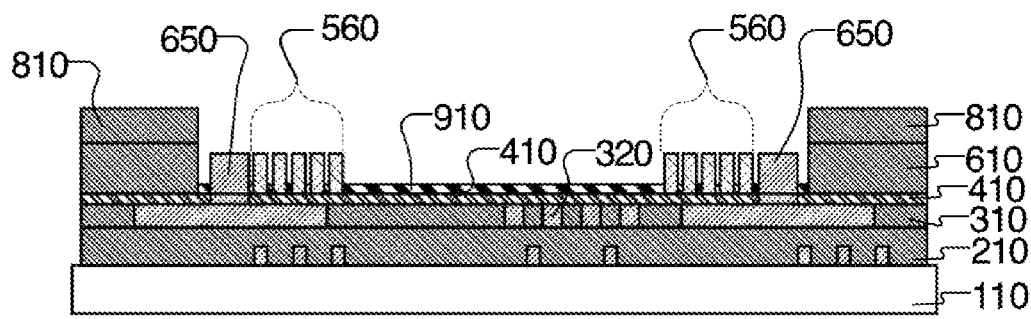
Figure 9E:
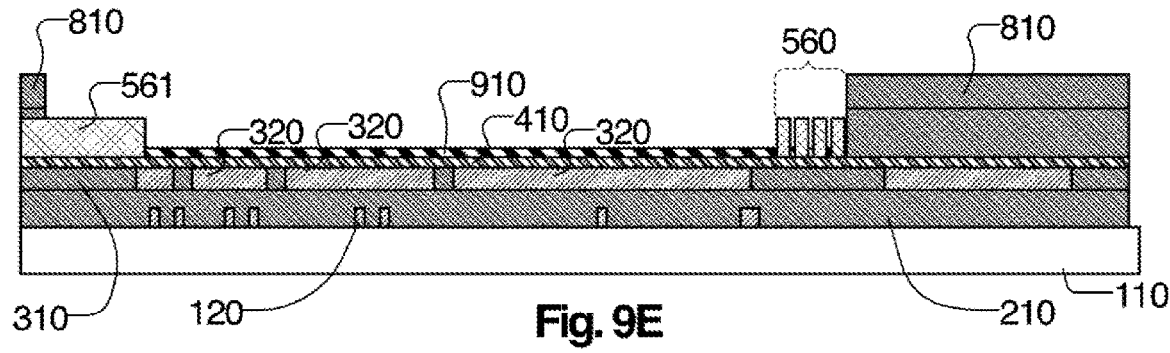
Figure 9F:
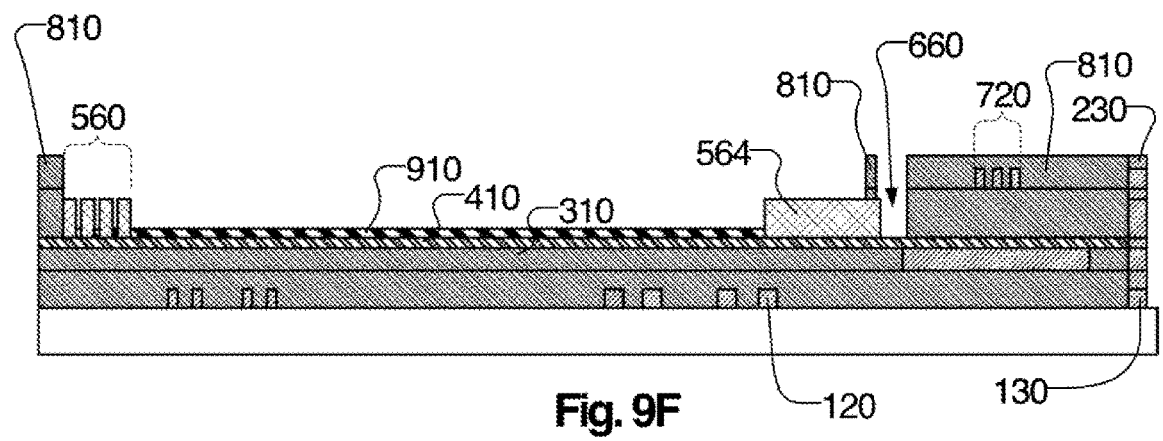
Figure 10A:
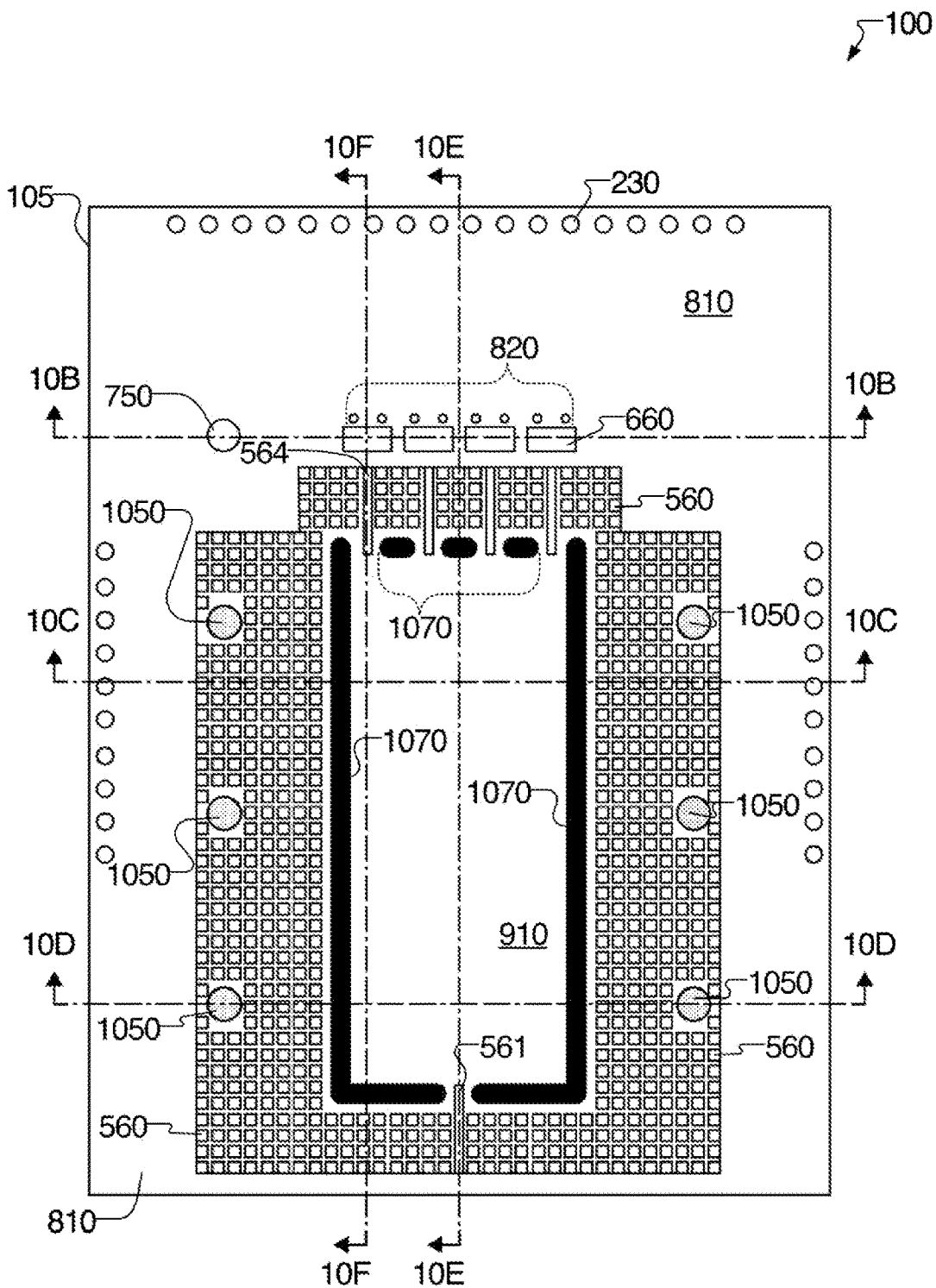
Figure 10B:
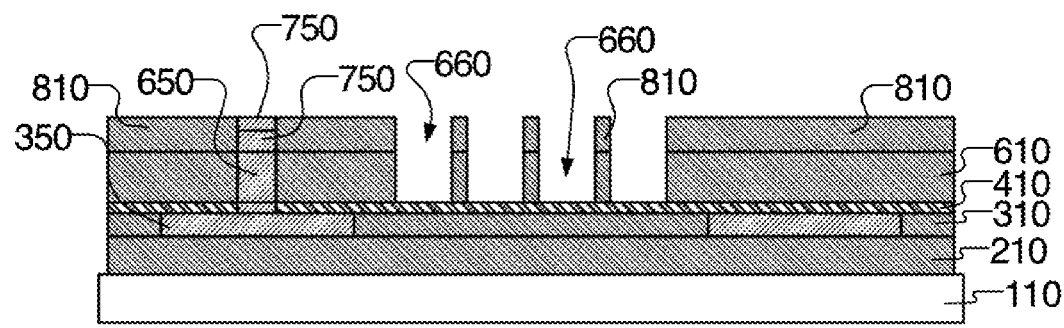
Figure 10C:
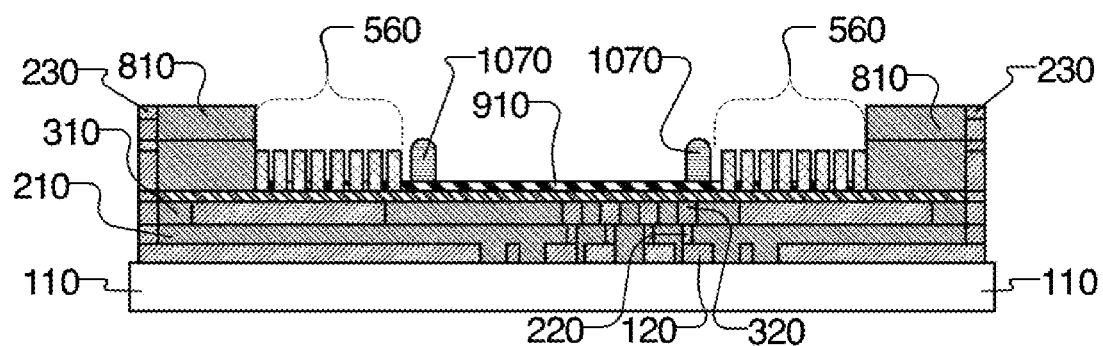
Figure 10D:
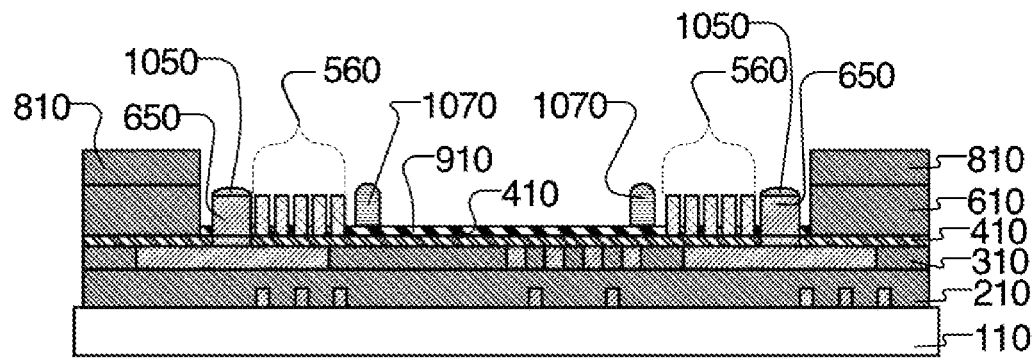
Figure 10E:
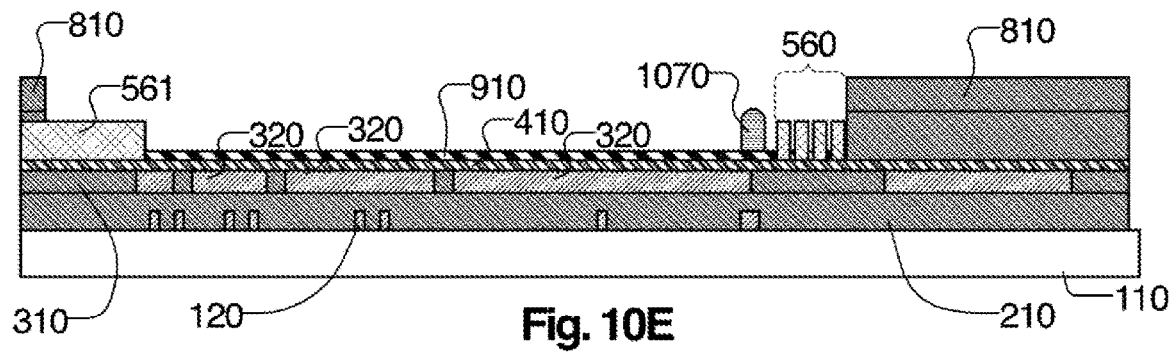
Figure 10F:
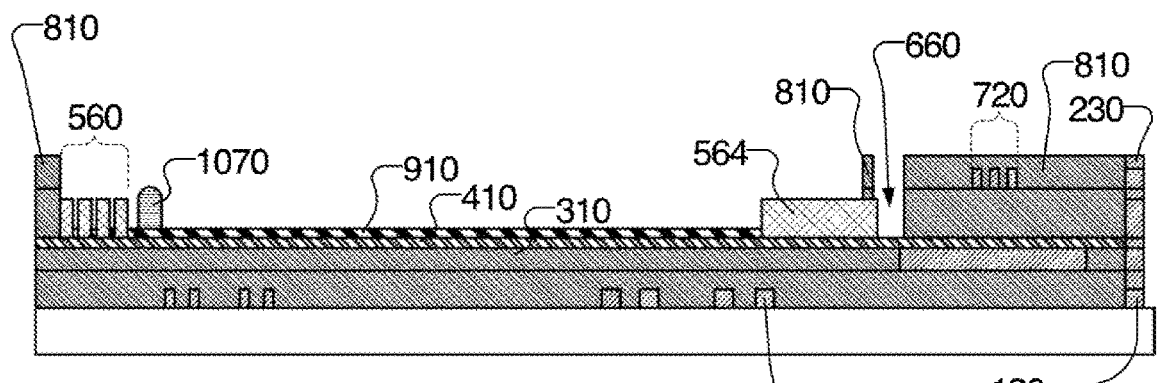

FIGS. 7A through 7F show in part a seventh layer of the first subcomponent 105 in which sensor signal lines 720 are formed. The sensor signal lines 720 are electrically connected with respective ones of the pads 130 via the pad extensions 230. In addition, one of the ground plane post extensions 650 is built up with a ground plane post further extension 750. FIG. 7B shows that the ground plane post further extension 750 raises this particular ground plane post higher than the ones of the ground plane post extensions 650 shown in FIG. 7D. This is an implementation detail furnished for the convenient grounding of a sensor assembly described later. Other implementations are within the ambit of the inventive concept.

FIGS. 8A through 8F show in part an eighth layer, of the first subcomponent 105 of the analog component 100, in which a fourth dielectric layer 810 and sensor signal line vias 820 are formed. The sensor signal line vias 820 are filled with conductive material and extend the sensor signal lines 720. The fourth dielectric layer 810 is not formed in or is removed from certain portions of the first subcomponent 105.

FIGS. 9A through 9F show in part a ninth layer, of the first subcomponent 105 of the analog component 100, in which first polyimide layer 910 is formed at least in the area that will accommodate the liquid crystal cell. The first polyimide layer 910 is not formed in or is removed from at least the sensor cavities 660.

FIGS. 10A through 10F show in part a tenth layer, of the first subcomponent 105 of the analog component 100, in which conductive epoxy 1050 is provided on the ground plane post extensions 650, and in which a gasket material 1070 is provided near the waveguide spacers 560, the input waveguide 561, and the output waveguides 564.

FIGS. 11A through 11F show in part an eleventh layer, of the first subcomponent 105 of the analog component 100, in which a sensor assembly 1160 is provided over the sensor cavities 660. The sensor assembly 1160 includes a sensor housing 1161 and one or more sensors 1164. The sensor housing 1161 is grounded via sensor assembly ground line 1150 to the ground plane 350 by way of other conductors as drawn in FIG. 11B.

In FIGS. 11A through 11F, each of the output waveguides 564 has a corresponding one of the sensor cavities 660 and a corresponding one of the sensors 1164 positioned above the sensor cavities 660. The inputs and outputs for the sensors 1164 are electrically connected to the sensor signal lines 720.

For example, in FIG. 11F one of the output waveguides 564 is shown in cross-section. This output waveguide is positioned to receive from the liquid crystal cell an optical input. This output waveguide is also positioned to communicate an optical output into the corresponding one of the sensor cavities 660. The corresponding one of the sensors 1164 is positioned above the one of the sensor cavities 660 and perform a sensing operation the result of which is output via sensor signal lines 720. The output waveguide communicates the optical output of the liquid crystal cell to the sensor.

Figure 12A:
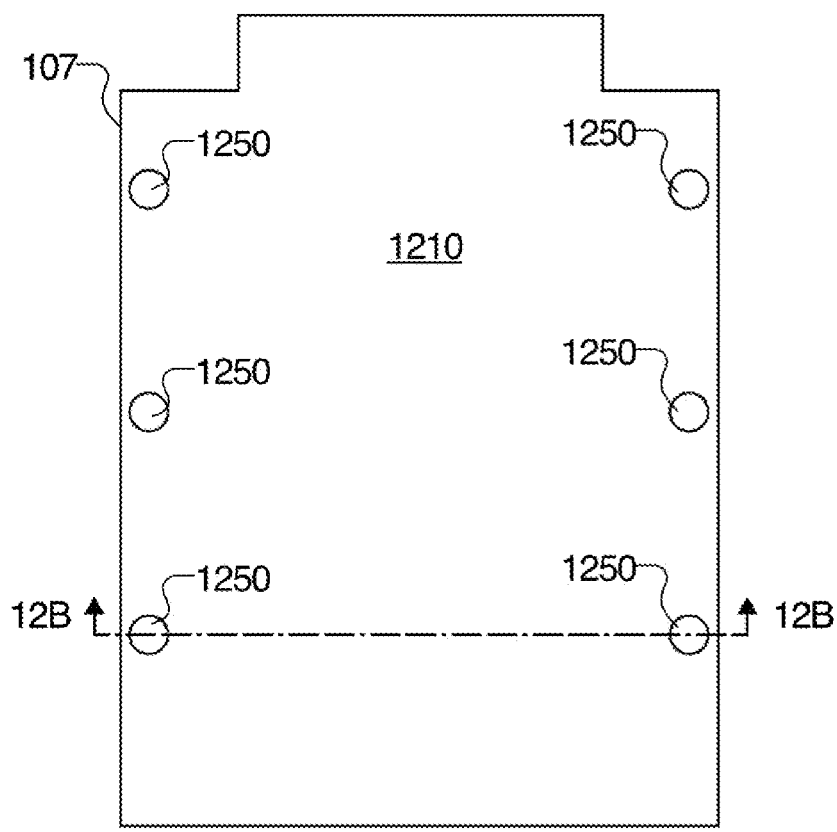
FIG. 12A illustrates an example embodiment of a bottom view of a second subcomponent 107 of the analog component 100.
Figure 12B:
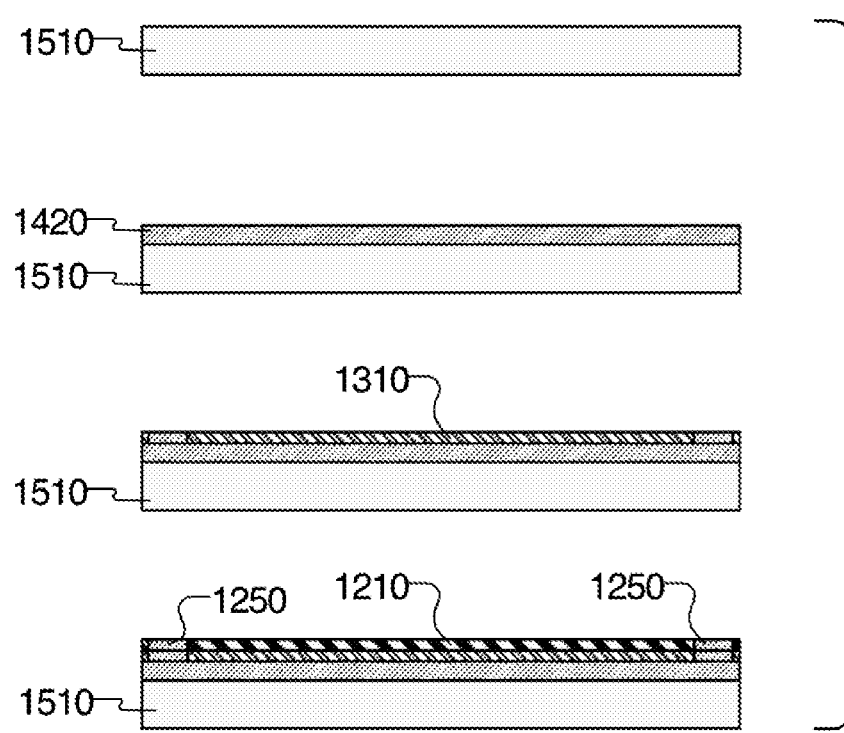
FIG. 12B shows a cross-section of the example illustrated in FIG. 12A.

FIGS. 12A and 12B illustrate a second subcomponent 107 of the first substrate 110. FIG. 12B shows the build-up of three layers on a second substrate 1510 to achieve the second subcomponent 107 drawn in FIG. 12A. For the first layer, a second electrode 1420 is formed upon the second substrate 1510. In this example embodiment the second electrode 1420 is formed as only one electrode and covers substantially all of the second substrate 1510.

For the second layer, a second cladding layer 1310 is formed over the second electrode 1420 except at second electrode ground post extensions 1250. The second electrode ground post extensions 1250 are electrically connected with the second electrode 1420.

For the third layer, a second polyimide layer 1210 is formed over the second cladding layer 1310, except that the second electrode ground post extensions 1250 are extended through the second cladding layer 1310.

FIGS. 13A through 13C show the combination of the first subcomponent 105 with the second subcomponent 107 to form the analog component 100.

Prior to assembly of the first subcomponent 105 with the second subcomponent 107 the polyimide layers undergo a preparation referred to as rubbing. The polyimide layer is rubbed by hand in the example embodiment, but other rubbing processes are within the ambit of the inventive concept. The rubbing imparts a molecular alignment to the polyimide layers. In one alternative example embodiment one or more of the polyimide layers is rubbed so that the molecular alignment is an irregular molecular alignment. In other words, one or both of the first polyimide layer 910 and the second polyimide layer 1210 is rubbed in more than one direction, thereby increasing the difficulty in predicting or modeling the function of the analog component 100.

As shown in FIG. 13B, the ground plane post extensions 650 are joined with the second electrode ground post extensions 1250 by virtue of the conductive epoxy 1050. As the second subcomponent 107 is fitted to the first subcomponent 105 the second polyimide layer 1210 compresses and deforms the gasket material 1070. The gasket material 1070 that has compressed and deformed presses against the sides of the input waveguide 561, against the sides of the output waveguides 564, and against a side of the ones of the waveguide spacers 560 so as to provide sidewalls enclosing a cavity for a liquid crystal cell.

The cavity is shown in FIG. 14A and in FIG. 14B as being filled with liquid crystal material to form liquid crystal cell 1600. In FIG. 14A, the illustrated one of the sensor cavities 660 is shown as being filled with, for example optical oil to facilitate the transport of light from the one of the output waveguides 564 to the one of the sensors 1164.

The insertion of the liquid crystal material into the cavity is performed in any conventional manner, for example using a vacuum induced through a port (not illustrated) kept open for such a purpose and later permanently closed.

Earlier, it was pointed out that the first electrodes 320 are electrically connected with respective ones of the first electrode signal lines 120. FIG. 14B illustrates that the liquid crystal cell 1600 is over the first electrodes 320. Although the liquid crystal cell 1600 is only partially over the leftmost and the rightmost of the first electrodes 320 it is still over the first electrodes 320.

FIG. 14B also shows a second electrode 1420 over the liquid crystal cell 1600. The example shown in FIG. 14B includes only one second electrode that is over the entirety of the liquid crystal cell 1600. In other example embodiments more than one second electrode is provided. Whether only one or whether more than one second electrode is provided, the second electrodes should be opposite the first electrodes 320 in the manner drawn in FIG. 14B. In other words, the first and second electrodes are on opposite sides of the liquid crystal cell 1600 so that an electrical charge may be formed between the first electrodes 320 and the second electrode 1420 and cause the crystals in the liquid crystal material to change orientation within the liquid crystal cell 1600.

The analog component 100 has been taught in the context of a first subcomponent 105 and a second subcomponent 107. In other example embodiments the analog component 100 is formed with different layers on each of the subcomponents. In other example embodiments the layers are combined and/or rearranged.

Operation of Analog Component

In operation, an optical input (also referred to as an optical source) which is in an example embodiment a coherent optical input (also referred to as an optical signal input or a constant optical signal) is introduced into the input waveguide 561. The input waveguide 561 communicates the optical signal into the liquid crystal cell 1600. As the first electrode signal lines 120 are energized, electrical charges between the first electrodes 320 and the second electrode 1420 cause the crystals in the liquid crystal cell 1600 to change orientation. The passage of the optical input through the liquid crystal cell 1600 is affected by the orientation of the crystals. The crystals cause diffusion, constructive interference, and destructive interference in an unpredictable manner.

The output waveguides 564 receive the optical output of the liquid crystal cell 1600, whatever it is, and communicate it to the sensor cavities 660. The output will vary from one output waveguide to another. The optical output of the liquid crystal cell 1600, conveyed through the output waveguides 564, enters the optical oil in the sensor cavities 660 and, through this medium, is communicated to the sensors 1164.

The sensors 1164 thereby sense the optical output of the liquid crystal cell 1600.

The example embodiment drawn in FIGS. 14A and 14B can be altered in many ways depending on the particular sensor assembly 1160. The example embodiment of FIGS. 14A and 14B teaches an implementation in which the sensor assembly 1160 is installed as a separate device, at or near the end of the fabrication of the analog component 100. The result in this implementation is an angle between the output of the output waveguides 564 and the input to the sensors 1164. Optical oil is used to help the output reach the sensors 1164. Alternatives such as the use of an angled, reflective surface within the sensor cavities 660 will occur to those familiar with this field.

The sensors 1164 are, in other example embodiments fabricated as an integral structure of the analog component 100 and are oriented so that the optical output of the liquid crystal cell 1600 passes through the output waveguides 564 and directly to the sensors 1164 without changing direction.

In another example embodiment the optical output of the liquid crystal cell 1600 is conveyed by the output waveguides 564 to a butt-coupled optical fiber that in turn provides the output to the sensors 1164.

In other example embodiments the sensor assembly 1160 is off-chip. Having the sensors 1164 on-chip has an advantage in that the analog component 100 is more resistant to reverse engineering. The foregoing discussion has explained, in general terms, an apparatus that has its first electrodes are electrically connected with respective first electrode signal lines, a liquid crystal cell over the first electrodes, one or more second electrodes over the liquid crystal cell and opposite the first electrodes, an input waveguide configured to communicate an optical input into the liquid crystal cell, and a sensor configured to sense an optical output of the liquid crystal cell. The apparatus also has an output waveguide configured to communicate the optical output of the liquid crystal cell to the sensor.

As FIG. 14B shows, each of the drawn ones of the first electrodes 320 has a different dimensional value (length, in this example) in a first direction (from left to right in the drawing, in this example). These differences in dimension among the first electrodes 320 has the advantage that the charge provided between the first electrodes 320 and the second electrode 1420, and the corresponding effect on the orientation of the crystals in the liquid crystal cell 1600, is more chaotic and therefore more resistant to analysis and reverse engineering.

Returning to FIG. 3A, the arrangement of the first electrodes 320 may be thought of as an aspect of the particular signature of a given analog component 100. Two examples of the analog component 100 that have the same signature will operate the same, or close enough to identical to achieve interoperability for the purposes of converting between plaintext and ciphertext, described later. Two examples of the analog component 100 whose signatures do not match will not be interoperable.

The analog component 100 described by way of a simplified example, above, possesses several aspects that may be readily altered to achieve different signatures. As already mentioned, the arrangement of the first electrodes 320 is one such aspect. To vary this aspect of the signature of a given device, it is necessary in production only to vary the mask by which the first electrodes 320 are provided. The location, the length, the width, and the shape of given ones of the first electrodes 320 is readily varied by varying the mask. Other aspects that can be varied to obtain different signatures for such analog components include varying the polyimide rub of the first polyimide layer 910 and/or the second polyimide layer 1210, varying the recipe used for the material with which the liquid crystal cell 1600 is filled, varying the particular material used to construct the input waveguide 561 and the output waveguides 564.

In various example embodiments a temperature controller (not illustrated) regulates the temperature of the material in the liquid crystal cell 1600 to achieve consistent operation in a variety of environments. Another aspect that can be varied to obtain a different signature for an analog component 100 is the temperature to which the liquid crystal cell 1600 is regulated.

Combinations of the foregoing aspects are varied to achieve sets of one or more analog components that are suitable for interoperation, or to achieve an analog component that is not interoperable with others.

In operation, a constant optical input is introduced into input waveguide 561. The output of the liquid crystal cell 1600 is sensed at the sensors 1164. An analog component input $A_i$ (also referred to as drive signals $A_i$) to the analog component 100 may be provided via the first electrode signal lines 120. The analog component input $A_i$ is a sequence of binary values, or bits.

In the example embodiment shown partially in FIG. 15, the analog component 100 has sixteen of the first electrode signal lines 120 individually numbered from 120-0 through 120-F. Signals from these first electrode signal lines 120 travel to first electrodes 320 because the first electrode signal lines 120 are electrically connected with the respective first electrodes 320. In the example embodiment shown partially in FIG. 16, the analog component 100 has sixteen first electrodes 320. The first electrodes 320 are individually numbered from 320-0 through 320-F. The first electrode signal line 120-0 is electrically connected to the first electrode 320-0 and so on.

The analog component input $A_i$ is input to the analog component 100 sixteen bits at a time in this example embodiment. Under control of a clock, for example, the respective values of the next sixteen bits of a stream of bits are used to drive respective ones of the first electrode signal lines 120. For example, if 0-th bit has a value of 1, then the first electrode signal line 120-0 is driven. For example, if the 1-st bit has a value of 0, then the first electrode signal line 120-1 is not driven, and so on through the F-th bit. Driving certain ones of the first electrode signal lines 120 results in the introduction of charge onto corresponding ones of the first electrodes 320. In any particular cycle, therefore, certain of the first electrodes 320 are charged in accordance with the value of the given sixteen bits of the bitstream used as the analog component input $A_i$ and certain other ones of the first electrodes 320 are not charged.

The first electrodes 320 are all opposite at least one second electrode 1420 so that when charge appears at a given one of the first electrodes 320, the crystals of the liquid crystal material in the liquid crystal cell 1600 is affected.

FIG. 17 illustrates an example of a simulated result of applying "0110000010010000" as sixteen bits of an analog component input $A_i$ to the first electrode signal lines 120. Here, the most significant bit (on the left) is used to drive line 120-0 and the least significant bit (on the right) is used to drive 120-F. In this example lines 120-1, 120-2, 120-8, and 120-B are driven. The corresponding electrodes 320-1, 320-2, 320-8, and 320-B are energized, affecting the orientation of the crystals in the liquid crystal cell 1600. In FIG. 17, the crystals in the liquid crystal cell 1600 are represented by square prisms that lay lengthwise in a direction from the top to the bottom of the drawing when not disturbed by any charge. In the drawing, the crystals realign in a direction coming out of the page when fully moved by a charge, and adopt intermediate positions when a charge is present but insufficient to fully reorient the crystals.

FIG. 18 is similar to FIG. 17, but the sixteen bits of the analog component input $A_i$ is "1011110111100111". Electrodes 320-0, 320-2 through 320-5, 320-7 through 320-A, and 320-D through 320-F are charged. The area encircled by an ellipse drawn with a dashed line, in this simulated result, contains crystals that are affected by charge from the nearby electrodes 320-0, 320-2, 320-D, and 320-F even though these crystals are not directly under any of the first electrodes 320. These simulated crystals are nearly fully reoriented. Compare now the area between electrodes 320-5 and 320-6, in which the crystals in between these two electrodes are affected by the nearby charge but not to the extent that they reach full reorientation.

Light introduced into the input waveguide 561 will pass to the output waveguides 564 differently in the examples of FIG. 17 and FIG. 18 with the result that the values sensed at the sensors 1164 will be different in each case.

The differing lengths of the first electrodes 320 raise the entropy of the internal interactions between the light introduced through the input waveguide 561 and the numerous crystals in the liquid crystal cell 1600.

Forming the first electrodes 320 along less than all of the liquid crystal cell 1600 (the half drawn on the right-hand side in FIGS. 17 and 18) also raises the entropy and contributes to the digital unclonability of the analog component 100.

The analog component input $A_i$ in the above example embodiment is taken sixteen bits at a time. The four sensors 1164 are each sufficiently sensitive to detect sixteen variations in light. In other words, each sensor can output values that can be encoded in four bits. The four bits encoded from the outputs of each of the four sensors 1164 are sixteen bits in all. These four sets of four bits are concatenated to give a sixteen-bit analog component output $A_o$.

In the foregoing example, a bitstream was used to drive the first electrode signal lines 120 of the analog component 100. The bitstream, taken sixteen bits at a time, is more generally an analog component input $A_i$.

In the foregoing example the sixteen-bit analog component output $A_o$ was determined by what the sensors 1164 sensed after the crystals in the liquid crystal cell 1600 were affected by the analog component input $A_i$. In other words, the analog component output $A_o$ was based on the analog component input $A_i$. Using suitable control circuitry, described below, it is possible to repeatedly obtain from the analog component 100 an analog component output $A_o$ based on the analog component input $A_i$, thereby to process a bitstream of arbitrary length in sixteen-bit portions.

Whereas the foregoing example embodiment employed sixteen of the first electrode signal lines 120, sixteen of the first electrodes 320, four of the output waveguides 564, and four of the sensors 1164, these numbers were used for the sake of teaching the reader about the inventive concept.

The design for the analog component 100 in another example embodiment processes a bitstream in portions of two hundred fifty six bits by employing two hundred fifty six of the first electrode signal lines 120. This example will be referred to below as the 256-bit chip. These first electrode signal lines 120 are each connected to corresponding ones of two hundred fifty six first electrodes 320. These first electrodes 320 are arranged in four rows as in FIG. 18, but have sixty four of the first electrodes 320 in each row. This 256-bit chip example embodiment has sixty four output waveguides 564, and each of these output waveguides 564 communicates an optical output of the liquid crystal cell 1600 to corresponding ones of sixty four sensors 1164. The sensors 1164 output four-bit values that are concatenated to provide a two hundred fifty six-bit analog component output $A_o$.

In yet another example embodiment similar to the 256-bit chip described in the immediately preceding paragraph, only thirty two of the output waveguides 564 are formed and only thirty two of the sensors 1164 are provided. In this example, however, each sensor is sensitive enough to output eight-bit values. The thirty two eight-bit values are concatenated to provide a two hundred fifty six-bit analog component output $A_o$. In a further example embodiment similar to the 256-bit chip, the first electrodes 320 are arranged in more or fewer rows and columns. In other example embodiments, the positions of the output waveguides 564 are set to maximize entropy. Still other variations will occur to the reader without departing from the inventive concepts described in this paper.

The foregoing description explains how the interconnection between the first electrode signal lines 120 and the first electrodes 320 determines which of the first electrodes 320 are charged when the first electrode signal lines 120 are driven. Altering the connection pattern between the first electrode signal lines 120 and the first electrodes 320 results in a different signature of an analog component 100. Therefore, in addition to the several ways in which the formation of the analog component 100 can be varied, the formation of the connections between the first electrode signal lines 120 and the first electrodes 320 can also be varied. In one example embodiment additional interconnection layers are provided so that the connection between the first electrode signal lines 120 and the first electrodes 320 can be conveniently varied.

Driving Component

The analog component 100 is useful, for example, as a part of a data security apparatus 2000 shown generally in FIGS. 19A and 19B. In FIG. 19A the data security apparatus 2000 receives a plaintext message M which may also be referred to as digital data M. The term "plaintext" as used in the sense here does not mean that plaintext message M must represent a message readable by humans. Plaintext message M represents any set of bits prior to being encrypted. The plaintext message M in various example embodiments is previously encrypted by some other process and in other example embodiments is data not previously encrypted by another process.

Through an encryption process the data security apparatus 2000 converts the plaintext message M into ciphertext C. In FIG. 19B the data security apparatus 2000 receives ciphertext C. Through a decryption process the data security apparatus 2000 converts the ciphertext C back into a plaintext message M that matches the plaintext message M originally input in FIG. 19A.

FIGS. 19A and 19B are highly simplified, but provide a general idea of the environment in which the analog component 100 is used. The data security apparatus 2000 shown in FIGS. 19A and 19B is, in one example, the same data security apparatus 2000 but performs encryption or decryption using at least one analog component 100. In another example, the data security apparatus 2000 of FIG. 19A is separated from the data security apparatus 2000 in FIG. 19B by a communication link, and in example embodiments is remote from the data security apparatus 2000 in FIG. 19B. In this latter example, the signature of the data security apparatus 2000 in each of FIGS. 19A and 19B must match or the plaintext message M input into the one will not match the plaintext message M output from the other.

FIG. 20 illustrates an example embodiment of the data security apparatus 2000 from FIG. 19A in more detail. The data security apparatus 2000 includes a control circuitry 2100 and an analog component 100. The control circuitry 2100 receives the plaintext message M from outside of the data security apparatus 2000 and outputs the ciphertext C to outside of the data security apparatus 2000. Part of the processing of the plaintext message M into the ciphertext C uses the analog component 100.

The control circuitry 2100 is implemented as an application specific integrated circuit (ASIC) in one example embodiment.

In another example embodiment the control circuitry 2100 is implemented as a field programmable gate array (FPGA). Whereas an ASIC is configured prior to manufacturing, an FPGA is an integrated circuit configurable after manufacturing using a hardware description language (HDL) like that used in describing an ASIC.

The HDL defines the behavior of the FPGA and programs the FPGA to have a structure that carries out the previously defined functions. In other words, the structure of the FPGA is defined by the HDL, making a programmed FPGA a structurally unique electronic circuit in the manner of an ASIC.

The relationship between the structure of an FPGA and the HDL used to program it (and likewise the relationship between the structure of an ASIC and the HDL used to define its manufacture) is restated herein as a circuit configured (or adapted) to perform various predefined operations. The "predefined operations" are the operations embodied in the HDL (or other definition language such as Verilog or VHDL).

In an example embodiment the control circuitry 2100 is a secure FPGA.

FIG. 21 illustrates an embodiment of the predefined operations for encryption for control circuitry 2100. This embodiment assumes a plaintext message M is sequentially processed in portions appropriate to the particular analog component 100 (i.e., based on a characteristic of the analog component). For the example analog component 100 shown in FIGS. 1A through 18, the appropriate portion is sixteen bits. For the 256-bit example embodiment, the portion is two hundred fifty six bits. Below, the appropriately-sized portion is referred to generally as a chunk.

The symbols used in FIG. 21 are now described.

In FIG. 21, the plaintext message M has a length |M| and is divided into m chunks $M_i$ where $i=1, \ldots, m$. The symbol $M_i$ represents the i-th chunk of plaintext message M (i.e., a given chunk).

FIG. 21 includes the idea of a keystream S which may also be referred to a digital keystream S. The keystream is generated in m chunks $S_i$ where $i=1, \ldots, m$. An $S_i$ is generated for each $M_i$.

The ciphertext C is generated in m chunks $C_i$ where $i=1, \ldots, m$ by $C_i = M_i$ XOR $S_i$.

N is a nonce. K1 and K2 are 256-bit keys. $E1_{K1}(N+i-1)$ is an encryption of one less than the sum of the nonce N and i using K1. $E2_{K2}(N+i-1)$ is an encryption of one less than the sum of the nonce N and i using K2. Here, (N+i−1) may be understood as a nonce-based value.

The analog component, whether the 16-bit version, the 256-bit version, or another example embodiment is represented as A. The analog component input is $A_i$, and the analog component output is $A_o$.

With the foregoing in mind, a function $E_K$ is given by $E_K(x) = E1_{K1}(A(E1_{K1}(x))) \oplus E2_{K2}(x)$ where x is a set of bits (i.e., a set of bits x). In the preceding expression, the term $A(E1_{K1}(x))$ can be interpreted as meaning the result of using $E1_{K1}(x)$ as the analog component input $A_i$ to drive the analog component A. This result is also known as $A_o$.

With this definition of $E_K(x)$, the keystream S can then be concisely given by $$S := \overset{m}{\underset{i=1}{\|}} E_K(N + i - 1)$$

where the two vertical bars refer to a concatenation operation. Likewise, the ciphertext C can be concisely given by $C = M \oplus S$ for the first $|M|$ bits of M.

The processing in FIG. 21 starts when some plaintext message M is to be encrypted. A counter is initialized in s2110. The first chunk $M_i$ of bits is obtained in s2120. If the chunk is too short, it is padded out to have values enough to make a chunk. If a chunk is padded, the padding is later discarded and is not included in the ciphertext C.

Processing continues with s2130 where the sum of one less than the sum of nonce N and i is encrypted with $E1_{K1}$. In s2140 that result is used to drive the first electrode signal lines 120 of the analog component 100, causing certain of the first electrodes 320 to be charged and thereby altering the orientation of the liquid crystals in the liquid crystal cell 1600. The output of the sensors 1164 is represented in digital form and obtained as $A_o$ which may also be written as $A_o = A(E1_{K1}(N+i-1))$. To put it another way, the term $A(E1_{K1}(N+i-1))$ is based on the digital representation $A_o$ of the analog component output.

In s2150, that result is encrypted again using K1 to give $E1_{K1}(A(E1_{K1}(N+i-1)))$.

The processing in s2130 through s2150 employed a first encryption and key K1. In fact, it used the first encryption twice: one time with N+i−1 to generate the analog component input, and another time on the analog component output. This first encryption is a block encryption in an example embodiment. The processing in s2160 employs a second encryption and a key K2 different from key K1. The second encryption is also a block encryption in an example embodiment. In s2160, the second encryption is performed with N+i−1 to give $E2_{K2}(N+i-1)$.

In s2170, an XOR operation is performed to obtain $S_i$.

In s2180, an XOR operation is performed with $M_i$ and $S_i$ to give $C_i$.

At s2190, if more chunks $M_i$ of M remain to be processed, then processing continues with s2195 followed by s2120. Incrementing the counter in s2195 serves to advance the processing to the next chunk $M_i$. On the other hand, if no more chunks remain to be processed, the encryption is at an end except for discarding any padding that was introduced.

FIG. 22 shows the predefined operations for the control circuitry 2100 in the event of decryption.

FIG. 22 is identical to FIG. 21 with two exceptions. In s2220 a chunk $C_i$ of the ciphertext C is obtained instead of a chunk of the plaintext message M. In s2280 an XOR operation is performed with $C_i$ and $S_i$ to give $M_i$.

The similarity between the encryption process shown in FIG. 21 and the decryption process shown in FIG. 22 is possible in part due to the fact that, since $M \oplus S = C$ is used in the encryption process, the use of $C \oplus S$ in the decryption process allows rewriting as $(M \oplus S) \oplus S$ by substitution for C, giving M. Therefore, the same control circuitry 2100 that performs encryption can also be used to perform decryption, depending on whether the plaintext message M is used as the input or whether the ciphertext C is used instead. To say it another way, whatever input digital data is used (the plaintext message M or the ciphertext C), the output digital data obtained is the other one (i.e., when the input digital data is M, the output digital data is C and when the input digital data is C the output digital data is M). In general, then, the conversion of the input digital data (represented by Di) to the output digital data (represented by Do) may be performed by $Di \oplus S = Do$. The control of operations for conversion between the ciphertext and the plaintext may, without loss of function, be practically embodied likewise in software modules or logic implemented by a general-purpose microprocessor.

Additional aspects of the control circuitry 2100 can be provided to improve the security of the data security apparatus 2000.

Detailed Implementation

A more detailed implementation of the predefined operations of the control circuitry 2100 will now be discussed in the context of an example embodiment. In this example embodiment, the more detailed operations implement authenticated encryption with an analog component (AEA) as a specific type of authenticated encryption (AE).

In an example embodiment block cipher E1 is a substitution-permutation network (SPN) in accordance with FIG. 23. Block cipher E1 has a block length of 256 bits and a key size of 256 bits. It accepts as inputs a 256-bit plaintext X and a 256-bit key K, and produces the corresponding 256-bit ciphertext $Y = E1_k(X)$.

Block cipher E2 is used to establish a baseline level of security that depends only on digital components. The block cipher E2 is designed, in this example, as a variant of E1 and its overall structure is also shown by FIG. 23. It is a substitution-permutation network with a block length of 256 bits and a key size of 256 bits. It accepts as inputs a 256-bit plaintext X and a 256-bit master key k, and produces the corresponding 256-bit ciphertext $Y = E2_k(X)$.

In an example embodiment E2 shares both the global SPN structure and the structure of the round transformation and key schedule with E1. However, the components of the substitution layer, diffusion layer, and round key derivation are different from those in E1.

Substitution layer: A different nonlinear 8-bit S-box is employed.

Diffusion layer: A different 32×32 MDS matrix is used.

Key addition: Different 256-bit round constants are used to derive the subkeys from the master key.

E1 and E2, in an example embodiment, are substitution-permutation networks with full MDS diffusion layers, similar to the block cipher SHARK (cf. Vincent Rijmen, Joan Daemen, Bart Preneel, Antoon Bosselaers, Erik De Win: The cipher SHARK. FSE 1996, LNCS 1039, pp. 99-111). As opposed to the AES, they apply a MDS matrix to the entire state in each round, and not only to one column. While being somewhat heavier in terms of implementation efficiency, this leads to very rapid diffusion (full diffusion is reached after only 1 round) and significantly faster diminishing cryptanalytic properties over the number of rounds. The table below provides a comparison of E1/E2 to both SHARK and the AES.

|  | E1/E2 | SHARK | AES |
| --- | --- | --- | --- |
| Block length | 256 bits | 64 bits | 128 bits |
| Key sizes | 256 bits | 128 bits | 128/192/256 bits |
| Rounds | 16 | 6 | 10/12/14 |
| S-box layer | 8-bit random S-box | 8-bit inversion S-box | 8-bit inversion S-box |
| Linear layer | full MDS (32 × 32) | full MDS (8 × 8) | MixColumns (4 × 4 MDS) |
| Full diffusion | 1 round | 1 round | 2 rounds |
| Active S-boxes | 33 per 2 rounds | 9 per 2 rounds | 25 per 4 rounds |

AEA

AEA is a mode for authenticated encryption (AE), in accordance with the inventive concept, that makes use of block ciphers E1 and E2, as well as the analog component A, which maps 256-bit inputs to 256-bit outputs. AEA mode does not assume the analog component A to be strictly bijective and can tolerate some imperfection in bijectivity. The component A is a deterministic function, though, meaning that equal inputs will yield equal outputs.

AE

One goal of Authenticated Encryption (AE) schemes is to simultaneously provide confidentiality and authenticity/integrity. This can be achieved by combining encryption algorithms such as a block cipher with authenticity and integrity mechanisms such as message authentication codes (MACs).

Upon input of a message and a key, an AE algorithm outputs the corresponding ciphertext as well as an authentication tag. During decryption, this authentication tag is verified. Upon successful verification, the plaintext is returned, otherwise failure is indicated and no plaintext is revealed. The key concept is that only holders of the key can produce valid authentication tags, and any modification in transit of ciphertext or tag (or both) will result in verification failure with high probability.

Like block cipher modes of operation, many AE schemes additionally take a nonce as an input (number used once, which is public but not repeated with the same key). The nonce input has to be identical for the encryption and decryption of a particular message.

Operation is illustrated in FIG. 24 which shows nonce-based authenticated encryption. The sender transmits the nonce N, ciphertext C and tag T The nonce N shall only be used for a single message under the same key.

Interface

The AEA mode of operation for authenticated encryption takes as input 1. a 512-bit secret key K including a 256-bit secret key K1 and a 256-bit secret key K2, that is, K=(K1, K2);
   i) Key K1 can be tightly integrated with the analog component A, e.g. on one ASIC chip;
   ii) Key K2 can be placed outside the hardware module containing the analog component A, e.g. on an FPGA or in user software, with the purpose of establishing a baseline level of security for the authenticated encryption;
2. a 256-bit nonce N (number used once);
3. a message input M of length $0 \leq |M| < 2^{128}$ bits.

When used for encryption and authentication, it outputs a ciphertext of equal length than the message input, together with an authentication tag T of length 256 bits:

AEA-ENCRYPT:$(K,N,M) \rightarrow (C,T)$.

When used for decryption and verification, it outputs either the recovered plaintext together with a symbol "S" for verification success; or no message output at all and "F" for verification failure:

AEA-VERIFY:$(K,N,C,T) \rightarrow (M,\{S,F\})$.

The nonce input is assumed to be public, but is required to be unique in the sense that any combination of (K, N) should only be used once. Nonces shorter than 256 bits are zero-padded into a 256-bit string. In general, if the processing of up to $2^t$ message blocks is required for a single key, the nonce should be 2t bits long, due to the birthday paradox.

In the following, various building blocks and finally the AEA encryption and decryption/verification algorithms are defined.

CTR Mode

The building block CTR(N, K, M) takes a 256-bit nonce N, a 512-bit key K, and a message input M (of length $0 \leq |M| < 2^{128}$ bits) and produces a ciphertext C of equal length via:

$$m := \left\lceil \frac{|M|}{256} \right\rceil$$

$$S := E_K(N) \| E_K(N+1) \| \ldots \| E_K(N+m-1)$$

$$C := M \oplus S[\text{first } |M| \text{ bits}]$$

return $C$ with function $E_K(M)$ defined as $E1_{K1}(A(E1_{K1}(M))) \oplus E2_{K2}(M)$. The operation of function $E_K(M)$ and the CTR mode of encryption using this function are graphically illustrated in FIGS. 26 and 25, respectively.

CBC-MAC

The building block CBC(K, M) takes a 512-bit key K and a message input M (of length $0 \leq |M| < 2^{128}$ bits, and a multiple of 256 bits) and returns the encryption of the last block of the message in CBC mode:

$$(M_1, \ldots, M_m) := M$$

$$C_0 := 0^{256}$$

$$C_i := E_K(M_i \oplus C_{i-1}) \text{ for } i=1, \ldots, m$$

return $C_m$

Here, $E_K(M)$ is defined as above for the CTR encryption. This MAC algorithm based on function $E_K$ is illustrated in FIG. 27.

Padding

The padding algorithm PAD (M, $L_1$, $L_2$) takes as input a message M of length $0 \leq |M| < 2^{128}$ bits, and two 256-bit keys $L_1$ and $L_2$. It returns a bit string of length t·256, t≥1 as follows:

```
if |M| is a multiple of 256:
    return XORPAD(M, L₁)
else:
    return XORPAD(M∥10^(255−(|M|mod256)), L₂)
```

Here, XORPAD (M, L) XORs the shorter of the two bitstrings M and L into the end of the longer string and returns the result.

Message Authentication Code (MAC) algorithm

The MAC algorithm MAC(t, K, M) takes as input a 256-bit integer t, a 512-bit key K and a message M of length $0 \leq |M| < 2^{128}$ bits. It returns an authentication tag as follows:

$L := E_K(0^{256})$ $L_1 := E1_L(0^{255}\|1)$ $L_2 := E1_L(1\|0^{255})$ return $CBC(K, PAD([t]_{256}|M, L_1, L_2))$, where $[t]_{256}$ denotes the 256-bit binary representation of the integer t.

AEA-ENCRYPT: Encryption and Tag Generation

The AEA authenticated encryption algorithm AEA-ENCRYPT(K, N, M) takes a 512-bit key K, a 256-bit nonce N and a message M of length $0 \leq |M| < 2^{128}$ bits. It returns a ciphertext C and 256-bit tag T as follows:

$N' := MAC(0, K, N)$ $C := CTR(N', K, M)$ $C' := MAC(1, K, C)$ $T := N' \oplus C'$ return $C, T$ The use of different constants (integer t) for the two MAC calls ensures proper domain separation between the processing of the nonce and the ciphertext blocks.

Note that the ciphertext always has equal length to the plaintext. The overall operation of the AEA algorithm is depicted in FIG. 28.

AEA-VERIFY: Decryption and Tag Verification

The AEA decryption and verification algorithm AEA-VERIFY: $(K, N, C, T) \rightarrow (M, \{S, F\})$ takes as input 512-bit key K, a 256-bit nonce N, a ciphertext C and a 256-bit tag T. It verifies the authentication tag, and upon success, returns the decrypted message and a symbol "S" for success (not to be confused with the keystream S described above). Upon verification of failure, it returns an empty message and the symbol "F":

if $|T| < 256$ then return $\emptyset$ "F"

$N' := MAC(0, K, N)$ $C' := MAC(1, K, C)$ $T' := N' \oplus C'$ if $T \neq T'$ then return $\emptyset$ "F"

$M := CTR(N', K, C)$ return $M$, "S"

Design Rationale and Security Analysis

The purpose of defining the counter mode encryption routine $E_K(M)$ as $E1_{K1}(A(E1_{K1}(M))) \oplus E2_{K2}(M)$ is to mask both inputs and outputs to the analog component A by a block cipher call. By additionally encrypting M in parallel to E2 and XOR-ing the results, a reconstruction of the resulting counter key stream requires cryptanalyzing both the mixed E1-analog part and E2, with E1 and E2 both being strong conservatively designed block ciphers.

The overall construction of the AEA authenticated mode of operation is not the same as the EAX design (cf. M. Bellare, P. Rogaway and D. Wagner, "A Conventional Authenticated-Encryption Mode", 2003). EAX uses a regular block cipher call for its counter mode encryption instead of the E1/A/E2 design of AEA. Also, the MAC design of AEA is different from OMAC. The difference that the two keys $L_1$ and $L_2$ are not derived from L by repeated doubling in the finite field $GF(2^{256})$, but instead derived by encrypting different constants with the block cipher E1, using L as a key. The reason for this is that doubling in a large finite field requires considerable implementation resources, whereas additional block cipher calls can use the already implemented ciphers.

AEA uses the forward implementation of the block ciphers E1 and E2, not their inverses. This further improves the implementation characteristics, especially for hardware.

The AEA mode of operation benefits from the provable security properties of EAX. As an authenticated encryption mode of operation, two security notions are of interest: privacy and authenticity. Privacy refers to the confidentiality of the plaintexts, whereas authenticity refers to the security against forgery attacks.

The authors of EAX prove that for these two security notions, the advantage of any adversary querying not more than σn-bit message blocks (possibly across many queries) is bounded as follows:

$$Adv_{EAX}^{priv}(\sigma) \leq \frac{9\sigma^2}{2^n}$$

and $$Adv_{EAX}^{auth}(\sigma) \leq \frac{10.5\sigma^2}{2^n} + \frac{1}{2^\tau}$$

with τ denoting the tag length. Both bounds are essentially birthday bounds, since the advantage is nearing 1 as soon as $\sigma^2 \approx 2^n$. For AEA, n=τ=256, therefore the mode can be considered secure if not more than $2^{128}$ blocks are encrypted for the same key. AEA's MAC algorithm fulfills the requirements of the security proof of OMAC, namely, that $L_1$ and $L_2$ are independent random values whenever L is random.

Yet another difference between AEA and EAX concerns the use of the analog component A, which is not necessarily a bijection. However, the security analysis of EAX actually abstracts the concrete block cipher away, and assumes random n-bit to n-bit functions. The above-mentioned security bounds are derived using the random function assumption, which means that they equally apply to AEA if either the non-bijectivity of A approximately equals the collision probability of a random 256-bit to 256-bit function, namely $1/2^{256}$, and the block cipher E1 is a secure pseudorandom permutation; or the block cipher E2 is a secure pseudorandom permutation.

Since both E1 and E2 are designed to be secure pseudorandom permutations, the security bounds of EAX also apply to AEA.

Finally, the provable security analysis of EAX, applicable to AEA, assumes nonce-respecting adversaries, so no guarantees are made when nonces are repeated. Unique nonces are therefore used in AEA.

Analysis of Partial Compromise

The above security analysis applies to the standard model where cryptographic keys are assumed to be uncompromised, and the adversary's goal is to decrypt new ciphertext or to successfully forge new messages with valid authentication tags. The latter can be in one of two settings:

Existential forgeries: Deduction of a valid new message/
tag pair without control over the contents of the message.

Universal forgeries: Deduction of arbitrary valid new message/tag pairs with full control over the contents of the message.

With no keys compromised, all of this is impossible up to the proven security bounds outlined above.

The impact of having either one or two of the components of the $E_K$ cipher compromised is now discussed. Recall that it is defined as $$E_K(M)=E1_{K1}(A(E1_{K1}(M)))\oplus E2_{K2}(M).$$

In the first scenario (S1), only the digital part $E2_{K2}$ is compromised in the sense that the adversary can compute arbitrary queries, i.e., has succeeded in extracting or simulating its functionality, with or without knowing the key K2. In the second scenario (S2), all digitally implemented functionality has been reconstructed by the adversary, i.e., arbitrary queries to both $E1_{K1}$ and $E2_{K2}$ can be computed. This can involve the recovery of both K1 and K2 or not. Note that this second scenario is equivalent to a compromise of the entire master key K=(K1, K2).

Security Against S1-Adversary

In this scenario, the adversary can compute $E2_{K2}(x)$ for any input x. For the security goals, this has the following implications:

Confidentiality: In order to decrypt a ciphertext block $C_i$, the adversary has to compute the counter keystream $S_i=E_K$(N+i−1), which requires knowledge of $E1_{K1}(A(E1_{K1}$(N+i−1))) as well as $E2_{K2}$(N+i−1). Since $E1_{K1}$ and A are uncompromised, he has no information about $S_i$ and hence the plaintext $M_i$.

Forgery: As outlined above, the adversary is unable to compute the counter keystream given only knowledge of $E2_{K2}$. The adversary cannot produce correct ciphertexts corresponding to plaintexts of his choice, ruling out universal forgeries. For existential forgeries, the adversary could attempt to compute a correct tag for random ciphertext (or ciphertext taken from other queries with the same key). This however requires the ability to compute $E1_{K1}(A(E1_{K1}(x)))$ in order to produce correct CBC-MAC encryptions, which he does not have.

Summarizing, the compromise of $E2_{K2}(x)$ has no direct impact on the security of AEA. The provable security bounds however now rely on $E1_{K1}(A(E1_{K1}(\cdot)))$ behaving as a random function.

Security Against S2-Adversary

In this scenario, the adversary can compute both $E1_{K1}(x)$ and $E2_{K2}(x)$ for any input x. For the security goals, this has the following implications:

Confidentiality: In order to decrypt a ciphertext block $C_i$, the adversary has to compute the counter keystream $S_i=E_K$(N+i−1), which requires knowledge of $E1_{K1}(A(E1_{K1}$(N+i−1))) as well as $E2_{K2}$(N+i−1). With both $E1_{K1}(x)$ and $E2_{K2}(x)$ compromised, the security now entirely depends on the uncompromised component A. If its collision probability is higher than random, the corresponding confidentiality bound reduces to $$Adv_{EAX}^{priv}(\sigma) \le \frac{9\sigma^2}{2^\tau}$$

for a collision probability of A equal to $1/2^\tau$ with $\tau<256$.

Forgery: As in the (S1) scenario, the security against both existential and universal forgeries now entirely depends on the sole uncompromised component A. If its collision probability is higher than random, the corresponding authenticity bound reduces to $$Adv_{EAX}^{auth}(\sigma) \le \frac{10.5\sigma^2}{2^\tau} + \frac{1}{2^{256}}$$

for a collision probability of A equal to $1/2^\tau$ with $\tau<256$.

Summarizing, also the compromise of both $E1_{K1}(x)$ and $E2_{K2}(x)$ has no immediate impact on the security of AEA. Its security however now depends on both the inability to clone the analog component's functionality, and on its collision probability.

Post-Quantum Security

Using quantum computers, specifically Grover's algorithm, the exhaustive key search problem for symmetric encryption algorithms such as E1 and E2 can be sped up by the square root of the search space: A k-bit key can be brute-forced in time $O(2^{k/2})$ instead of $O(2^k)$ using Grover's algorithm. Since E1 and E2 are proposed with a 256-bit key, they still offer a 128-bit post-quantum security level. A second consideration is the size of the quantum circuit (the number of qubits) needed to actually implement Grover's algorithm for exhaustive key search for a concrete block cipher. A recent study (M. Grassl et al: Applying Grover's Algorithm to AES: Quantum Resource Estimates, PQCrypto 2016) estimates that a quantum circuit with a total of 6681 qubits is needed for attacking AES-256. The time complexity is estimated at $1.44\times2^{151}$ operations. Since E1 and E2 are designed with a larger state size, they should require at least the aforementioned resources for a successful quantum attack.

A second concern is the post-quantum security of the mode of operation (AEA). As a composed mode, its security is based on the security of the underlying CBC and CTR modes of operation. It is well-known that both CBC and CTR provide IND-CPA (indistinguishability under chosen plaintext attacks) security against quantum attackers under the standard PRF assumption whenever the encryption algorithm is implemented in a classical way. This means that a quantum attacker may only use quantum algorithms to process regular encryption queries, and in particular not ask quantum encryption queries. This situation changes when the encryption algorithm is also implemented on a quantum computer, and the adversary is allowed to ask quantum queries on superimposed messages. A recent study (M. Anand et al: Post-quantum Security of the CBC, CFB, OFB, CTR, and XTS Modes of Operation, PQCrypto 2016) shows that in this case, the standard non-quantum PRF assumption on the underlying block ciphers is only enough to attain IND-qCPA for CTR, but not for CBC. In order to have IND-qCPA security for CBC, the underlying block cipher needs to be a qPRF (quantum secure PRF).

AES-Based Variant

In alternative embodiments, the dedicated block ciphers E2 and/or E1 as used in AEA can be replaced by an AES-based block cipher construction. Since the AES is a 128-bit block cipher, it is converted to a 256-bit block cipher using a balanced Feistel network using AES-256 (with 256-bit keys) as the F-function. The encryption of a 256-bit input X to a ciphertext Y under a 256-bit key K is then given as follows:

$$L_0 \| R_0 := X$$

$$L_{i+1} := R_i$$

$$R_{i+1} := L_i \oplus F(R_i, K_i) \text{ for } i=0, \ldots, 9;$$

$$Y := L_{10} \| R_{10}$$

The function F is defined as $$F(R_i, K_i) = \text{AES-256}_{K_i}(R_i)$$

and the round keys $$K_i = K \oplus (i+1).$$

Provided AES-256 is a secure block cipher, then the result of Dai and Steinberger (Yuanxi Dai, John Steinberger: Indifferentiability of 8-round Feistel networks, CRYPTO 2016) implies indifferentiability from a random permutation after 8 rounds and 2 rounds are added for extra security margin.

Note that indifferentiability is an extremely strong security notion: for instance, security against all adaptively chosen plaintext attacks up to the birthday bound ($2^{128}$) is already achieved after only 4 rounds (M. Luby, C. Rackoff, How to construct pseudorandom permutations from pseudorandom functions, SIAM Journal on Computing, vol. 17, n. 2, pp. 373-386, April 1988)

Sample Application Programming Interface
Encryption:
  void aea_encrypt(const uint8_t* msg, int len, uint8_t* c, uint8_t tag[32], uint8_t nonce[32], uint8_t key[64]);
  Implements authenticated encryption according to the AEA algorithm. Inputs are as follows:
    msg: Message input, a byte string of length "len" bytes.
    len: Length of "msg" in bytes, can be between 0 and MAXINT.
    nonce: 256-bit (32-byte) nonce. This number is required to be unique during the lifetime of a key. It is not required to be secret and can be repeated for different keys. Nonces smaller than 256 bits are zero-padded.
    key: 512-bit master key, comprising K1 and K2 for the E1 and E2 block ciphers.
  This function outputs:
    c: the ciphertext. It has the same length as the input "msg".
    tag: the authentication tag corresponding to msg, key and nonce.
Decryption and Verification:
  bool aea_decrypt(const uint8_t* c, int len, uint8_t* msg, uint8_t tag[32], uint8_t nonce[32], uint8_t key[64]);
  Implements decryption and tag verification according to the AEA algorithm. Inputs are as follows:
    c: Ciphertext input, a byte string of length "len" bytes.
    len: Length of "c", can be between 0 and MAXINT.
    tag: Authentication tag corresponding to c.
    nonce: 256-bit nonce that was used to produce the ciphertext.
    key: 512-bit master key, comprising K1 and K2 for the E1 and E2 block ciphers.
  This function outputs:
    msg: the plaintext, upon verification success. It has the same length as the input "msg". If tag verification fails, this output is empty.
  It returns a Boolean indicating verification success.

Other features and other functions will occur to those familiar with this technology, and such variations are to be expected in the light of the complete and detailed examples provided above. Such variations, however, need not be considered outside the scope and spirit of the claims below.

The invention claimed is:

1. A data security apparatus, comprising:
   an analog component, configured to provide a sensor output;
   control circuitry comprising a circuit configured to perform predefined operations;
   the predefined operations comprising:
     obtaining a plaintext message M;
     generating an analog component input for the analog component, the analog component input being based on a nonce N;
     sending the analog component input to the analog component as drive signals to drive the analog component to provide the sensor output;
     digitally representing the sensor output to obtain an analog component output $A_o$;
     generating a digital keystream S based on the analog component output $A_o$;
     generating a ciphertext C based on the digital keystream S and on the plaintext message M; and
     outputting the ciphertext C and the nonce N.

2. The data security apparatus of claim 1, wherein the control circuitry comprises an application specific integrated circuit.

3. The data security apparatus of claim 1, wherein the control circuitry comprises a field programmable gate array.

4. The data security apparatus of claim 1, wherein the predefined operations of the control circuitry further include generating the ciphertext C by $C = M \oplus S$.

5. The data security apparatus of claim 1, wherein the predefined operations further include successively providing the analog component input to the analog component in m chunks where $A_i$ represents a given chunk of the analog component input and $i=1, \ldots, m$.

6. The data security apparatus of claim 5, wherein $A_i$ has a number of bits that is based on a characteristic of the analog component.

7. The data security apparatus of claim 5, wherein the digital keystream S is provided in m chunks where $S_i$ represents a given chunk of the digital keystream S corresponding to $A_i$ and where $i=1, \ldots, m$.

8. The data security apparatus of claim 7, wherein the control circuitry successively obtains the ciphertext C in the m chunks, where $C_i$ represents a given chunk of the ciphertext and where $i=1, \ldots, m$, by $C_i = M_i \oplus S_i$.

9. The data security apparatus of claim 8, wherein the predefined operations further include determining $A_i$ by encrypting a value based on the nonce N using a first key K1.

10. The data security apparatus of claim 9 wherein, when the control circuitry drives the analog component, the control circuitry uses bits of $A_i$ as the drive signals.

11. The data security apparatus of claim 9, wherein the encrypting using the first key K1 is a block encryption.

12. The data security apparatus of claim 11, wherein the block encryption using K1 is performed with a substitution-permutation network.

13. The data security apparatus of claim 12, wherein the control circuitry calculates the nonce-based value by $N+i-1$.

14. The data security apparatus of claim 9, wherein the predefined operations further comprise:
   encrypting the analog component output $A_o$ using the first key K1 to obtain $E1_{K1}(A_o)$; and
   generating the digital keystream S based on $S_i = E1_{K1}(A_o)$.

15. The data security apparatus of claim 14, wherein the predefined operations further comprise:
   encrypting the value based on the nonce N using a second key K2 to obtain $E2_{K2}$; and
   generating the digital keystream S based on $S_i = E1_{K1}(A_o) \oplus E2_{K2}$.

16. The data security apparatus of claim 15, wherein the encrypting using the second key K2 is a block encryption.

17. The data security apparatus of claim 16, wherein the block encryption using K2 is performed with a substitution-permutation network.

18. A data security apparatus, comprising:
an analog component, configured to provide a sensor output, comprising a liquid crystal cell configured to be driven via electrodes that receive the drive signals and a sensor configured to provide the sensor output based on an optical output of the liquid crystal cell; and
control circuitry comprising a circuit configured to perform predefined operations;
the predefined operations comprising:
obtaining a plaintext message M;
generating an analog component input for the analog component;
sending the analog component input to the analog component as drive signals to drive the analog component to provide the sensor output;
digitally representing the sensor output to obtain an analog component output $A_o$;
generating a digital keystream S based on the analog component output $A_o$;
generating a ciphertext C based on the digital keystream S and on the plaintext message M; and
outputting the ciphertext C;
the analog component input being successively provided to the analog component in m chunks where $A_i$ represents a given chunk of the analog component input and i=1, ..., m;
the digital keystream S being successively provided in m chunks where $S_i$ represents a given chunk of the digital keystream S corresponding to $A_i$ and where i=1, ..., m; and
the ciphertext C being successively obtained in m chunks, where $C_i$ represents a given chunk of the ciphertext and where i=1, ..., m, by $C_i = M_i \oplus S_i$.

19. The data security apparatus of claim 18, wherein:
the analog component further comprises an optical source configured to output a constant optical signal, as an optical input, to the liquid crystal cell; and
the electrodes are disposed on a side of the liquid crystal cell.

* * * * *